(12) United States Patent
Tocci

(10) Patent No.: US 8,441,732 B2
(45) Date of Patent: May 14, 2013

(54) WHOLE BEAM IMAGE SPLITTING SYSTEM

(76) Inventor: Michael D. Tocci, Sandia Park, NM (US)

( * ) Notice: Subject to any disclaimer, the term of this patent is extended or adjusted under 35 U.S.C. 154(b) by 236 days.

(21) Appl. No.: 12/879,921

(22) Filed: Sep. 10, 2010

(65) Prior Publication Data

US 2010/0328780 A1  Dec. 30, 2010

Related U.S. Application Data

(63) Continuation-in-part of application No. 12/414,547, filed on Mar. 30, 2009, now Pat. No. 8,320,047.

(60) Provisional application No. 61/241,329, filed on Sep. 10, 2009, provisional application No. 61/243,790, filed on Sep. 18, 2009, provisional application No. 61/266,888, filed on Dec. 4, 2009, provisional application No. 61/329,055, filed on Apr. 28, 2010, provisional application No. 61/040,300, filed on Mar. 28, 2008, provisional application No. 61/107,951, filed on Oct. 23, 2008, provisional application No. 61/116,078, filed on Nov. 19, 2008.

(51) Int. Cl.
  *G02B 27/14* (2006.01)
(52) U.S. Cl.
  USPC .............................. 359/629; 359/636; 359/900
(58) Field of Classification Search .................. 359/636, 359/618, 629, 638, 900
  See application file for complete search history.

(56) References Cited

U.S. PATENT DOCUMENTS

| | | |
|---|---|---|
| 2,560,351 A | 7/1951 | Kell et al. |
| 2,642,487 A | 6/1953 | Schroeder |
| 2,971,051 A | 2/1961 | Back |
| 3,202,039 A | 8/1965 | De Lang et al. |
| 3,381,084 A | 4/1968 | Wheeler |
| 3,474,451 A | 10/1969 | Abel |
| 3,601,480 A | 8/1971 | Randall |

(Continued)

FOREIGN PATENT DOCUMENTS

| | | |
|---|---|---|
| EP | 0484802 A2 | 5/1992 |
| EP | 1395062 | 3/2004 |

(Continued)

OTHER PUBLICATIONS

"FD-1665 High Resolution 3 CCD Multispectral Industrial Camera", *Flux Data Incorporated*, http://web.archive.org/web/20080113023949/www.fluxdata.com/prod . . . Jan. 30, 2008 , 1-7.

(Continued)

*Primary Examiner* — Jack Dinh
(74) *Attorney, Agent, or Firm* — Janeen Vilven; Peacock Myers, P.C.

(57) ABSTRACT

The present invention comprises methods and apparatuses for causing a single imaging lens system to simultaneously form multiple high resolution images on multiple imaging sensor planes. The images are preferably substantially identical, with no parallax error, except for different light levels so that the multiple images are of sufficient quality and similarity that they may be compared and/or combined (typically pixel-by-pixel) to create a single instantaneous high dynamic range (HDR) image. The invention may be used to create high-resolution HDR snapshots of moving subjects, as well as high-resolution HDR moving pictures (e.g. cinematographic films, movies, or other video) in which the subject and/or camera is moving. Alternatively, the images are substantially identical, or substantially identical except for different focuses.

32 Claims, 41 Drawing Sheets

U.S. PATENT DOCUMENTS

| | | | |
|---|---|---|---|
| 3,653,748 A | 4/1972 | Athey |
| 3,659,918 A | 5/1972 | Tan |
| 3,668,304 A | 6/1972 | Eilenberger |
| 3,720,146 A | 3/1973 | Yost |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,486,069 A | 12/1984 | Neil et al. |
| 4,555,163 A | 11/1985 | Wagner |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,386,316 A | 1/1995 | Cook |
| 5,642,191 A | 6/1997 | Mende |
| 5,729,011 A | 3/1998 | Sekiguchi |
| 5,734,507 A | 3/1998 | Harvey |
| 5,801,773 A | 9/1998 | Ikeda |
| 5,835,278 A | 11/1998 | Rubin et al. |
| 5,856,466 A | 1/1999 | Cook et al. |
| 5,900,942 A | 5/1999 | Spiering |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,646,716 B1 | 11/2003 | Ramanujan et al. |
| 6,801,719 B1 | 10/2004 | Szajewski et al. |
| 6,856,466 B2 | 2/2005 | Tocci |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,397,509 B2 | 7/2008 | Krymski |
| 7,405,882 B2 | 7/2008 | Uchiyama et al. |
| 7,714,998 B2 | 5/2010 | Furman et al. |
| 7,719,674 B2 | 5/2010 | Furman et al. |
| 7,961,398 B2 | 6/2011 | Tocci |
| 2002/0089765 A1 | 7/2002 | Nalwa |
| 2003/0016334 A1 | 1/2003 | Weber et al. |
| 2003/0072011 A1 | 4/2003 | Shirley |
| 2004/0119020 A1 | 6/2004 | Bodkin |
| 2004/0125228 A1 | 7/2004 | Dougherty |
| 2005/0001983 A1 | 1/2005 | Weber et al. |
| 2005/0041113 A1 | 2/2005 | Nayar et al. |
| 2005/0099504 A1 | 5/2005 | Nayar |
| 2005/0168578 A1 | 8/2005 | Gobush |
| 2005/0212827 A1 | 9/2005 | Goertzen |
| 2005/0219659 A1 | 10/2005 | Quan |
| 2006/0061680 A1 | 3/2006 | Madhavan et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong |
| 2008/0013051 A1 | 1/2008 | Glinski et al. |
| 2008/0030611 A1 | 2/2008 | Jenkins |
| 2008/0055683 A1 | 3/2008 | Choe |
| 2008/0094486 A1 | 4/2008 | Fuh et al. |
| 2008/0112651 A1 | 5/2008 | Cho et al. |
| 2008/0198235 A1 | 8/2008 | Chen et al. |

FOREIGN PATENT DOCUMENTS

| | | |
|---|---|---|
| JP | 60-213178 | 10/1985 |
| JP | 06-335006 | 12/1994 |
| KR | 1996-014482 | 12/1998 |
| WO | WO-2009/121068 | 10/2009 |

OTHER PUBLICATIONS

Aggarwal, Manoj, "Split Aperture Imaging for High Dynamic Range", *International Journal of Computer Vision* Jul. 17, 2004, 7-17.

Alleysson, David et al., "HDR CFA Image Rendering", *Ecole Polytechnique Federale De Lausanne, Infoscience* http://infoscience.epfl.ch/record/847772006, 1-4.

Debevec, Paul E. et al., "Recovering High Dynamic Range Radiance Maps from Photographs", *International Conference on Computer Graphics and Interactive Techniques* http://portal.acm.org/citation.cfm?id=258884 1997, 369-378.

Kao, Wen-Chung, "High Dynamic Range Imaging by Fusing Multiple Raw Images and Tone Reproduction", *IEEE Transactions on Consumer Electronics*, vol. 54, No. 1 2008, 10-15.

Lukac, Rastislav et al., "Demosaicked Image Postprocessing Using Local Color Ratios", *IEEE Transactions on Circuits and Systems for Video Technology*, vol. 14, No. 6 2004, 914-920.

Stumpfel, Jessi et al., "Direct HDR Capture of the Sun and Sky", *Computer graphics, virtual reality, visualisation and interaction in Africa* http://portal.acm.org/citation.cfm?id=1029977 2004, 145-149.

WHOLE BEAM IMAGE SPLITTING SYSTEM

CROSS-REFERENCE TO RELATED APPLICATIONS

This application claims priority to and the benefit of filing of U.S. Provisional Patent Application Ser. No. 61/241,329, entitled "Whole Beam Image Splitting System", filed on Sep. 10, 2009; U.S. Provisional Patent Application Ser. No. 61/243,790, entitled "Whole Beam Image Splitting System", filed on Sep. 18, 2009; U.S. Provisional Patent Application Ser. No. 61/266,888, entitled "Whole Beam Image Splitting System", filed on Dec. 4, 2009; and U.S. Provisional Patent Application Ser. No. 61/329,055, entitled "Whole Beam Image Splitting System", filed on Apr. 28, 2010.

This application is also a continuation-in-part application of U.S. patent application Ser. No. 12/414,547, entitled "Whole Beam Image Splitting System", filed on Mar. 30, 2009, which application claims priority to and the benefit of filing of U.S. Provisional Patent Application Ser. No. 61/040,300, entitled "Method and Apparatus for Producing Multiple High-Resolution Images Using a Single Imaging Lens System", filed on Mar. 28, 2008; U.S. Provisional Patent Application Ser. No. 61/107,951, entitled "Method and Apparatus for Producing Multiple High-Resolution Images Using a Single Imaging Lens System", filed on Oct. 23, 2008; and U.S. Provisional Patent Application Ser. No. 61/116,078, entitled "Method and Apparatus for Producing Multiple High-Resolution Images Using a Single Imaging Lens System", filed on Nov. 19, 2008. All of the above patent applications are incorporated herein by reference.

BACKGROUND OF THE INVENTION

1. Field of the Invention (Technical Field)

The present invention relates generally to the field of multiple imaging systems, more specifically to methods and apparatuses for causing a single imaging lens system to simultaneously form multiple images on multiple imaging sensor planes. The images are preferably substantially identical except for different light levels so that the multiple images are of sufficient quality and similarity that they may be compared and/or combined (typically pixel-by-pixel) to create a single instantaneous high dynamic range (HDR) image. Alternatively, the images are substantially identical or substantially identical except for different focuses or different magnifications.

2. Description of Related Art

Note that the following discussion refers to a number of publications and references. Discussion of such publications herein is given for more complete background of the scientific principles and is not to be construed as an admission that such publications are prior art for patentability determination purposes.

In recent years, the goal of producing high dynamic range (HDR) images has been approached from many different directions. U.S. Pat. Nos. 7,084,905 and 7,397,509 and U.S. Pat. Appl. Ser. Nos. 2005/0099504 and 2008/0112651 each describe an apparatus and/or method for producing HDR images using specialized sensor arrays with novel pixel properties. U.S. Appl. No. 2008/0055683 describes a system and method for synthesizing an HDR image using a single optical image. U.S. Pat. No. 5,801,773 and U.S. Pat. Appl. Ser. Nos. 2005/0041113, 2006/0209204, 2007/0025717, and 2008/0094486 each describe an apparatus and/or method for synthesizing HDR images from sequences of images taken at different moments in time. None of these patents describe a method for optically producing multiple images on multiple sensor arrays simultaneously.

Devices and methods for optically producing multiple simultaneous images have been known for over 100 years. U.S. Pat. No. 347,451 describes an apparatus for using multiple imaging lenses to create simultaneous images on a single image plane. U.S. Pat. Nos. 3,601,480, 5,153,621, 5,194,959, 5,734,507, 5,835,278, and 5,926,283, European Pat. Appl. No. 91118422.4 (Publication number 0 484 802 A2), Japanese Patent Publication No. 60-213178, and Aggarwal & Ahuja, Split Aperture Imaging for High Dynamic Range, International Journal of Computer Vision 58(1), 7-17 (2004) each describe a method and/or apparatus for splitting an image-forming beam into spatially-distinct sections using a pyramid-shaped mirror or other total reflective device. U.S. Pat. Nos. 5,024,530, 5,642,191, 6,856,466, and 7,177,085 each describe a method and/or apparatus for splitting an image-forming beam into spatially-distinct sections using a prism or other refractive device. All of these papers and patents describe methods and/or apparatuses that suffer from parallax error, due to the fact that the image-forming beam in each case is split into subsections that are spatially distinct from one another at the point of splitting. None of these patents or papers describe or suggest a method for splitting an image-forming beam using a partially-reflecting beamsplitting device that provides light for each split portion from the entire original image-forming beam.

The use of prisms and/or beamsplitters to form a plurality of subimages having different color or polarization characteristics has been studied and explained in great depth. U.S. Pat. Nos. 2,560,351, 2,642,487, 2,971,051, 3,202,039, 3,381,084, 3,653,748, 3,659,918, 3,668,304, 3,802,763, 3,945,034, 4,009,941, 4,268,119, 4,933,751, 5,134,468, and 7,283,307 each describe a method and/or apparatus that explicitly splits the image-forming beam into separate subimages on the basis of color (using explicitly dichroic and/or color-separating means). None of these patents describe a method for splitting an image-forming beam into subimages that have identical color and/or wavelength properties. Furthermore, U.S. Pat. Nos. 3,202,039, 3,659,918, 3,802,763, 4,009,941, 4,084,180, 4,268,119, 5,134,468, and 6,215,597 each describe a method and/or apparatus that relies on passing the image-forming beam through solid glass prisms that have tilted glass faces in contact with air: a situation that immediately precludes their use for producing multiple high-resolution sub-images with identical color and/or wavelength properties.

SUMMARY OF THE INVENTION

An embodiment of the present invention is a method for combining color images, the method comprising the steps of splitting an image-forming beam into a reflected beam portion and a transmitted beam portion using a whole beam broad spectrum HDRI beamsplitter; forming a plurality of color images on one or more CFA image sensors, the images being substantially identical except for their light levels; and combining the images prior to any de-mosaicing of the images to form a high dynamic range color image. At least one of the images preferably differs in light level by an amount greater than or equal to one photographic stop from an image having a next closest light level, and more preferably differs in light level by an amount greater than or equal to two photographic stops from an image having a next closest light level, and even more preferably differs in light level by an amount greater than or equal to three photographic stops from an image having a next closest light level. The method optionally further comprises splitting the reflected beam portion and/or the transmitted beam portion using one or more additional whole beam broad spectrum HDRI beamsplitters. The whole beam broad spectrum HDRI beamsplitter is optionally constructed by coating a surface of a first prism and/or a surface of a second prism with a partially-reflecting coating and bonding the first and second prisms together so the coating is disposed between the first prism and the second prism, the coating thereby forming the whole beam broad spectrum HDRI beamsplitter. The method preferably further comprises the step of pre-correcting aberrations induced in the beam portions by the prisms using a corrective lens system disposed prior to the whole beam broad spectrum HDRI beamsplitter.

The forming step preferably comprises simultaneously capturing the color images on a plurality of CFA image sensors. The method optionally further comprises the step of assembling the high dynamic range color image together with other high dynamic range color images to create a high dynamic range film or video. The method preferably further comprises the step of effectively collimating the image forming optical beam. The method preferably further comprises the step of correcting aberrations in the beam portions which have been transmitted through the whole beam broad spectrum HDRI beamsplitter. The method optionally further comprises the step of replacing the whole beam broad spectrum HDRI beamsplitter with a different beamsplitter. The method optionally further comprising the step of directing a beam portion to a viewfinder, preferably by reflecting the beam portion from one or more shutters or partially reflecting optical elements. The whole beam broad spectrum HDRI beamsplitter optionally comprises a partially reflecting beamsplitter coating disposed in the interior of a prism or beamsplitting cube.

Another embodiment of the present invention is an apparatus for combining color images, the apparatus comprising a whole beam broad spectrum HDRI beamsplitter for splitting an image-forming beam into a reflected beam portion and a transmitted beam portion; one or more CFA image sensors for capturing a plurality of color images, the images being substantially identical except for their light levels; and a processor for combining the plurality of color images prior to any de-mosaicing of the images to form a high dynamic range color image. At least one of the images preferably differs in light level by an amount greater than or equal to one photographic stop from an image having a next closest light level, and more preferably differs in light level by an amount greater than or equal to two photographic stops from an image having a next closest light level, and more preferably differs in light level by an amount greater than or equal to three photographic stops from an image having a next closest light level. The apparatus optionally further comprises one or more additional whole beam broad spectrum HDRI beamsplitters for splitting the reflected beam portion and/or the transmitted beam portion. The whole beam broad spectrum HDRI beamsplitter is optionally selected from the group consisting of a thin beamsplitter, a glass plate, a pellicle, a doublet lens, an achromatic cemented doublet, and a partially reflecting beamsplitter coating disposed in the interior of a prism or beamsplitting cube. The whole beam broad spectrum HDRI beamsplitter preferably comprises a deposited partially-reflective layer disposed between two prisms, and the prisms are preferably bonded together. The apparatus preferably further comprises a corrective lens system disposed prior to the whole beam broad spectrum HDRI beamsplitter. The apparatus preferably comprises a plurality of CFA image sensors configured to capture the plurality of color images simultaneously. The apparatus optionally further comprises a processor for assembling the high dynamic range color image together with other high dynamic range color images to create a high dynamic range film or video. The apparatus preferably further comprising a collimating lens system for effectively collimating the image forming optical beam. The apparatus preferably further comprises a corrective lens system. The apparatus optionally further comprises a stage comprising one or more replacement beamsplitters; the stage is preferably circular or linear. The apparatus optionally further comprises a viewfinder, and preferably further comprises one or more shutters or partially reflecting optical elements for directing a beam portion to the viewfinder.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

Figure 1A:
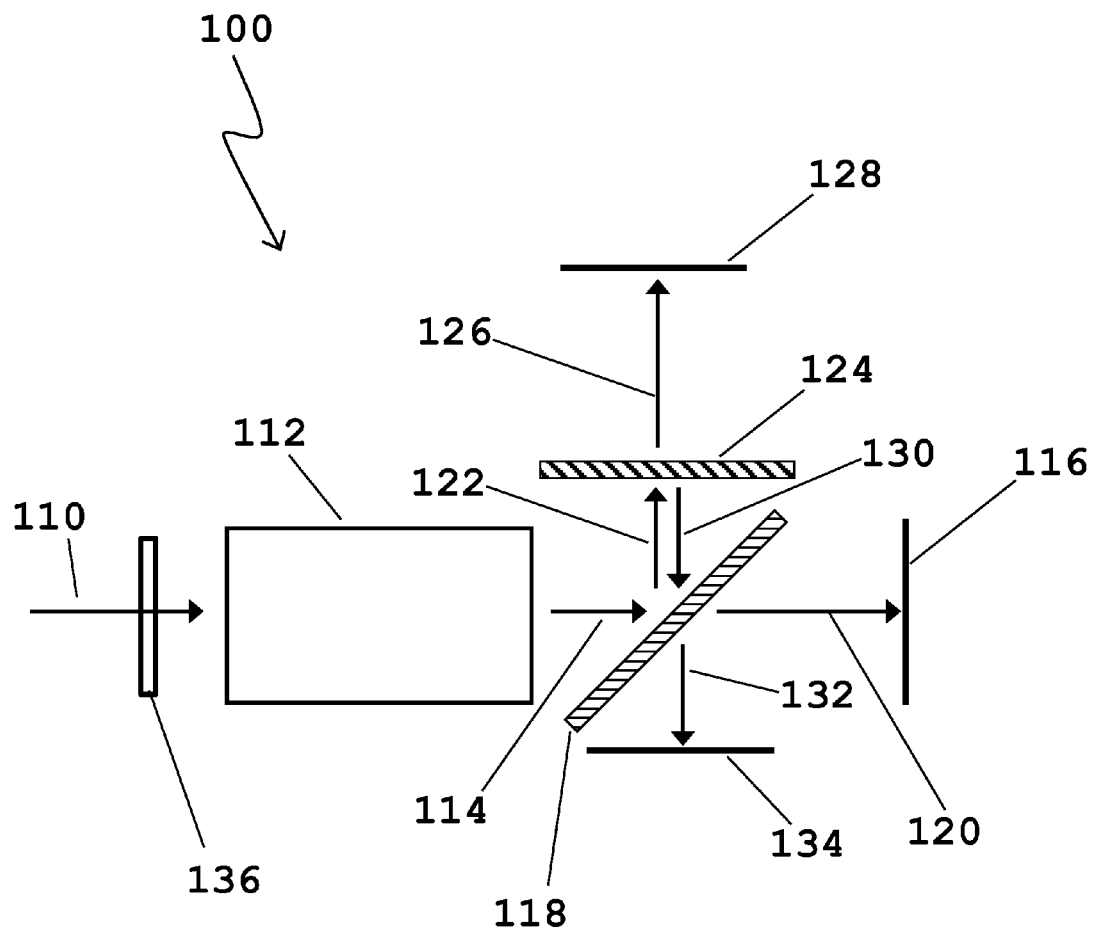
FIG. 1A is a schematic of an embodiment of the present invention comprising two beamsplitters.

Embodiments of the system of this invention are described herein below. Although the embodiments are described with specificity, and are shown having specific component parameters, it should be noted that the system of this invention is not limited to those parameter ranges. In the embodiments described herein, although the characteristics of the elements are stated with specificity, it should be noted that the specific value of any of the characteristics of any element of the embodiment is provided to within engineering tolerances. Engineering tolerances as utilized herein include the tolerances within which elements can be procured and the tolerances within which the design performs the desired function.

As used herein "a" means one or more unless otherwise indicated.

As used throughout the specification and claims, the term "beamsplitter" means a partially reflecting optical element that can both transmit and reflect incident light, including but not limited to a partially reflecting mirror, a pellicle, or an optical coating or layer.

As used throughout the specification and claims, the term "whole beam" means utilizing light from the entire spatial cross-sectional area (e.g. width and height) of an optical beam in each of the inputs and outputs such that each output beam does not exhibit parallax error with respect to the other output beam(s). For example, a "whole beam" beamsplitter is one that splits the entire cross-section of an input beam into two or more output beam portions, each of which utilizes light from the entire cross-sectional area of the input beam.

As used throughout the specification and claims, the term "beam portion" means an optical beam which has been reflected from, or transmitted through, a beamsplitter, for example a whole beam broad spectrum beamsplitter or a whole beam broad spectrum HDRI beamsplitter.

As used throughout the specification and claims, the term "light level" means the radiant power of a light beam used to form an entire image.

As used throughout the specification and claims, the term "image sensor" means a detector, optical detector, sensor, CMOS sensor, CCD sensor, linear detector array, film, celluloid, or any other optically sensitive medium or device.

As used throughout the specification and claims, the term "CFA image sensor" means an image sensor which comprises or is used in conjunction with a color filter array (CFA) or color filter mosaic (CFM).

As used throughout the specification and claims, the term "processor" means a computer processor, a microprocessor, a digital processor, an image processor, a field programmable gate array (FPGA), a graphics processing unit (GPU), a central processing unit (CPU), image editing device, film or video editing device, and the like.

As used throughout the specification and claims, the term "image-forming beam" means a beam of optical radiation that is converging on a plane in space, and which, if left unimpeded or unaltered for a finite distance, would form a real image at that plane.

As used throughout the specification and claims, when referring to two numeric values, the term "within an order of magnitude" means that the ratio of the larger value to the smaller value is less than 10. For example, the numeric values 75 and 8 are considered within an order of magnitude.

As used throughout the specification and claims, the term "wavelength range of interest" means the total range of wavelength values that is able to (1) pass through the optics, lenses, coatings, and beamsplitters, and (2) be detected by all the image sensors, in a particular system.

As used throughout the specification and claims, the term "wavelength-averaged" means the average of all values of a wavelength-dependent function taken over the wavelength range of interest.

As used throughout the specification and claims, when referring to a beamsplitter, the term "non-dichroic" means that the beamsplitter's transmittance at any given wavelength in the wavelength range of interest is within an order of magnitude of the beamsplitter's wavelength-averaged transmittance value, and that the beamsplitter's reflectance at any given wavelength in the wavelength range of interest is within an order of magnitude of the beamsplitter's wavelength-averaged reflectance value.

As used throughout the specification and claims, when referring to a beamsplitter, the term "non-polarizing" means that the beamsplitter's wavelength-averaged transmittance values for s-polarization light and for p-polarization light are within an order of magnitude of each other, and the beamsplitter's wavelength-averaged reflectance values for s-polarization light and for p-polarization light are within an order of magnitude of each other.

As used throughout the specification and claims, the term "broad spectrum beamsplitter" means a beamsplitter that is non-polarizing and non-dichroic and whose reflected and transmitted beam portions are substantially identical, so that substantially identical images may be produced by its reflected and transmitted beam portions.

As used throughout the specification and claims, the term "broad spectrum HDRI beamsplitter" means a beamsplitter that is non-polarizing and non-dichroic and whose reflected and transmitted beam portions are substantially identical except for their light levels, so that images produced by its reflected and transmitted beam portions may be substantially identical except for their light levels. Thus, for example, two images produced by a broad spectrum HDRI beamsplitter appear to a standard human observer to be generally identical except that one image appears to be, overall, darker than the other.

As used throughout the specification and claims, the term "effectively collimated" in reference to an image beam means that the image beam has a maximum divergence or convergence half-angle of less than approximately 20 degrees. That is, the maximum angle between the optical axis and the propagation direction of any ray within an effectively collimated image beam is less than approximately 20 degrees.

As used throughout the specification and claims, the term "substantially identical" means that any differences in optical properties, including but not limited to line-of-sight direction, overall color composition, spatial image composition, spatial structure, geometric aberrations, diffraction aberrations, chromatic aberrations, geometric image distortion, light level, focus, and magnification, are at least sufficiently small so as not to be generally discernable by a standard human observer. For example, two images are considered "substantially identical" if the sum of all differences between the images is smaller than the size of the greater of (a) the pixel size of the system image sensor; or (b) the diffraction Airy disc size for the system. For the purposes of the present invention, substantially identical images may be reflected about an axis and/or rotated with respect to one another and still be considered substantially identical. Thus two images are considered "substantially identical" if they appear to a standard human observer to be generally identical except, for example, that one image is a mirror image of the other.

As used throughout the specification and claims, the term "intermediate image plane" means a virtual plane in space where light has been caused by preceding optical elements to form a real image.

As used throughout the specification and claims, when referring to a beamsplitter, the term "thin" means that a beamsplitter is sufficiently thin so that any optical aberrations the beamsplitter adds to the system are lesser in extent or smaller than the aberrations inherent in the system when the beamsplitter is not present. That is, any such aberrations are sufficiently minimized so that the system can form substantially identical images if desired.

FIG. 1A is a schematic diagram of embodiment 100 of the present invention which utilizes a pair of beamsplitters to split the light from a single imaging system so as to produce three spatially-identical images on three separate detector planes. Referring to FIG. 1A, optical radiation 110 preferably from an object (not shown) is incident on imaging lens system 112. Any imaging or image forming lens system may be used in this embodiment of the invention. For example, any of the camera lenses manufactured by Nikon, Olympus, Panavision, or Thales Angenieux may be used as imaging lens system 112. If the back focal length of a desired camera lens is too short for use with the present invention, imaging lens system 112 may optionally include a re-imaging lens. For another example, imaging lens system 112 may comprise a cinematography camera lens manufactured by Zeiss, followed by an optional field stop (simply a rectangular aperture designed to block stray light rays), followed by a re-imaging lens, provided that the entire combination of lenses and apertures ultimately forms a real image. It may be advantageous to use such a combination of lenses and apertures to provide blocking of stray light or to provide a longer back focal length than might otherwise be obtained using a camera lens alone. The precise design, positioning, sizing, and specification of the lenses and apertures comprising such an imaging lens system 112 are typically straightforward matters for those skilled in the art of lens design and imaging lens system correction. Such an imaging lens system, for example one comprising a re-imaging lens, may be utilized in any of the embodiments disclosed herein.

Image-forming beam 114 exits the imaging lens system 112 as a converging image beam and is incident on beamsplitter 118, preferably oriented at a 45-degree angle to the path of image-forming beam 114, although any angle in the range between 0 and 180 degrees may be used.

Beamsplitter 118 is preferably thin; for example it may be 0.5 mm thick and made of glass with flat and parallel front and back surfaces; or it may comprise a so-called "pellicle" beamsplitter, such as Part Number NT39-482 from Edmund Optics. In practice, it has been found that, in order to minimize aberrations sufficiently to form substantially identical images, beamsplitter 118 should preferably be thin, since geometric aberrations caused by the tilted glass/air interfaces of beamsplitter 118 increase in size as the thickness of beamsplitter 118 increases. In some embodiments, as a general measure, the beamsplitter thickness is preferably less than approximately 100 times the greater of either of these two values: (a) the pixel width of an individual pixel in an image sensor; or (b) the diffraction spot size, or Airy disc diameter, of the imaging lens system or front lens of the system.

As a result of this beamsplitter arrangement, first transmitted beam portion 120 continues toward image sensor 116, where it forms an image, and first reflected beam portion 122 is reflected toward and is incident on beamsplitter 124, which is preferably oriented perpendicular to first reflected beam portion 122. As a result, second transmitted beam portion 126 forms an image on image sensor 128, while second reflected beam portion 130 returns toward beamsplitter 118, which transmits third transmitted beam portion 132 which forms an image on image sensor 134.

In order to avoid vignetting (obscuration of a portion of light reaching a detector) of image-forming beam 114, the distance D1 between the back of imaging lens system 112 and the center of beamsplitter 118, distance D2 between the center of beamsplitter 118 and the center of beamsplitter 124, and the distance D3 between the center of beamsplitter 118 and the center of image sensor 134 are each preferably greater than or equal to one-half of the diameter of image forming beam 114. Unless variations in focus are desired (as discussed below), the total optical path length traveled by the image forming beam 114 is preferably the same when measured over its total path to each of image sensors 116, 128, and 134. In that case the distance between the center of beamsplitter 118 and the center of image sensor 116 is equal to [D3+(2*D2)], and the distance between the center of beamsplitter 124 and the center of image sensor 128 is equal to [D2+D3]. Furthermore, the back focal distance, which is the distance between the back of the imaging lens system 112 and its natural focal plane, is preferably approximately equal to [D1+(2*D2)+D3]. In this case, the images formed on each of the image sensors are substantially identical, preferably except for different light levels, as described next.

The portion of the radiant power of the original image forming beam 114 that is present in the image formed on image sensor 116 is equal to (1-R1-A1), where R1 is the reflectance and A1 is the absorbance of beamsplitter 118. The value of R1 may be chosen to be anything in the range between 0 and 1.0. The portion of the radiant power of the original image forming beam 114 that is present in the image formed on image sensor 128 is equal to [R1*(1-R2-A2)], where R2 is the reflectance and A2 is the absorbance of beamsplitter 124. The value of R2 may be chosen to be anything in the range between 0 and 1.0. The portion of the radiant power of the original image forming beam 114 that is present in the image formed on image sensor 134 is equal to [R1*R2*(1-R1-A1)]. With these three equations, any set of light level ratios between the image sensor 116, image sensor 128, and image sensor 134 may be achieved by selecting the proper values for R1 and R2.

For example, if it is desired to achieve a light level ratio between image sensor 116 and image sensor 128 of 2:1, and a light level ratio between image sensor 116 and image sensor 134 of 4:1, and the absorbance of the two beamsplitters is zero, then the optimum reflectance value R1 equals 0.50 and the optimum reflectance value R2 equals 0.50. Alternatively, if it is desired to achieve a light level ratio between image sensor 116 and image sensor 128 of 10:1, and a light level ratio between image sensor 116 and image sensor 134 of 100:1, and the absorbance of the two beamsplitters is zero, then the optimum reflectance value R1 equals 0.10 and the optimum reflectance value R2 equals 0.10. Or, if it is desired to achieve a light level ratio between image sensor 116 and image sensor 128 of 3:1, and a light level ratio between image sensor 116 and image sensor 134 of 5:1, and the absorbance of the two beamsplitters is zero, then the optimum reflectance value R1 equals 0.40 and the optimum reflectance value R2 equals 0.50.

The coatings used on the beamsplitters are preferably non-polarizing. However, in some cases it may be desirable to reduce any polarization effects that might be inherent in the beamsplitters, even if the beamsplitters are considered non-polarizing. To help mitigate possible polarization effects of the beamsplitters, a polarization-affecting element 136 may optionally be placed anywhere in the incoming beam 110 or in the image forming beam 114 or inside the camera lens 112. Examples of polarization-affecting elements 136 that may be used are such things as a quarter-wave plate, a half-wave plate, a circular polarizer, an elliptical polarizer, or any other of the class of polarization-affecting elements, including but not limited to any element which disrupts or converts linear polarized light to light which has a non-linear polarization. This polarization-affecting element 136 is applicable to, and may optionally be added to, any of the embodiments of the present invention described herein.

In another example it is useful that the light levels of the images on each of the image sensors are equal. Thus if it is desired to achieve a light level ratio between image sensor 116 and image sensor 128 of 1:1, and a light level ratio between image sensor 116 and image sensor 134 of 1:1, and the absorbance of the two beamsplitters is zero, then the optimum reflectance value R1 equals 0.90 and the optimum reflectance value R2 equals 0.90. In this case, each of the three image sensors 116, 128, and 134 capture substantially identical images with substantially identical light levels.

When all three image sensors are caused to capture substantially identical images with substantially identical light levels, the moment of image capture for each of the three individual image sensors 116, 128, and 134 may optionally be precisely staggered in such a way that the individual movie frames successively captured by each of the three image sensors may be interleaved, thereby providing a moving image film with triple the framerate of any one image sensor. The invention may be extended to larger numbers of image sensors, and in such a way may be used to increase the framerate by a factor of 4, 5, 6, or more times the framerate of one individual image sensor, thereby enabling a camera having a normal framerate to be used as a super high-speed camera. This high speed camera application is applicable to all of the embodiments of the present invention described herein.

Figure 1B:
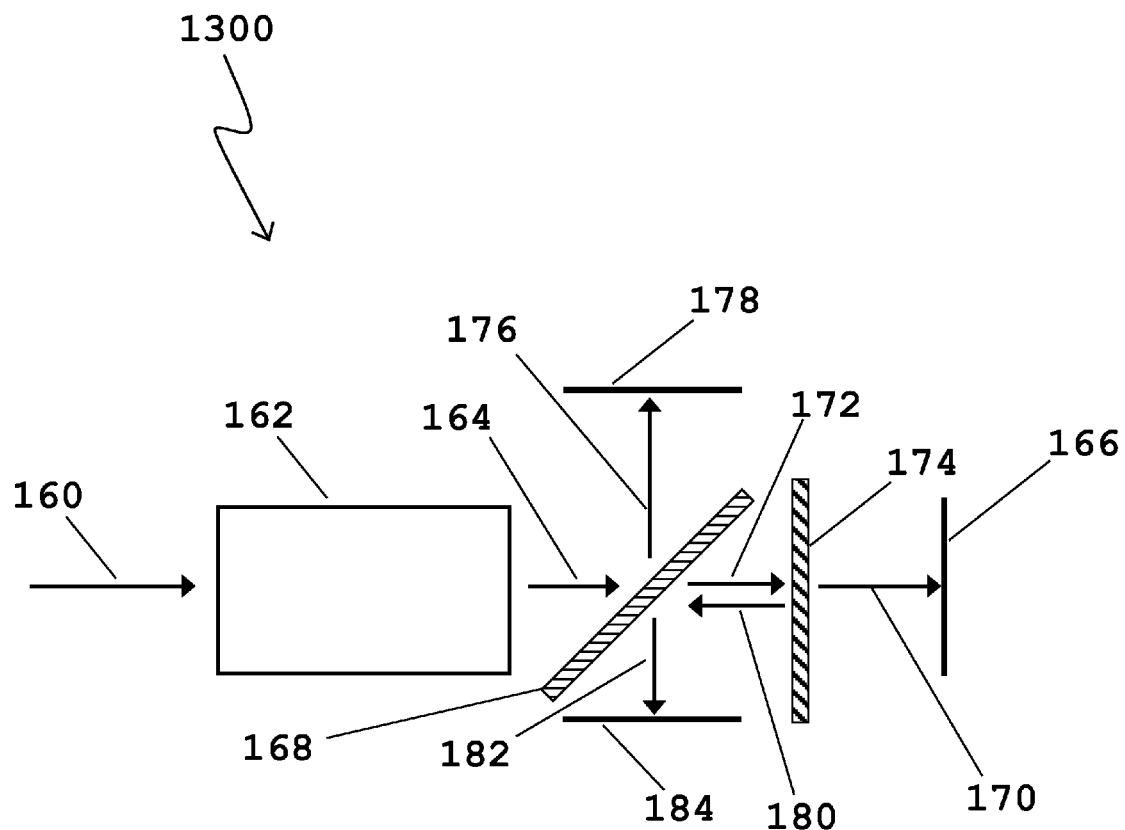
FIG. 1B is a schematic of an embodiment of the present invention comprising two beamsplitters.

FIG. 1B is a schematic diagram of embodiment 1300 of the present invention. Referring to FIG. 1B, optical radiation 160 preferably from an object (not shown) is incident on imaging lens system 162. Image-forming beam 164 exits the imaging lens system 162 as a converging image beam and is incident on beamsplitter 168, preferably oriented at a 45-degree angle to the path of image-forming beam 164, although any angle in the range between 0 and 180 degrees may be used. Beamsplitter 168 is preferably thin; for example it may be 0.5 mm thick and comprise glass with flat and parallel front and back surfaces; or alternatively it may comprise a so-called "pellicle" beamsplitter, such as Part Number NT39-482 from Edmund Optics.

As a result of this beamsplitter arrangement, first reflected beam portion 176 is directed toward image sensor 178, where it forms an image, and first transmitted beam portion 172 is incident on beamsplitter 174, which is preferably oriented perpendicular to first transmitted beam portion 172. As a result, second transmitted beam portion 170 forms an image on image sensor 166, while second reflected beam portion 180 returns toward beamsplitter 168, which reflects third reflected beam portion 182, which forms an image on image sensor 184.

In order to avoid vignetting (obscuration of a portion of light reaching a detector) of image-forming beam 164, the distance D1 between the back of imaging lens system 162 and the center of beamsplitter 168, distance D2 between the center of beamsplitter 168 and the center of beamsplitter 174, and the distance D3 between the center of beamsplitter 168 and the center of image sensor 184 are each preferably greater than or equal to one-half of the diameter of image forming beam 164. Unless variations in focus are desired (as discussed below), the total optical path length traveled by the image forming beam 164 is preferably the same when measured over its total path to each of image sensors 166, 178, and 184. In that case the distance between the center of beamsplitter 168 and the center of image sensor 176 is equal to [D3+(2*D2)], and the distance between the center of beamsplitter 174 and the center of image sensor 166 is equal to [D2+D3]. Furthermore, the back focal distance, which is the distance between the back of the imaging lens system 112 and its natural focal plane, is preferably approximately equal to [D1+(2*D2)+D3]. In this case, the images formed on each of the image sensors are substantially identical, preferably except for different light levels, as described next.

The portion of the radiant power of the original image forming beam 164 that is present in the image formed on image sensor 178 is equal to R1, where R1 is the reflectance of beamsplitter 168. The value of R1 may be chosen to be anything in the range between 0 and 1.0. The portion of the radiant power of the original image forming beam 164 that is present in the image formed on image sensor 128 is equal to [(1-R1-A1)*(1-R2-A2)], where A1 is the absorbance of beamsplitter 168, and R2 is the reflectance and A2 is the absorbance of beamsplitter 174. The value of R2 may be chosen to be anything in the range between 0 and 1.0. The portion of the radiant power of the original image forming beam 114 that is present in the image formed on image sensor 184 is equal to [R1*R2*(1-R1-A1)]. With these three equations, any set of light level ratios between the image sensor 116, image sensor 128, and image sensor 134 may be achieved by selecting the proper values for R1 and R2.

As can be seen, embodiment 1300 is similar to embodiment 100 except that beamsplitter 174 splits first transmitted beam portion 172 instead of first reflected beam portion 176. Embodiment 1400 is a similar variation on embodiment 600. Thus the present invention may be realized by similar variations in the order or arrangement of the beamsplitters in any of the embodiments described herein.

Figure 2:
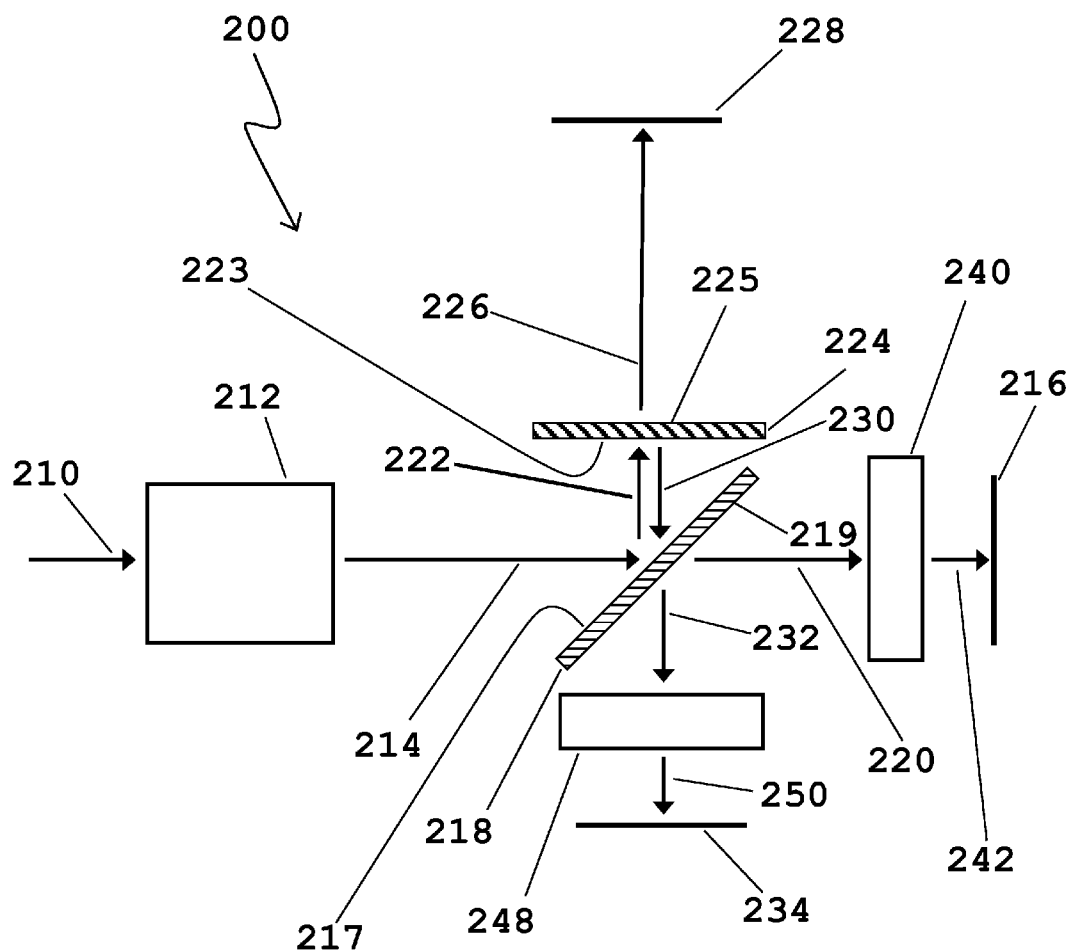
FIG. 2 is a schematic of the embodiment shown in FIG. 1A comprising additional corrective lenses.

FIG. 2 is a schematic diagram of embodiment 200 of the present invention. Referring to FIG. 2, optical radiation 210 preferably from an object (not shown) is incident on imaging lens system 212. Image-forming beam 214 exits imaging lens system 212 as a converging image beam and is incident on beamsplitter 218, which is preferably oriented at a 45-degree angle to the path of image-forming beam 214, although any angle in the range between 0 and 180 degrees may be used. As a result, first transmitted beam portion 220 continues toward image sensor 216, and first reflected beam portion 222 is reflected toward beamsplitter 224, which is preferably oriented perpendicular to first reflected beam portion 222. As a result, second transmitted beam portion 226 passes through beamsplitter 224 and forms an image on image sensor 228. Second transmitted beam portion 226 typically does not need to pass through a corrective lens system since neither it nor light beams 210, 214, or 222 ever pass through tilted beamsplitter 218.

First transmitted beam portion 220 passes through first corrective lens system 240, and corrected beam 242 forms an image on image sensor 216. Corrective lens system 240 is preferably designed to adapt to the particularities of imaging lens system 212 in conjunction with beamsplitter 218 and in conjunction with the particular distance traveled by the light beams 214 and 220, in order to ensure that a good quality image is formed on image sensor 216. The exact design of corrective lens system 240 typically depends upon the design of the imaging lens system 212 and on the material and thickness of beamsplitter 218. The design of corrective lens system 240 is typically a straightforward matter for those skilled in the art of lens design and imaging lens system correction. Corrective lens system 240 is preferably coated, on all optical surfaces, with anti-reflective coatings.

Beamsplitter 218 is preferably coated on its first surface 217 with a partially-reflecting broadband coating, and is preferably coated on its second surface 219 with an anti-reflective coating. Beamsplitter 224 is preferably coated on its first surface 223 with a partially-reflecting coating, and preferably coated on its second surface 225 with an anti-reflective coating.

Second reflected beam portion 230 is transmitted through beamsplitter 218. As a result, third transmitted beam portion 232 passes through second corrective lens system 248. Corrected beam 250 then forms an image on image sensor 234. Corrective lens system 248 is preferably designed to adapt to the particularities of the imaging lens system 212 in conjunction with beamsplitter 218, and in conjunction with the particular distance traveled by the light beams 214, 222, 230, and 232, in order to ensure that a good quality image is formed on image sensor 234. The exact design of corrective lens system 248 may depend upon the design of the imaging lens system 212 and on the material and thickness of beamsplitter 218.

The design of corrective lens system 248 is typically a straightforward matter for those skilled in the art of lens design and imaging lens system correction. Corrective lens system 248 is preferably coated, on all optical surfaces, with anti-reflective coatings.

Corrective lens systems 240 and 248 are intended to correct the aberrations (including but not limited to astigmatism and/or coma) induced by passage of image forming beam 214 through beamsplitter 218, which typically comprises (or can be thought of as) a tilted flat plate of glass surrounded by air. The presence of corrective lens systems 240 and 248 enables beamsplitter 218 to be thicker and therefore more rugged, since pellicles and other thin beamsplitters are typically very fragile. The design of such corrective lens systems is a straightforward matter for those skilled in the art of lens design. For optimal performance, corrective lens systems 240 and 248 are preferably different from one another in form and function, each being individually designed to correct the beam at its particular location. However, this is not necessary for the function of this embodiment and it is possible to have good correction using corrective lens systems 240 and 248 that are identical in form and/or function. Because corrective lens system 240 is preferably designed in such a way that it is complementary to imaging lens system 212 together with the tilted flat glass plate represented by beamsplitter 218, imaging lens system 212, beamsplitter 218 and first corrective lens system 240 collectively form an imaging system that produces a good image on image sensor 216. Likewise, imaging lens system 212, beamsplitter 218, and second corrective lens system 248 collectively form an imaging system that produces a good image on image sensor 234. The images formed on the image sensors 216, 228, and 234 are all preferably substantially identical except for different light levels (or alternatively different focuses, as described below).

Figure 3:
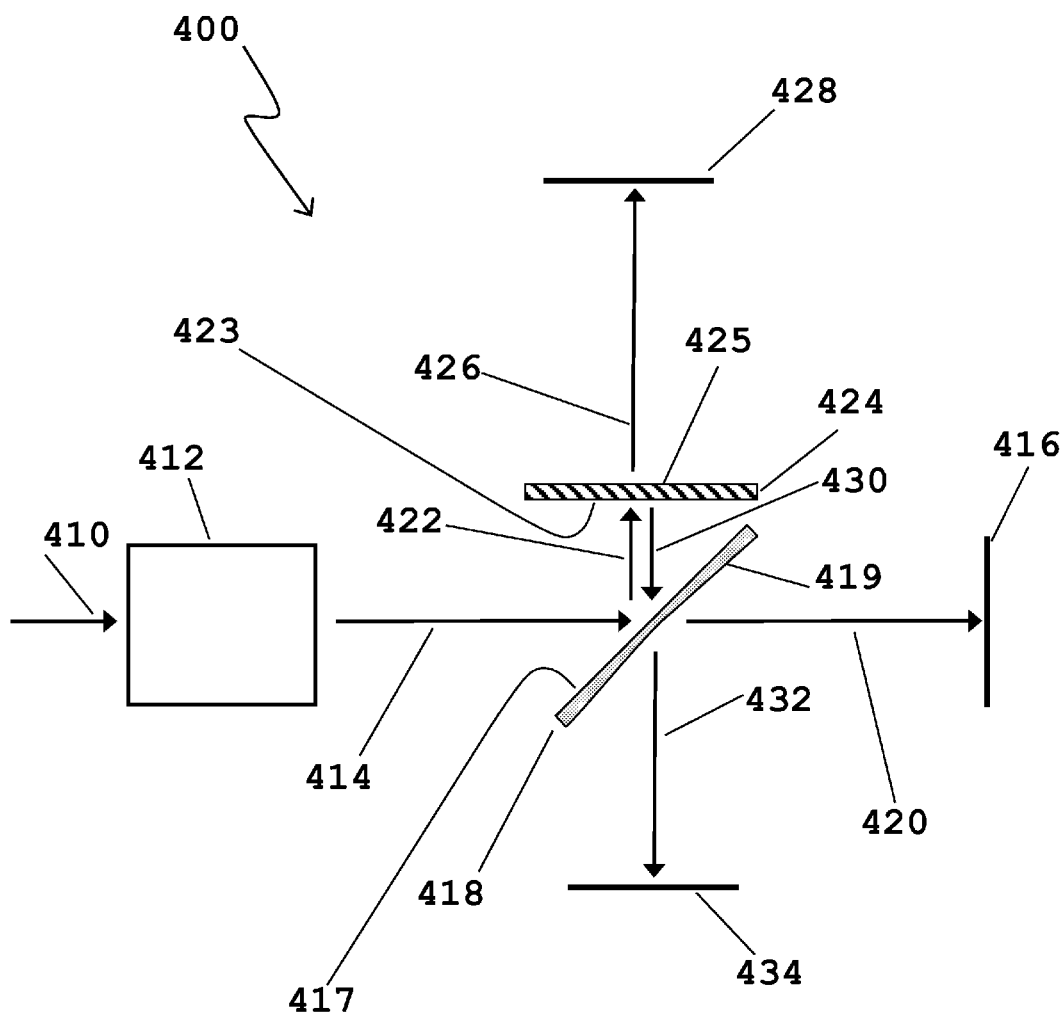
FIG. 3 is a schematic of the embodiment shown in FIG. 1A wherein one of the beamsplitters is shaped to correct aberrations.

FIG. 3 is a schematic diagram of embodiment 400 of the present invention. Referring to FIG. 3, optical radiation 410 preferably from an object (not shown) is incident on imaging lens system 412. Image-forming beam 414 exits imaging lens system 412 and is incident on beamsplitter 418, which is preferably oriented at a 45-degree angle to the path of image-forming beam 414, although any angle in the range between 0 and 180 degrees may be used. As a result, first transmitted beam portion 420 continues on its path toward image sensor 416, and first reflected beam portion 422 is reflected toward beamsplitter 424. After passing through beamsplitter 418, first transmitted beam portion 420 forms a first sub-image on image sensor 416. First reflected beam portion 422 next is incident on beamsplitter 424, which is preferably oriented perpendicular to first reflected beam portion 422. As a result, second transmitted beam portion 426 passes through beamsplitter 424 and forms an image on image sensor 428, while second reflected beam portion 430 passes through beamsplitter 418. As a result, third transmitted beam portion 432 forms an image on image sensor 434.

Beamsplitter 424 preferably comprises a flat glass or plastic window with parallel optical faces, or may alternatively comprise a so-called "pellicle" beamsplitter, such as Part Number NT39-482 from Edmund Optics. Beamsplitter 424 is preferably coated on its first surface 423 with a partially-reflecting coating, and preferably coated on its second surface 425 with an anti-reflective coating. Beamsplitter 418 is also preferably coated on its front surface 417 with a partially-reflecting broadband coating, and coated on its back surface 419 with an anti-reflective coating. In this embodiment 400, beamsplitter 418 preferably comprises a flat front surface 417 and a curved back surface 419. The exact shape of the curved back surface 419 is preferably designed so that it corrects (or at least partially corrects) the aberrations imparted by beamsplitter 418 onto the two transmitted image-forming beam portions 420 and 432. This enables beamsplitter 418 to be thicker, and therefore more rugged, while eliminating the need for corrective lens systems such as those used in embodiment 200. The design of such corrective lens shapes is a straightforward matter for those skilled in the art of lens design.

Figure 4:
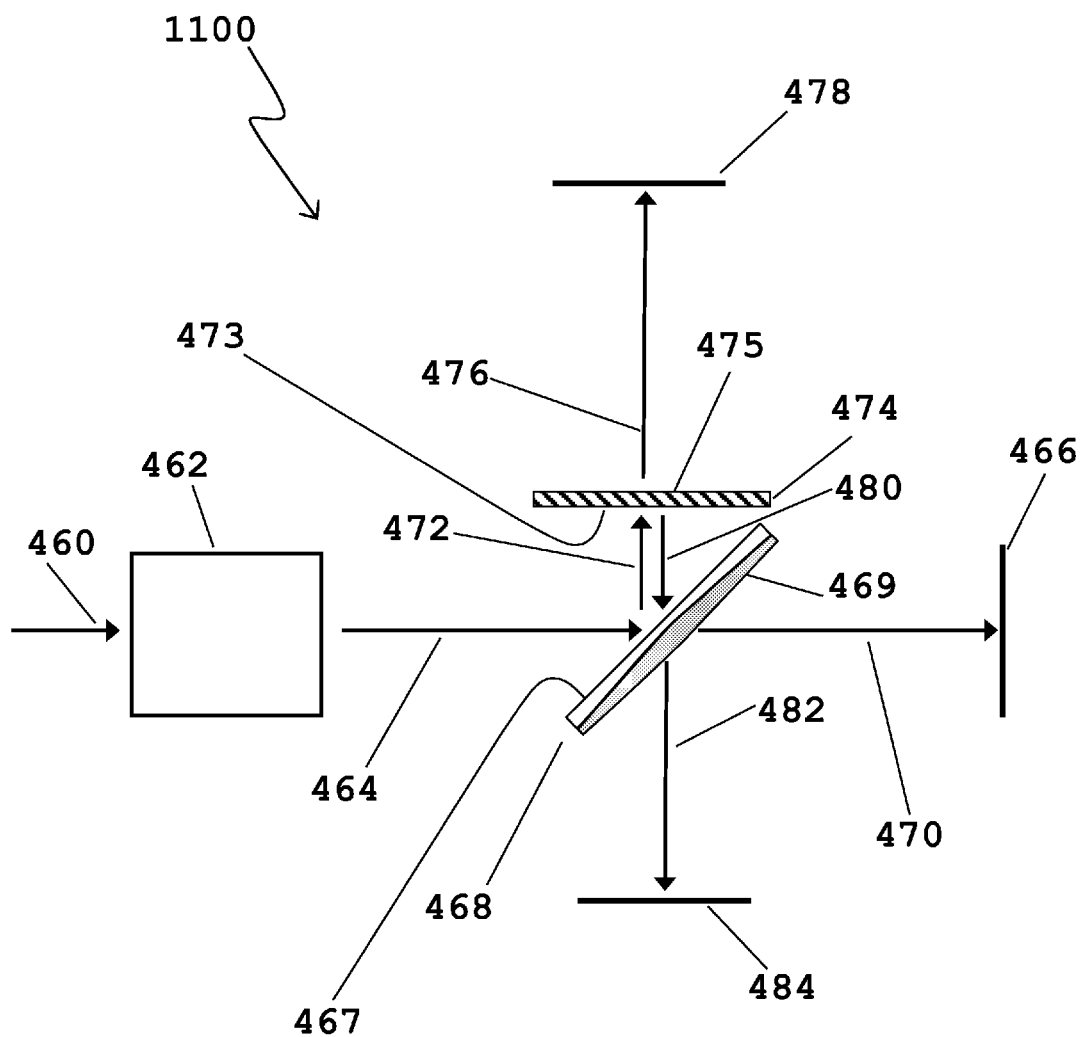
FIG. 4 is a schematic of the embodiment shown in FIG. 1A wherein one of the beamsplitters comprises a doublet beamsplitter.

FIG. 4 is a schematic diagram of embodiment 1100 of the present invention. Referring to FIG. 4, optical radiation 460 preferably from an object (not shown) is incident on imaging lens system 462. Image-forming beam 464 exits imaging lens system 462 as a converging image beam and is incident on beamsplitter 468, which is preferably oriented at a 45-degree angle to the path of image-forming beam 464, although any angle in the range between 0 and 180 degrees may be used. After passing through beamsplitter 468, first transmitted beam portion 470 forms an image on image sensor 466, and first reflected beam portion 472 is reflected toward and is incident on beamsplitter 474, which is preferably oriented perpendicular to first reflected beam portion 472. As a result, second transmitted beam portion 476 passes through beamsplitter 474, and forms a second image on image sensor 478, while second reflected beam portion 480 passes through beamsplitter 468. As a result, third transmitted beam portion 482 forms an image on image sensor 484.

Beamsplitter 474 preferably comprises a flat glass or plastic window with parallel optical faces, and is preferably coated on its first surface 473 with a partially-reflecting coating, and preferably coated on its second surface 475 with an anti-reflective coating. Alternatively, beamsplitter 474 may comprise a so-called "pellicle" beamsplitter, such as Part Number NT39-482 from Edmund Optics. Beamsplitter 468 preferably comprises two different glass types bonded together in a manner similar to the one in which two different glass types are bonded or cemented together to form an achromatic doublet lens. The advantage to be gained by using such a bonded doublet beamsplitter is that it can be designed in such a way as to help correct chromatic aberrations. The design of such achromatic doublets is a straightforward matter those skilled in the art of lens design. More than two different glass types may alternatively be bonded together to form a triplet (or greater number of elements) lens.

Beamsplitter 468 preferably comprises a flat front surface 467 and a curved back surface 469. The exact shape of back surface 469 is preferably designed so that it corrects (or at least partially corrects) the aberrations imparted by beamsplitter 468 onto the two image-forming transmitted beam portions 470 and 482. The design of such corrective lens shapes is a straightforward matter for those skilled in the art of lens design. Beamsplitter 468 is preferably coated on its front surface 467 with a partially-reflecting broadband coating, and preferably coated on its back surface 469 with an anti-reflective coating.

Because of similar geometries, the reflectance equations of embodiment 100 may be applied to embodiments 200, 400, and 1100 as well.

Figure 5A:
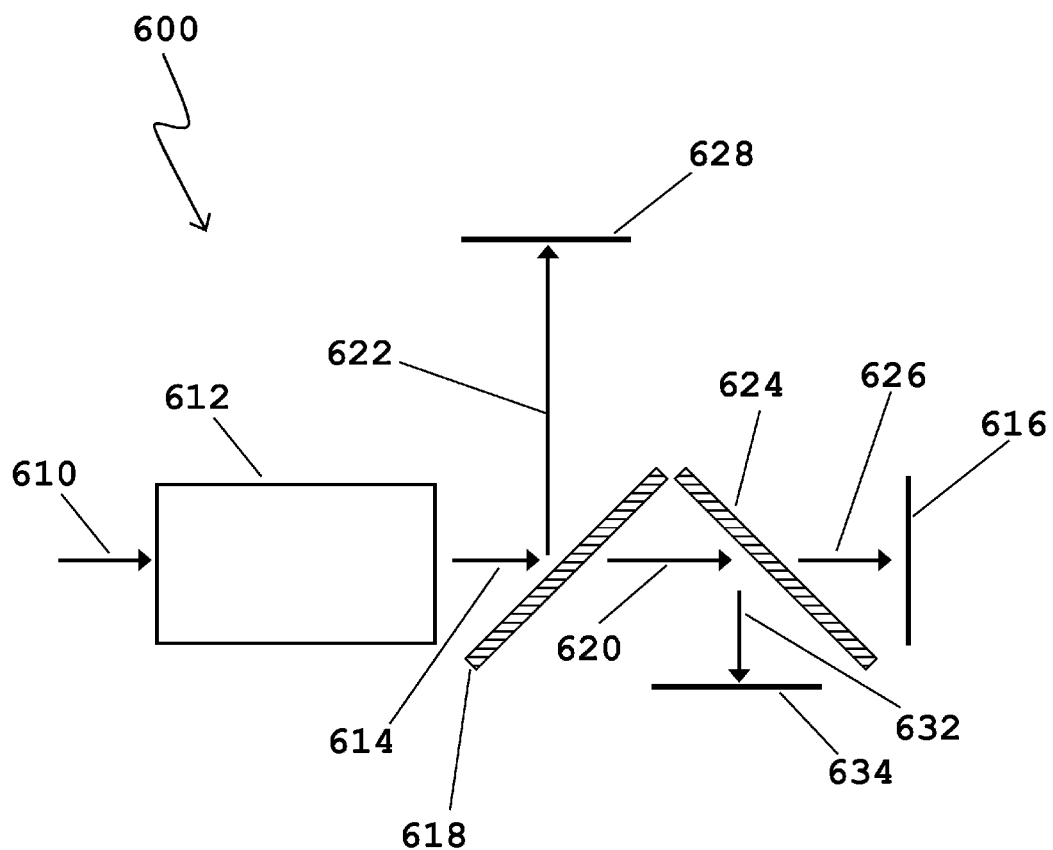
FIG. 5A is a schematic of another embodiment of the present invention comprising two beamsplitters.

FIG. 5A illustrates a schematic diagram of embodiment 600 of the present invention. Referring to FIG. 5A, optical radiation 610 preferably from an object (not shown) is incident on imaging lens system 612. Any imaging lens system may be used in this embodiment of the invention. For example, any of the camera lenses manufactured by Nikon, Olympus, Panavision, or Thales Angenieux may be used as the imaging lens system 612. Image-forming light 614 exits imaging lens system 612 as a converging image beam and is incident on beamsplitter 618, which is preferably oriented at a 45-degree angle to the path of image-forming beam 614, although any angle in the range between 0 and 180 degrees may be used. Image-forming beam 614 that is incident on beamsplitter 618 is partially reflected and partially transmitted. First reflected beam portion 622 forms an image on image sensor 628. First transmitted beam portion 620 is incident on beamsplitter 624, which is preferably oriented at a 45-degree angle to the path of first transmitted beam portion 620, although any angle in the range between 0 and 180 degrees may be used, and at a ninety degree angle to beamsplitter 618, although any angle in the range between 0 and 180 degrees may be used. As a result of this beamsplitter arrangement, second reflected beam portion 632 forms a second image on image sensor 634. Second transmitted beam portion 626 forms an image on image sensor 616.

Beamsplitters 618, 624 are preferably thin. For example they may be 0.5 mm thick and comprise glass with flat and parallel front and back surfaces, or alternatively may comprise a so-called "pellicle" beamsplitter, such as Part Number NT39-482 from Edmund Optics. In practice, it has been found that, in order to ensure substantially identical images, the thickness of each beamsplitter 618, 624 is preferably less than approximately 100 times the greater of either of these two values: (a) the pixel width of an individual pixel in image sensor 616; or (b) the diffraction spot size—or Airy disc diameter—of imaging lens system 612. The reason for this thickness constraint is that geometric aberrations caused by the tilted glass/air interfaces of beamsplitters 618, 624 increase in size as the thickness of beamsplitters 618, 624 increases.

In this embodiment 600, in order to avoid vignetting of image-forming beam 614, the distance D1 between the back of imaging lens system 612 and the center of beamsplitter 618 is preferably greater than or equal to one-half of the diameter of image forming beam 614. The distance D2 between the center of beamsplitter 618 and the center of beamsplitter 624 is preferably greater than or equal to the diameter of the image forming beam 614. The distance D3 between the center of beamsplitter 624 and the center of image sensor 616 is preferably greater than or equal to one-half of the diameter of image forming beam 614. For most applications, the total optical path length traveled by the image forming beam 614 is preferably the same when measured over its total path to each of the image sensors 628, 616, and 634. Thus the distance between the center of beamsplitter 618 and the center of image sensor 628 is preferably equal to (D3+D2) and the distance between the center of beamsplitter 624 and the center of image sensor 634 is preferably equal to D3. Furthermore, the back focal distance, which is the distance between the back of the imaging lens system 612 and its natural focal plane, is preferably approximately equal to (D1+D2+D3). In this case, the images formed on each of the image sensors are substantially identical, preferably except for different light levels, as described next.

Of the radiant power of the original image forming beam 614, the portion that is present in the image formed on image sensor 628 is equal to R1, where R1 is the reflectance of beamsplitter 618. The value of R1 may be chosen to be anything in the range between 0 and 1.0. Of the radiant power of the original image forming beam 614, the portion that is present in the image formed on image sensor 634 is equal to [R2*(1-R1-A1)], where A1 is the absorbance of beamsplitter 618 and R2 is the reflectance of beamsplitter 624. The value of R2 may be chosen to be anything in the range between 0 and 1.0. Of the radiant power of the original image forming beam 614, the portion that is present in the image formed on image sensor 616 is equal to [(1-R2-A2)*(1-R1-A1)], where A2 is the absorbance of beamsplitter 624. With these three equations, any set of light level ratios between the image sensors 628, 634, and 616 may be achieved by selecting the proper values for R1 and R2.

For example, if it is desired to achieve a light level ratio between image sensor 628 and image sensor 634 of 2:1, and a light level ratio between image sensor 628 and image sensor 616 of 4:1, and the absorbance of the two beamsplitters is zero, then the optimum reflectance value R1 equals 0.5714 and the optimum reflectance value R2 equals 0.6667. Alternatively, if it is desired to achieve a light level ratio between image sensor 628 and image sensor 634 of 10:1, and a light level ratio between image sensor 628 and image sensor 616 of 100:1, and the absorbance of the two beamsplitters is zero, then the optimum reflectance value R1 equals 0.901 and the optimum reflectance value R2 equals 0.909. Or, if it is desired to achieve a light level ratio between image sensor 628 and image sensor 634 of 3:1, and a light level ratio between image sensor 628 and image sensor 616 of 5:1, and the absorbance of the two beamsplitters is zero, then the optimum reflectance value R1 equals 0.6522 and the optimum reflectance value R2 equals 0.6249.

In another example, if it is desired to achieve a light level ratio between image sensor 628 and image sensor 634 of 1:1, and a light level ratio between image sensor 628 and image sensor 616 of 1:1, and the absorbance of the two beamsplitters is zero, then the optimum reflectance value R1 equals 0.3333 and the optimum reflectance value R2 equals 0.50. In this example, each of the three image sensors 628, 634, and 616 capture images with substantially identical light levels.

When all three image sensors are caused to capture images with substantially identical light levels, in contrast to the constraint of equal optical path lengths as described above, the total optical path length traveled by the image forming beam 614 may intentionally be made to be slightly different when measured over its total path to each of image sensors 628, 616, and 634, in order to provide an apparatus that simultaneously captures three images, substantially identical except for different focuses. Thus, the same scene is simultaneously captured in multiple images each having a different focus. In one application, a cameraman would not need to change focus during filming of a scene or during panning; the focus change (i.e. switching from one image having a first focus to another image having a second focus) could be made during post processing. Although this application may be accomplished with any of the embodiments described herein, it is easier to perform with the embodiments having two beamsplitters arranged at ninety degrees to one another (i.e. those shown in FIGS. 5, 6, 7, 13, and 17). (However, in FIG. 17, because the light beam is collimated over most of the path length, different focus of each image sensor is determined not by the total path length, but by the distance between each image sensor and the corresponding imaging lens. Alternatively, each imaging lens may be designed appropriately to provide a different focus, even if the distances between each image sensor and the corresponding imaging lens are the same.)

Figure 5B:
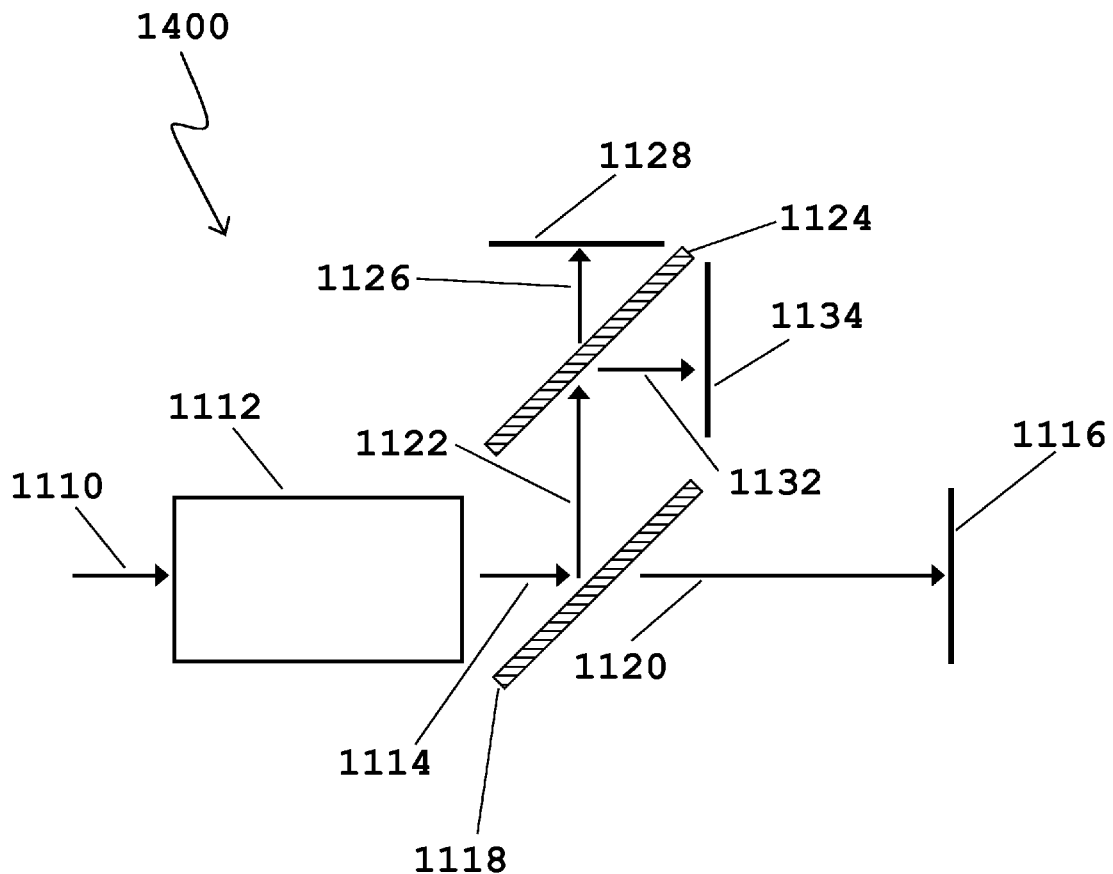
FIG. 5B is a schematic of another embodiment of the present invention comprising two beamsplitters.

FIG. 5B illustrates a schematic diagram of embodiment 1400 of the present invention. Referring to FIG. 5B, optical radiation 1110 preferably from an object (not shown) is incident on imaging lens system 1112. Image-forming light 1114 exits imaging lens system 1112 as a converging image beam and is incident on beamsplitter 1118, which is preferably oriented at a 45-degree angle to the path of image-forming beam 1114, although any angle in the range between 0 and 180 degrees may be used. Image-forming beam 1114 that is incident on beamsplitter 1118 is partially reflected and partially transmitted. First transmitted beam portion 1120 forms an image on image sensor 1116. First reflected beam portion 1122 is incident on beamsplitter 1124, which is preferably oriented at a 45-degree angle to the path of first reflected beam portion 1122, although any angle in the range between 0 and 180 degrees may be used, and at a ninety degree angle to beamsplitter 1118, although any angle in the range between 0 and 180 degrees may be used. As a result of this beamsplitter arrangement, second reflected beam portion 1132 forms a second image on image sensor 1134. Second transmitted beam portion 1126 forms an image on image sensor 1128.

Beamsplitters 1118, 1124 are preferably thin. For example they may be 0.5 mm thick and comprise glass with flat and parallel front and back surfaces, or alternatively may comprise a so-called "pellicle" beamsplitter, such as Part Number NT39-482 from Edmund Optics.

In this embodiment 1400, in order to avoid vignetting of image-forming beam 1114, the distance D1 between the back of imaging lens system 1112 and the center of beamsplitter 1118 is preferably greater than or equal to one-half of the diameter of image forming beam 1114. The distance D2 between the center of beamsplitter 1118 and the center of beamsplitter 1124 is preferably greater than or equal to the diameter of the image forming beam 1114. The distance D3 between the center of beamsplitter 1124 and the center of image sensor 1128 is preferably greater than or equal to one-half of the diameter of image forming beam 1114. For most applications, the total optical path length traveled by the image forming beam 1114 is preferably the same when measured over its total path to each of image sensors 1128, 1116, and 1134. Thus the distance between the center of beamsplitter 1118 and the center of image sensor 1116 is preferably equal to (D3+D2) and the distance between the center of beamsplitter 1124 and the center of image sensor 1134 is preferably equal to D3. Furthermore, the back focal distance, which is the distance between the back of the imaging lens system 1112 and its natural focal plane, is preferably approximately equal to (D1+D2+D3). In this case, the images formed on each of the image sensors are substantially identical, preferably except for different light levels, as described next.

Of the radiant power of the original image forming beam 1114, the portion that is present in the image formed on image sensor 1116 is equal to (1-R1-A1), where R1 is the reflectance and A1 is the absorbance of beamsplitter 1118. The value of R1 may be chosen to be anything in the range between 0 and 1.0. Of the radiant power of the original image forming beam 1114, the portion that is present in the image formed on image sensor 1134 is equal to [R2*R1], where R2 is the reflectance of beamsplitter 1124. The value of R2 may be chosen to be anything in the range between 0 and 1.0. Of the radiant power of the original image forming beam 1114, the portion that is present in the image formed on image sensor 1128 is equal to [(1-R2-A2)*R1], where A2 is the absorbance of beamsplitter 1124. With these three equations, any set of light level ratios between image sensors 1128, 1134, and 1116 may be achieved by selecting the proper values for R1 and R2.

Figure 6:
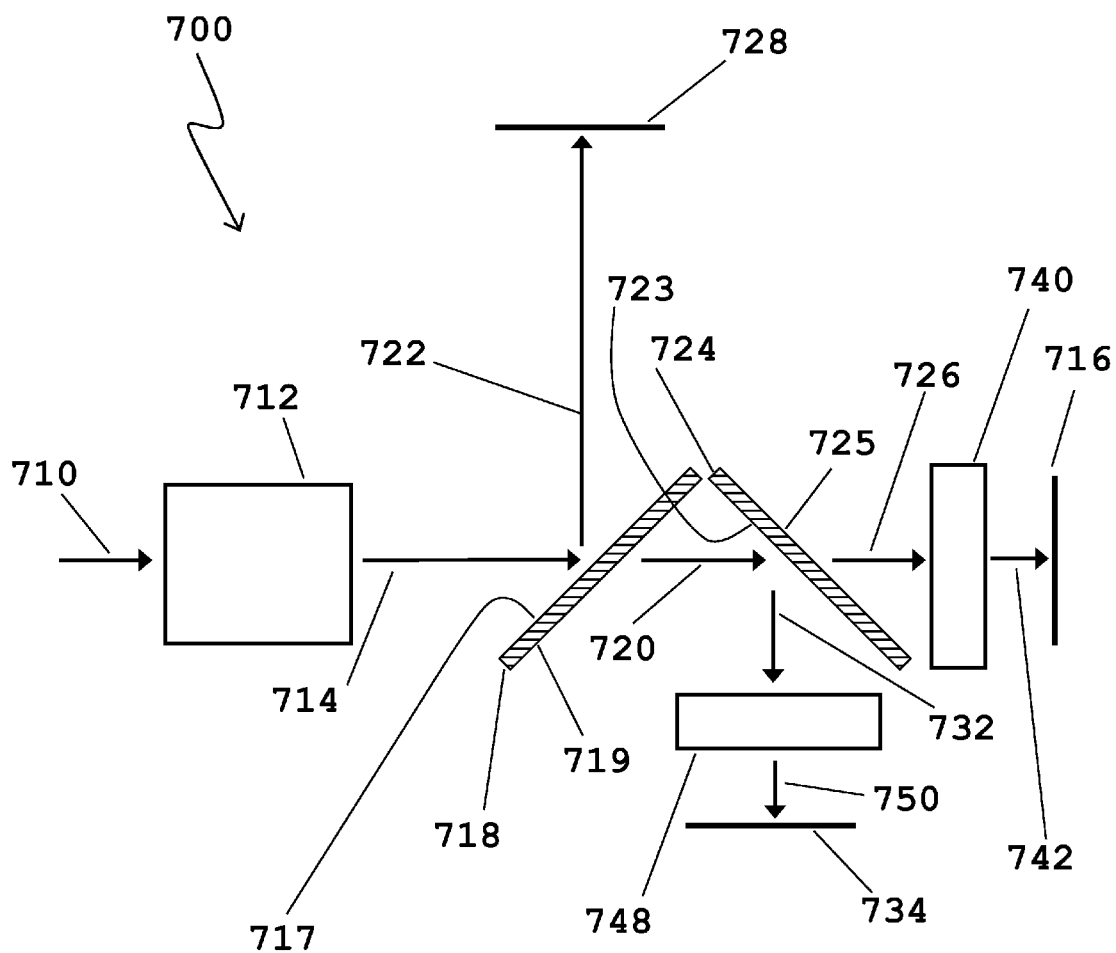
FIG. 6 is a schematic of the embodiment shown in FIG. 5A comprising additional corrective lenses.

FIG. 6 is a schematic diagram of embodiment 700 of the present invention. Referring to FIG. 6, optical radiation 710 preferably from an object (not shown) is incident on imaging lens system 712. Image-forming light 714 exits imaging lens system 712 as a converging image beam and is incident on beamsplitter 718, which is preferably oriented at a 45-degree angle to the path of image-forming light beam 714, although any angle in the range between 0 and 180 degrees may be used. As a result, first reflected beam portion 722 is reflected toward and forms an image on image sensor 728. First transmitted beam portion 720 is incident on beamsplitter 724, which is preferably oriented at a 45-degree angle to the path of first transmitted beam portion 720, although any angle in the range between 0 and 180 degrees may be used, and oriented at a ninety degree angle to beamsplitter 718, although any angle in the range between 0 and 180 degrees may be used, and forms second transmitted beam portion 726 second reflected beam portion 732.

Beamsplitter 718 is preferably coated on its first surface 717 with a partially-reflecting broadband coating, and preferably coated on its second surface 719 with an anti-reflective coating. Similarly, beamsplitter 724 is preferably coated on its first surface 723 with a partially-reflecting coating, and preferably coated on its second surface 725 with an anti-reflective coating.

Second transmitted beam portion 726 next passes through corrective lens system 740, and corrected beam 742 forms an image on image sensor 716. Corrective lens system 740 is preferably designed to adapt to the particularities of imaging lens system 712 in conjunction with the particular distance traveled by the light beam portions 714, 720, and 726, in order to ensure that a good quality image is formed on image sensor 716. The exact design of corrective lens system 740 will depend upon the design of imaging lens system 712 and on the materials and thicknesses of beamsplitters 718 and 724. Specifically, corrective lens system 740 is intended to correct the aberrations induced by passage of the image forming beam 714 through beamsplitters 718 and 724, which each may comprise or may be thought of as a tilted flat plate of glass. Corrective lens system 740 is preferably coated on all optical surfaces with anti-reflective coatings. The design of corrective lens system 740 is a straightforward matter for those skilled in the art of lens design and imaging lens system correction.

Second reflected beam portion 732 passes through corrective lens system 748, and corrected beam 750 forms an image on image sensor 734. Corrective lens system 748 is preferably designed to adapt to the particularities of imaging lens system 712 in conjunction with the particular distance traveled by light beam portions 714, 722, and 732, in order to ensure that a good quality image is formed on image sensor 734. The exact design of corrective lens system 748 will depend upon the design of imaging lens system 712 and on the material and thickness of beamsplitter 718. Specifically, corrective lens system 748 is intended to correct the aberrations induced by passage of image forming beam 714 through beamsplitter 718. Corrective lens system 748 is preferably coated, on all optical surfaces, with anti-reflective coatings. The design of corrective lens system 748 is a straightforward matter for those skilled in the art of lens design and imaging lens system correction.

For optimal performance, corrective lens systems 740 and 748 are preferably different from one another in form and function, each being individually designed to correct the beam at its particular location, although this is not necessary for the invention's function, and it is possible to have good correction if corrective lens systems 740 and 748 are identical in form. Corrective lens system 740 is preferably designed in such a way that it is complementary to imaging lens system 712 together with the effective tilted flat glass plates of beamsplitter 718 and 724. In this way, imaging lens system 712, beamsplitter 718, beamsplitter 724, and corrective lens system 740 collectively form an imaging system that produces a good image on image sensor 716. Likewise, imaging lens system 712, beamsplitter 718, and corrective lens system 748 collectively form an imaging system that produces a good image on image sensor 734. The images formed on image sensors 728, 716, and 734 are preferably substantially identical to one another except for different light levels or focuses, as described above.

Figure 7:
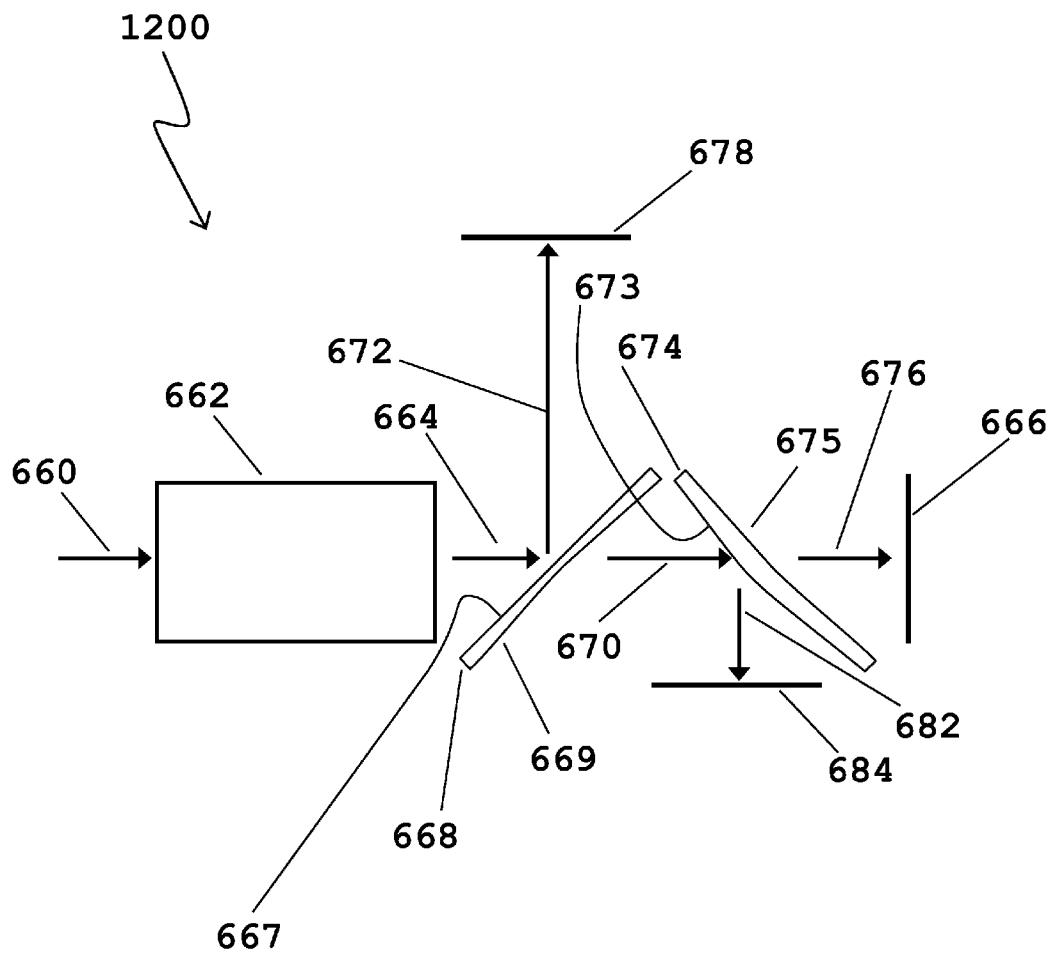
FIG. 7 is a schematic of the embodiment shown in FIG. 5A but comprising shaped beamsplitters.

FIG. 7 is a schematic diagram of embodiment 1200 of the present invention. Referring to FIG. 7, optical radiation 660 preferably from an object (not shown) is incident on imaging lens system 662. Image-forming light beam 664 exits imaging lens system 662 as a converging image beam and is incident on beamsplitter 668, which is preferably oriented at a 45-degree angle to the path of image-forming light beam 664, although any angle in the range between 0 and 180 degrees may be used. As a result, first reflected beam portion 672 is reflected toward, and forms an image on, image sensor 678. First transmitted beam portion 670 is incident on beamsplitter 674, which is preferably oriented at a 45-degree angle to the path of first transmitted beam portion 670, although any angle in the range between 0 and 180 degrees may be used. As a result, second transmitted beam portion 676 forms an image on image sensor 666, and second reflected beam portion 682 is reflected toward, and forms an image on, image sensor 684.

Beamsplitter 668 preferably comprises a flat front surface 667, which preferably comprises a partially-reflecting broadband coating, and a curved back surface 669, which preferably comprises an anti-reflective coating. The exact shape of the curved back surface 669 is preferably designed so that it corrects (or at least partially corrects) the aberrations imparted by beamsplitter 668 on first transmitted beam portion 670. Beamsplitter 674 preferably comprises a curved front surface 673, which preferably comprises a partially-reflecting coating, and a curved back surface 675, which preferably comprises an anti-reflective coating. Front surface 673 may optionally be flat. The exact shapes of curved front surface 673 and curved back surface 675 are preferably designed so that beamsplitter 674 corrects (or at least partially corrects) the aberrations imparted by beamsplitters 668 and 674 on second transmitted beam portion 676. The exact designs of curved front surface 673 and curved back surface 675 will depend upon the design of imaging lens system 662 and on the material and thickness of beamsplitter 668 and on the design of curved back surface 669 of beamsplitter 668.

Back surface 669 of beamsplitter 668 and front surface 673 and back surface 675 of beamsplitter 674 are preferably all designed to work in concert so as to adapt to the particularities of imaging lens system 662 in conjunction with the particular distance traveled by the beam portions 664, 670, 676, and 682 in order to ensure that good quality, well-corrected images are simultaneously formed on image sensors 666 and 684. These corrective surfaces enable beamsplitters 668 and 674 to be thicker, and therefore more rugged, while eliminating the need for corrective lens systems such as those used in embodiment 700. The design of such corrective lens shapes is a straightforward matter for those skilled in the art of lens design.

For optimal performance, it is preferred that corrective surfaces 669, 673, and 675 are all different from one another in form and function, each preferably being individually designed to correct the beam at its particular location, although this is not necessary for the invention's function and it is possible to have good correction if surfaces 669, 673, and 675 are identical in form. Note also that back surface 669 is preferably designed in such a way that it is complementary to imaging lens system 662 together with the tilted flat glass plate represented by beamsplitter 668 and with front surface 673 and back surface 675 of beamsplitter 674. In this way, imaging lens system 662, beamsplitter 668, and beamsplitter 674 collectively form an imaging system that produces a good image on image sensor 666. Likewise, imaging lens system 662, beamsplitter 668, and front surface 673 of beamsplitter 674 collectively form an imaging system that produces a good image on image sensor 684. The images formed on image sensors 678, 666, and 684 are preferably all substantially identical to one another.

Similar to embodiment 1100, either or both of beamsplitters 668 and 674 may optionally comprise two different glass types bonded together in a manner similar to the one in which two different glass types are bonded or cemented together to form an achromatic doublet lens. The advantage to be gained by using such a bonded doublet beamsplitter is that it can be designed in such a way as to help correct chromatic aberrations. The design of such achromatic doublets is a straightforward matter those skilled in the art of lens design. More than two different glass types may alternatively be bonded together to form a triplet (or greater number of elements) lens.

Because of similar geometries, the reflectance equations of embodiment 600 may be applied to embodiments 700 and 1200 as well.

Figure 8:
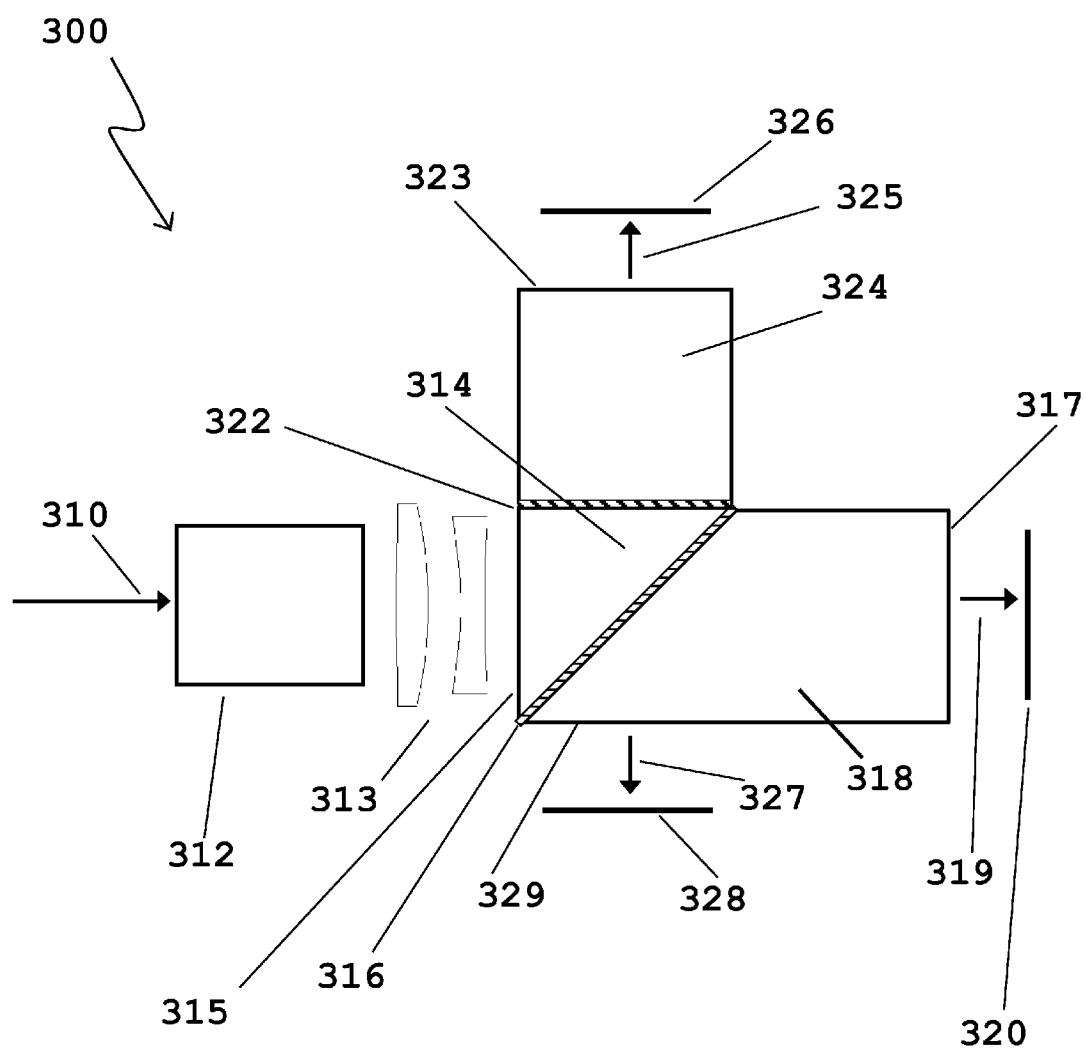
FIG. 8 is a schematic of an embodiment of the present invention comprising solid prisms and two beamsplitting elements.

FIG. 8 is a schematic diagram of an embodiment 300 of the present invention. The basic function of this embodiment 300 is identical to the basic function of embodiment 100, so a detailed description of the light paths is not given again. Referring to FIG. 8, optical radiation 310 preferably from an object (not shown) is incident on imaging lens system 312, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used.

After passing through imaging lens system 312, the light next passes through optional corrective lens system 313, which is preferably designed to adapt to the particularities of imaging lens system 312 in order to properly pre-correct the light so that it is best suited for traveling through solid prisms 314, 318, and 324. Specifically, because prisms 314, 318, and 324, which preferably comprise thick glass, will introduce chromatic and spherical aberration into image forming beam portions 319, 325, and 327, the primary function of optional corrective lens system 313 is to add an equal and opposite amount of aberration, thereby ensuring that image forming beam portions 319, 325, and 327 are all optically well-corrected and that they all form high-resolution images. Because the total optical path lengths for all three beam portions are preferably identical, only one optional corrective lens system is required for all three beam portions. The design of the corrective lens system 313 is a straightforward matter for those skilled in the art of lens design and lens system adaptation. If imaging lens system 312 is designed in conjunction with the presence of solid prisms 314, 318, and 324, then there is typically no need to include optional corrective lens system 313.

Figure 9:
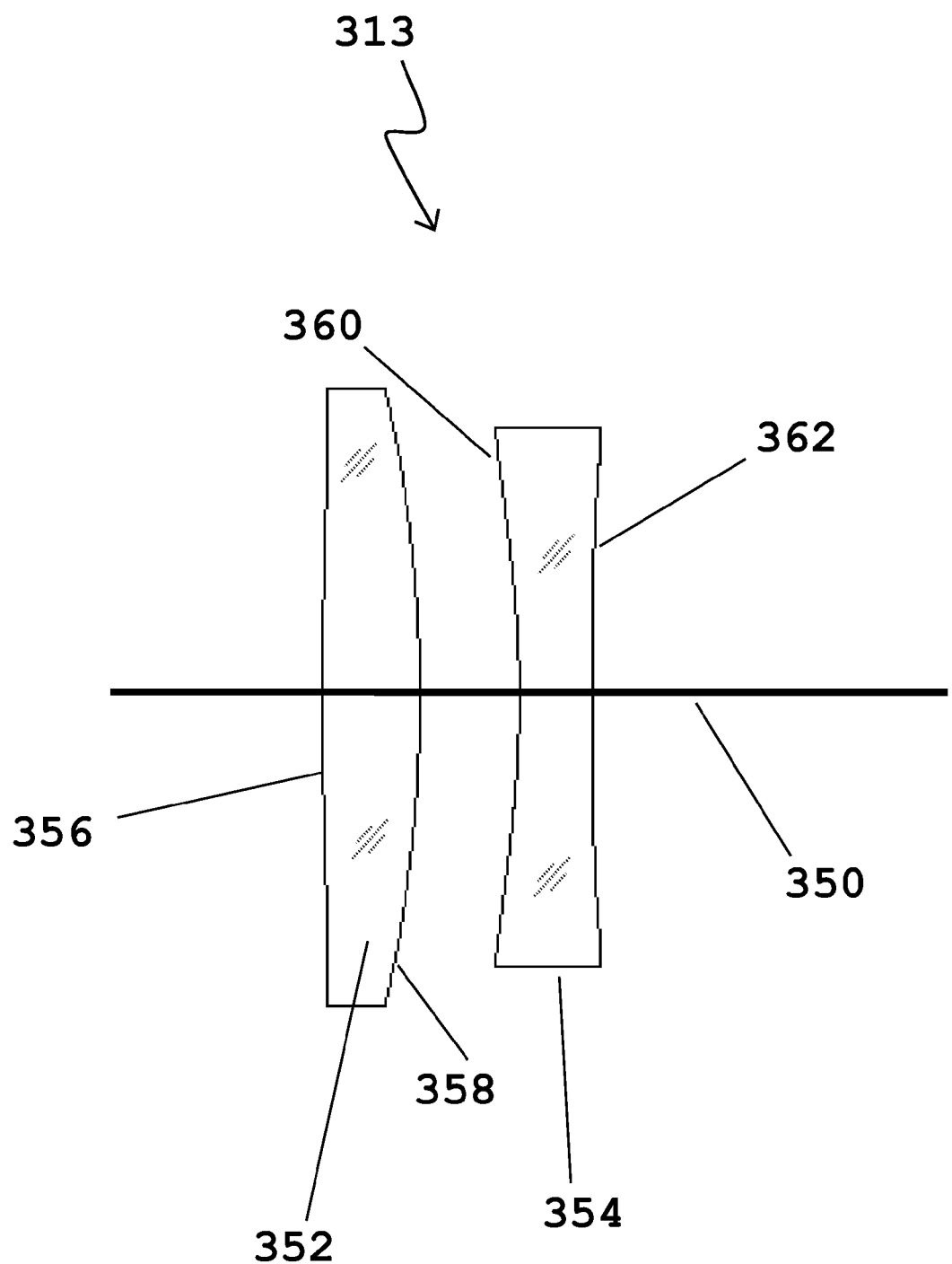
FIG. 9 is a detail of the corrective lens system utilized in the embodiment shown in FIG. 8.

Corrective lens system 313 preferably comprises an airspaced doublet, as shown in FIG. 9. Individual lens elements 352 and 354, which comprise corrective lens system 313, are preferably rotationally symmetric about their central optical axis 350. Lens element 352 preferably comprises glass with a refractive index at the sodium d-line wavelength ($n_d$) equal to 1.7847 and Abbe dispersion value at the sodium d-line wavelength ($V_d$) equal to 25.680, such as N-SF11 manufactured by Schott Glass. Lens element 352 preferably has an edge diameter of 31.0 mm and a center thickness (measured along the central optical axis of rotation 350) of 4.00 mm. Lens element 354 preferably comprises glass with a refractive index at the sodium d-line wavelength ($n_d$) equal to 1.8467 and Abbe dispersion value at the sodium d-line wavelength ($V_d$) equal to 23.780, such as N-SF57 manufactured by Schott Glass. Lens element 354 preferably has an edge diameter of 28.0 mm and a center thickness (measured along the central optical axis of rotation 350) of 3.00 mm.

The shapes of the optical surfaces of lens elements 352 and 354 are preferably even aspheres, and the surface sag of each even asphere surface is given by the following even asphere sag equation:

$$z = cr^2/\{1+[1-(1+k)c^2r^2]^{1/2}\} + \alpha_4 r^4 + \alpha_6 r^6 + \alpha_8 r^8 + \alpha_{10} r^{11}$$

where c is the curvature (the reciprocal of the radius of curvature, which has units of mm), r is the radial coordinate in mm, k is the conic constant, and $\alpha_4$, $\alpha_6$, $\alpha_8$, and $\alpha_{10}$ are the coefficients on the fourth, sixth, eighth, and tenth power polynomial terms, respectively. The shape of first surface 356 of lens element 352 is preferably a convex even asphere with a radius of curvature of 184.504 mm, a conic constant of −286.156, $\alpha_4$=2.718e-6 mm$^{-3}$, $\alpha_6$=−6.116e-8 mm$^{-5}$, $\alpha_8$=1.211e-10 mm$^{-7}$, and $\alpha_{10}$=−3.542e-13 mm$^{-9}$. The shape of second surface 358 of lens element 352 is preferably a convex even asphere with a radius of curvature of −56.021 mm, a conic constant of −3.062, $\alpha_4$=6.891e-6 mm$^{-3}$, $\alpha_6$=−9.066e-8 mm$^{-5}$, $\alpha_8$=3.541e-10 mm$^{-7}$, and $\alpha_{10}$=−8.330e-13 mm$^{-9}$. The shape of first surface 360 of lens element 354 is preferably a concave even asphere with a radius of curvature of −43.175 mm, a conic constant of 5.173, $\alpha_4$=5.363e-5 mm$^{-3}$, $\alpha_6$=−2.496e-7 mm$^{-5}$, $\alpha_8$=1.650e-9 mm$^{-7}$, and $\alpha_{10}$=−3.862e-12 mm$^{-9}$. The shape of second surface 362 of lens element 352 is preferably a concave even asphere with a radius of curvature of 383.586 mm, a conic constant of −5000.0, $\alpha_4$=3.810e-5 mm$^{-3}$, $\alpha_6$=−2.671e-7 mm$^{-5}$, $\alpha_8$=1.656e-9 mm$^{-7}$, and $\alpha_{10}$=−4.221e-12 mm$^{-9}$.

The center thickness (measured along the central optical axis of rotation 350) between the back mounting plane of imaging lens system 312 and lens element 352 is preferably 15.0 mm. The center thickness (measured along the central optical axis of rotation 350) between lens element 352 and lens element 354 is preferably 4.088 mm. The center thickness (measured along the central optical axis of rotation 350) between lens element 354 and the front face 315 of glass prism 314 is preferably 3.0 mm.

Referring again to FIG. 8, front face 315 of prism 314 preferably comprises an anti-reflective coating, and a partially-reflecting coating 316 is preferably applied to the back face of prism 314. Partially-reflecting coating 316 preferably reflects 13% of all light, irrespective of wavelength or polarization, and preferably transmits 77% of all light, irrespective of wavelength or polarization. Such a partially-reflecting coating is preferably deposited using a hybrid metal-dielectric coating technology, for example Newport Corporation's catalog part number MB.1, which offers constant transmittance over all visible wavelengths and all polarization states.

Prism 318 is preferably placed in contact with, and is preferably cemented to, partially-reflecting coating 316 on the back face of prism 314. Alternatively, partially-reflecting coating 316 may be applied to the front surface of prism 318, and then the coating and prism is cemented to the back face of prism 314. An anti-reflective coating is preferably applied to back face 317 of prism 318. Image-forming beam portion 319 is transmitted through prism 314, partially-reflecting coating 316, and prism 318 and forms an image on image sensor 320, which preferably comprises a high-definition motion picture CMOS or CCD sensor, such as model SI-1920HD manufactured by Silicon Imaging.

Partially-reflecting coating 322 is applied on either the side face of the prism 314 or the front face of prism 324, and the two prisms are then preferably cemented together. Partially-reflecting coating 322 preferably reflects 84% of all light, irrespective of wavelength or polarization, and preferably transmits 6% of all light, irrespective of wavelength or polarization. Such a partially-reflecting coating is preferably deposited using a hybrid metal-dielectric coating technology, for example Newport Corporation's catalog part number MB.1, which offers constant transmittance over all visible wavelengths and all polarization states. An anti-reflective coating is preferably applied to output face 323 of glass prism 324. Image-forming beam portion 325 is transmitted through prism 314, reflects off partially-reflecting coating 316, and is transmitted again through prism 314, partially-reflecting coating 322, and prism 324 and forms an image on image sensor 326, which preferably comprises a high-definition motion picture CMOS or CCD sensor, such as model SI-1920HD manufactured by Silicon Imaging.

Image sensor 328 is placed at side face 329 of glass prism 318. An anti-reflective coating is preferably applied to side face 329. Image-forming beam portion 327 forms an image on image sensor 328, which preferably comprises a high-definition motion picture CMOS or CCD sensor, such as model SI-1920HD manufactured by Silicon Imaging.

Because partially-reflecting coatings 316 and 322 preferably comprise relatively thin beamsplitters, and the prisms are preferably cemented together (thus leaving no air gaps), no aberrations are introduced by tilted coating 316.

Figure 10A:
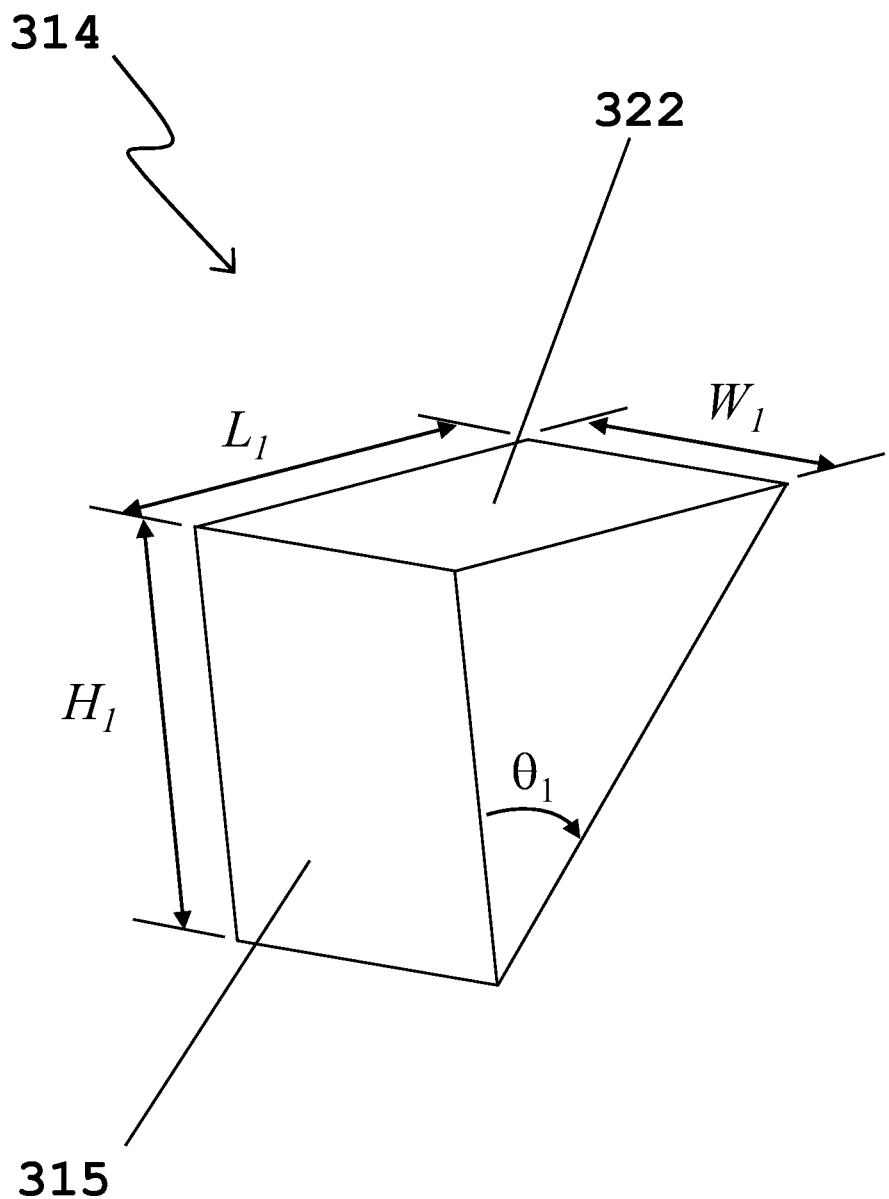
FIGS. 10A-C are details of the prisms utilized in the embodiment shown in FIG. 8.

FIG. 10A shows a tilted view of prism 314, which is preferably a rectangular volume and is preferably made of a low-dispersion glass such as N-FK51A manufactured by Schott Glass ($n_d$=1.4866, $V_d$=84.468). Prism 314 preferably has a length (denoted by "$L_1$") equal to 25.4 mm, a width (denoted by "$W_1$") equal to 25.4 mm, a height (denoted by "$H_1$") equal to 25.4 mm, and a back-face angle (denoted by "$\theta_1$") equal to 45 degrees, although any angle in the range between 0 and 180 degrees may be used.

Figure 10B:
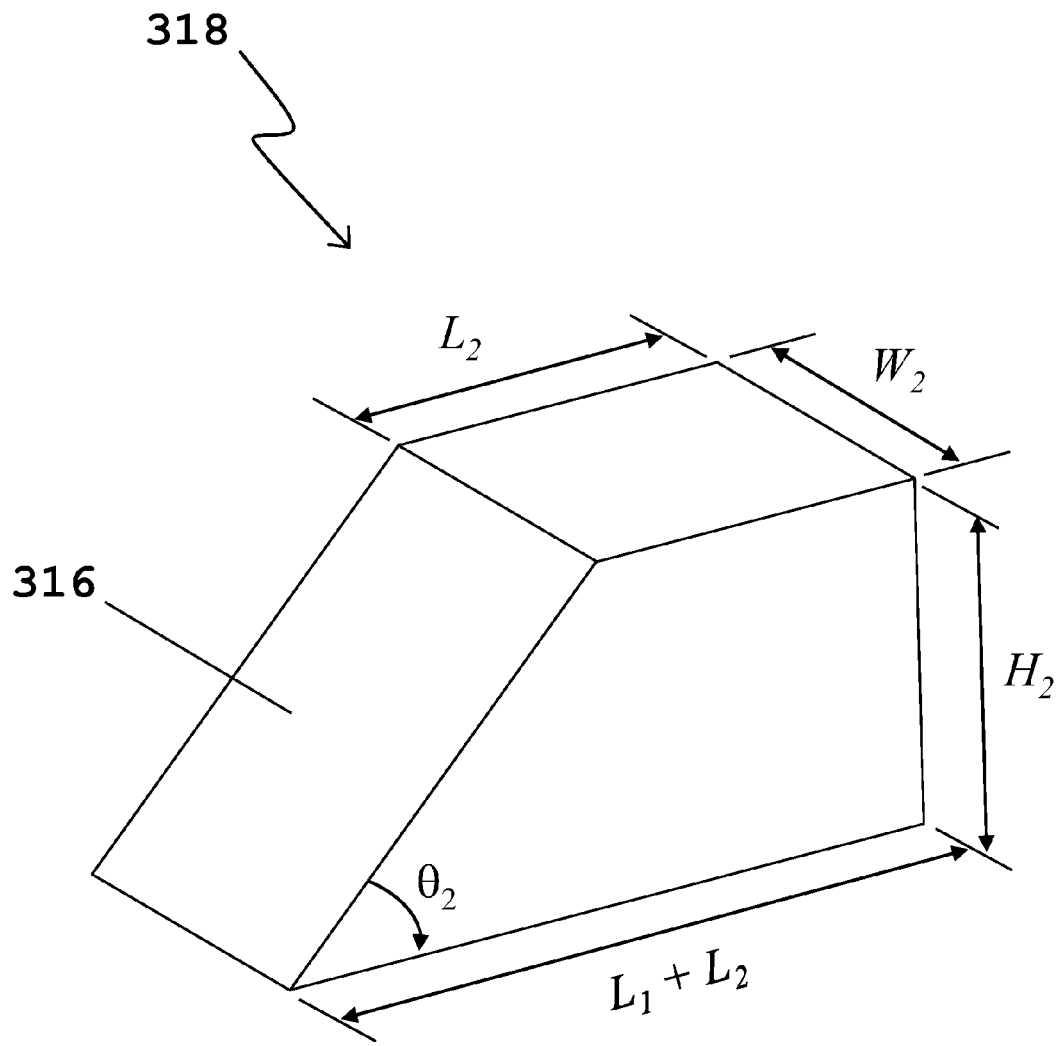

FIG. 10B shows a tilted view of prism 318, which is preferably a rectangular volume and is preferably made of a low-dispersion glass such as N-FK51A manufactured by Schott Glass ($n_d$=1.4866, $V_d$=84.468). Prism 318 preferably has a length (denoted by "$L_1+L_2$") equal to 50.8 mm, a width (denoted by "$W_2$") equal to 25.4 mm, a height (denoted by "$H_2$") equal to 25.4 mm, and a front-face angle (denoted by "$\theta_2$") equal to 45 degrees, although any angle in the range between 0 and 180 degrees may be used.

Figure 10C:
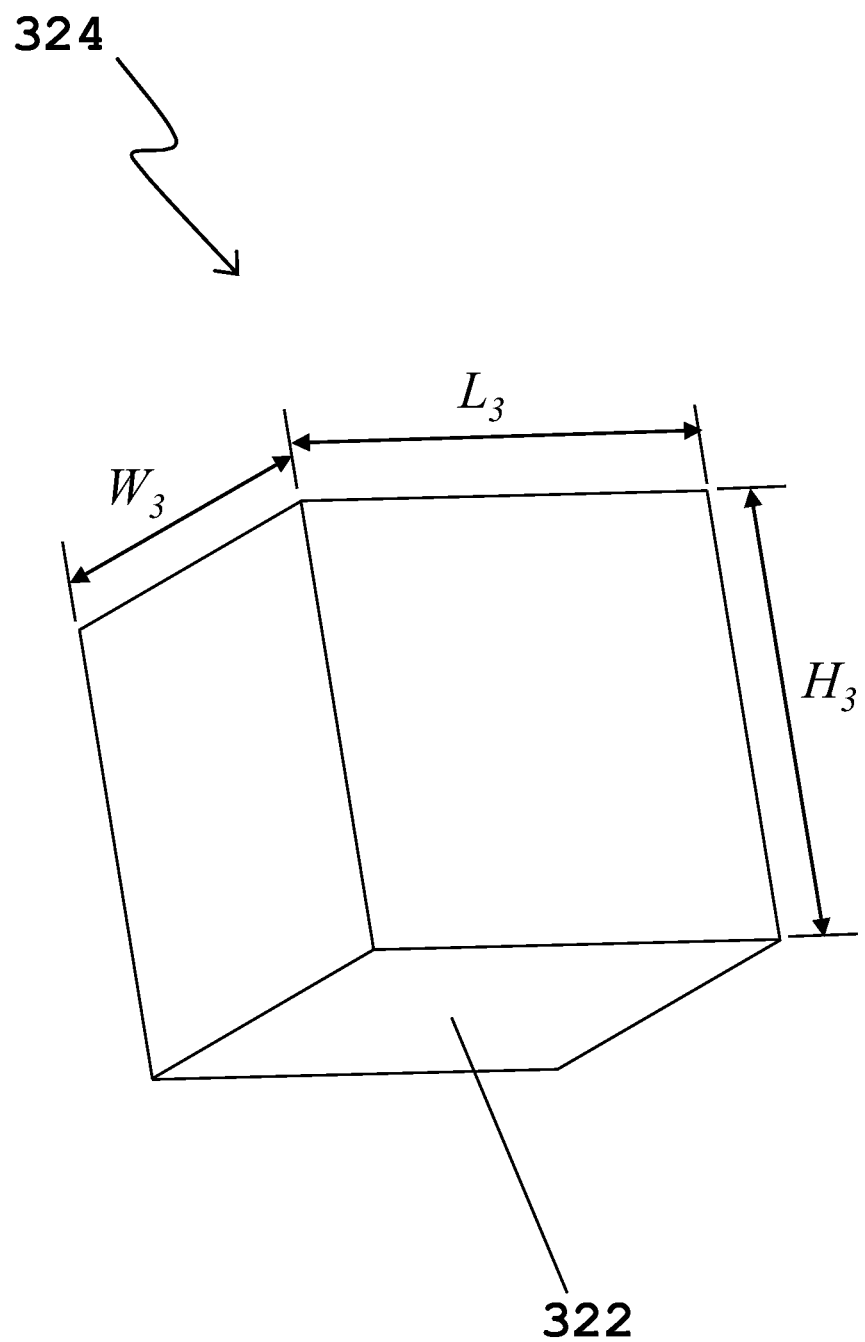

FIG. 10C shows a tilted view of prism 324, which is preferably a rectangular volume and is preferably made of a low-dispersion glass such as N-FK51A manufactured by Schott Glass ($n_d$=1.4866, $V_d$=84.468). Prism 324 preferably has a length (denoted by "$L_3$") that is equal to 25.4 mm, a width (denoted by "$W_3$") equal to 25.4 mm, and a height (denoted by "$H_3$") that is equal to 25.4 mm.

As mentioned above, the dimensions, materials, and other characteristics described in this embodiment are specific to a large-format film camera lens manufactured by Hasselblad having a focal length of 80 mm and an f-number of f/2.8. For other imaging lens systems, different dimensions, materials, and characteristics would be applicable. Because of similar geometries, the reflectance equations of embodiment 100 may be applied to this embodiment 300 as well.

Figure 11A:
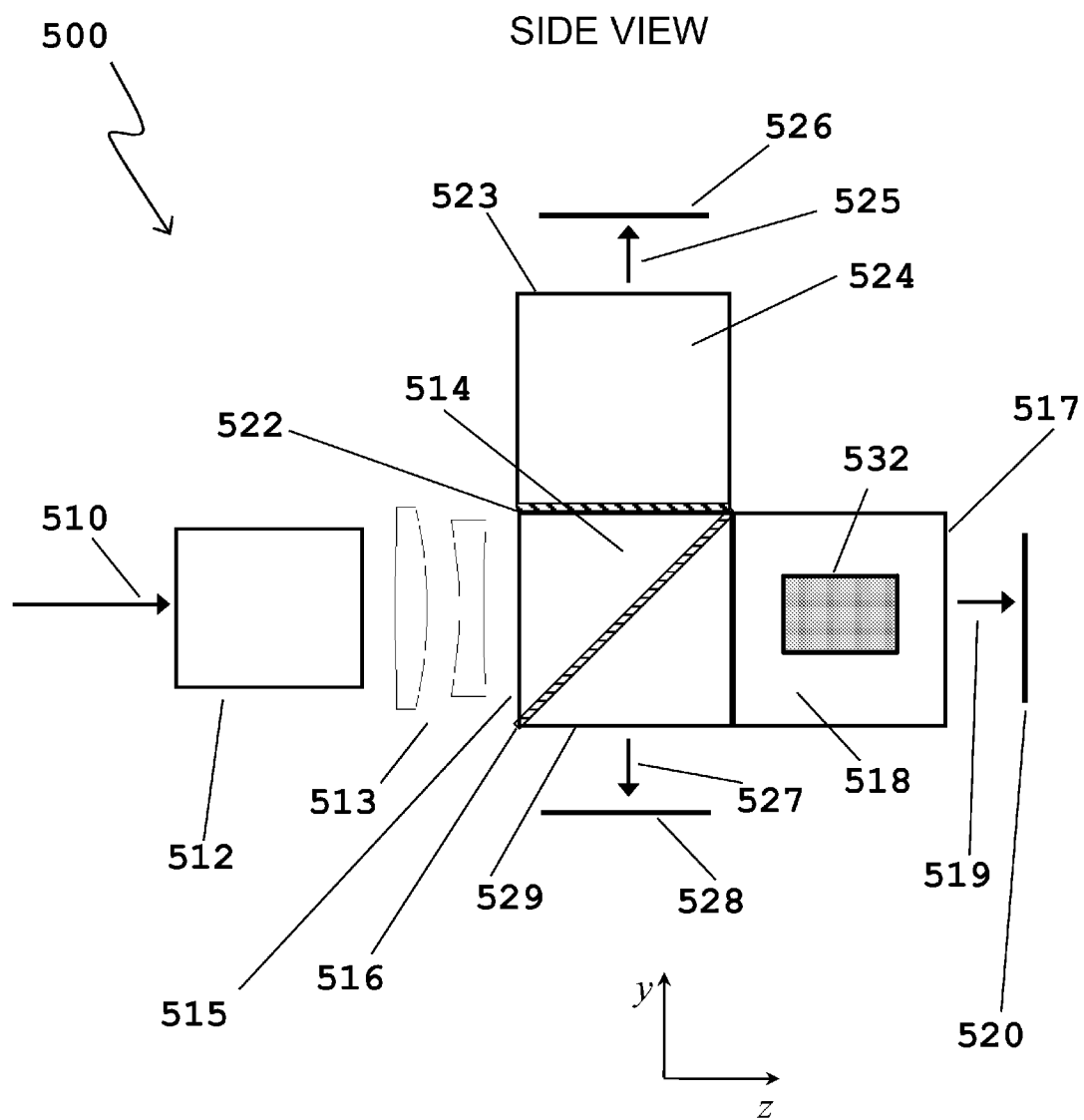
FIGS. 11A-C are side, top, and end views respectively of an embodiment of the present invention comprising prisms comprising four beamsplitting elements which can form five substantially identical images.
Figure 11B:
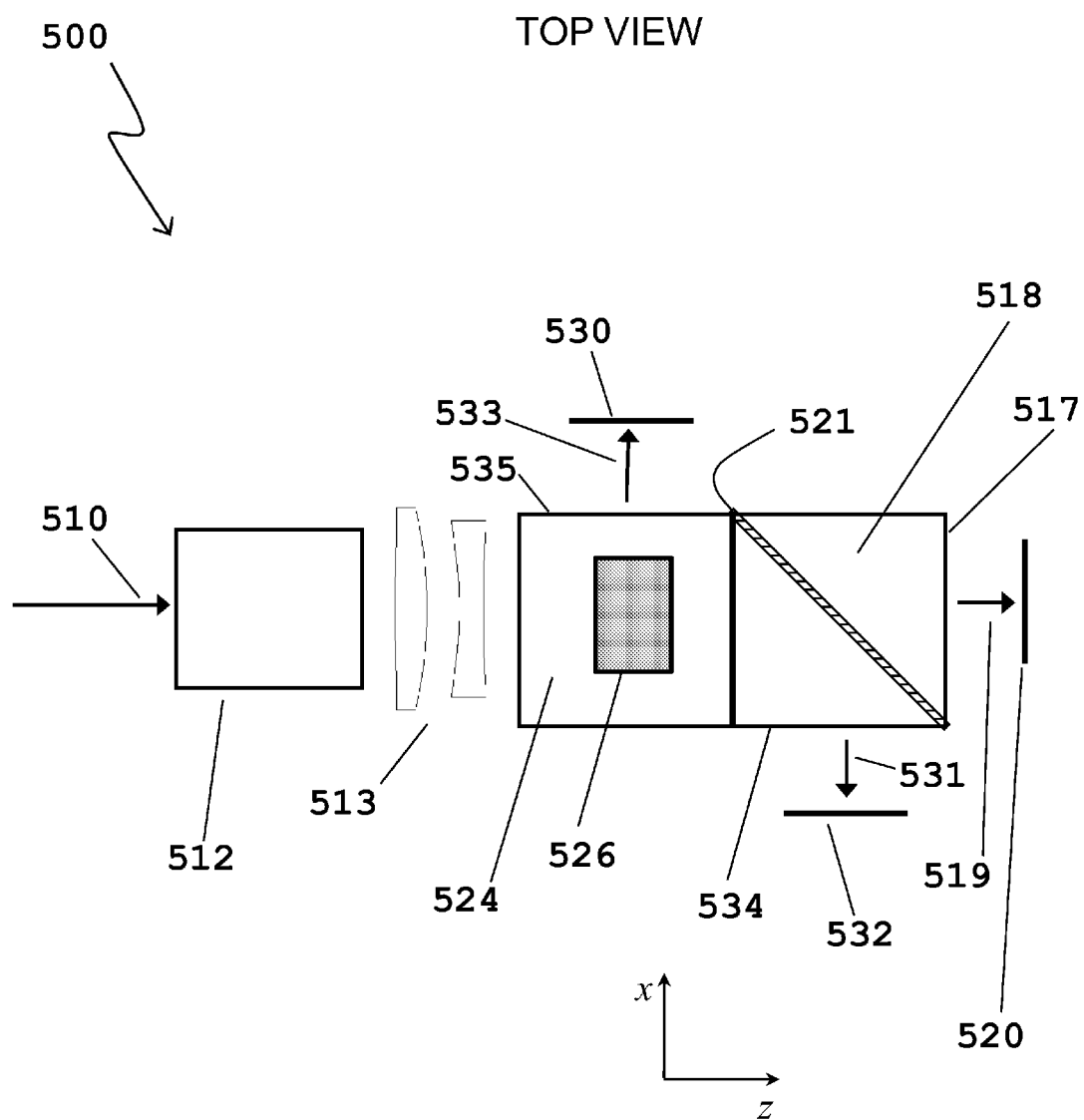
Figure 11C:
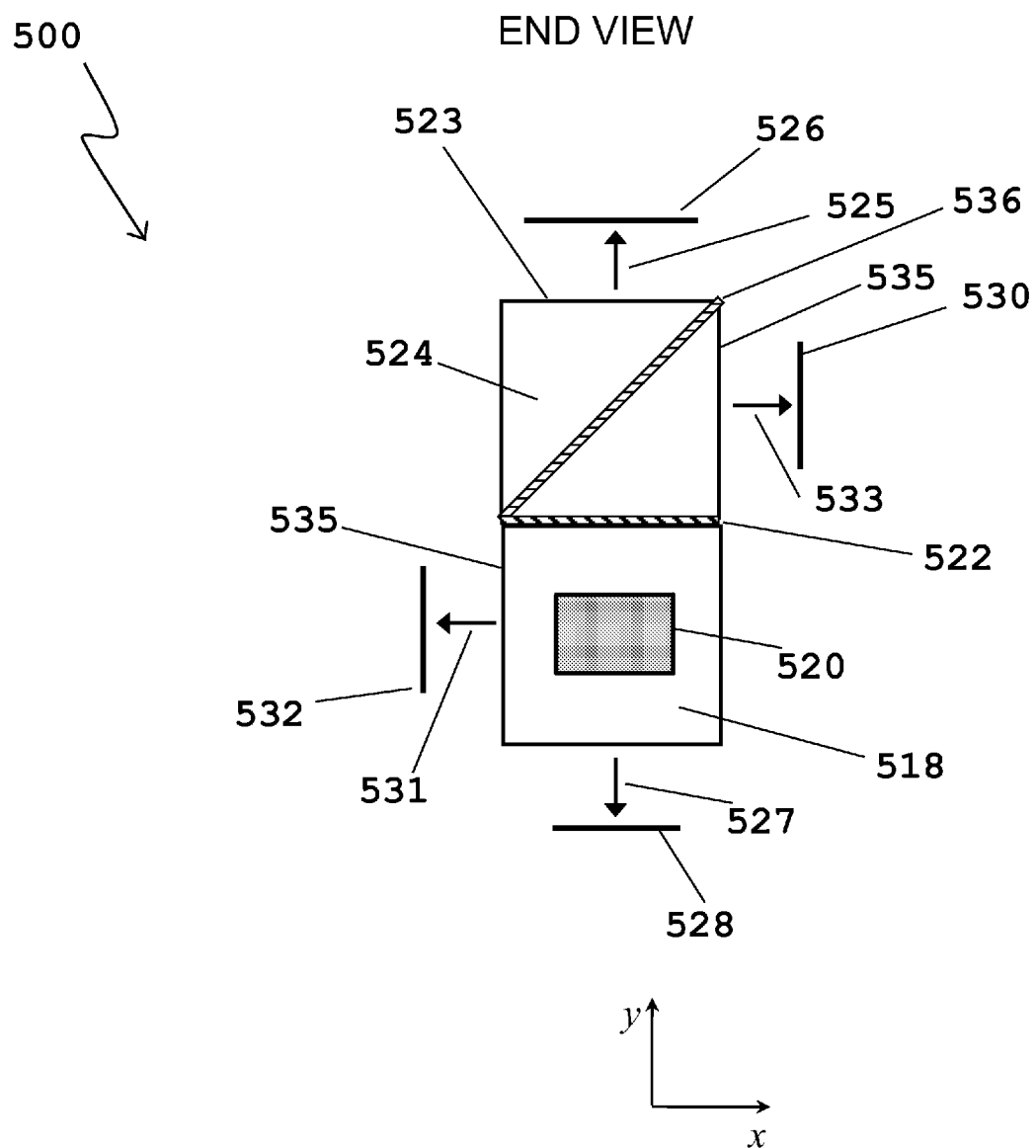
Figure 12:
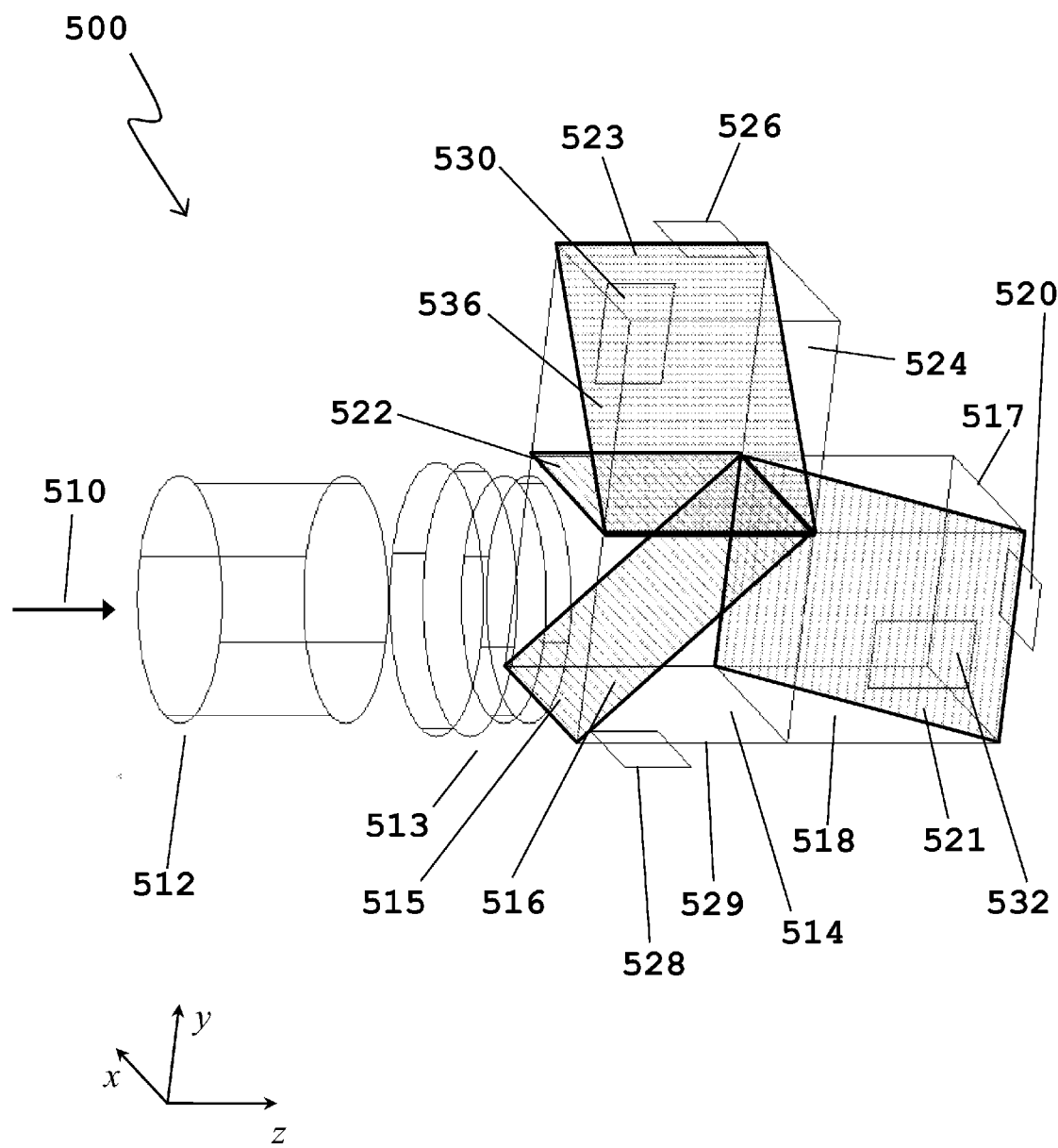
FIG. 12 is a tilted see-through view of the embodiment of FIGS. 11A-C.

FIG. 11A is a schematic diagram of a side view of embodiment 500 of the present invention as displayed in the y-z plane, where the z-direction is defined as the direction in which the original optical radiation 510 is traveling. The y-direction is defined as being perpendicular to the z-direction and points upward in the figure. The x-direction is defined as being perpendicular to both the y- and z-directions, and therefore points into the plane of the figure. FIG. 11B is a schematic diagram of a top view of embodiment 500 of the present invention as displayed in the x-z plane, in which the x-direction is defined as being perpendicular to the z-direction and points upward in the figure. The y-direction is defined as being perpendicular to both the x- and z-directions, and therefore points out of the plane of the figure. FIG. 11C is a schematic diagram of an end view embodiment 500 of the present invention, also as displayed in the x-y plane. FIG. 12 is a see through schematic diagram of a tilted view of embodiment 500 of the present invention. The basic function and layout of embodiment 500 is similar to the basic functional layout of embodiment 300, with the addition of two extra beamsplitters and the resulting formation of two extra images; therefore, a detailed description of the light paths is not given again.

Referring to FIGS. 11A-C and 12, optical radiation 510 preferably from an object (not shown) is incident on an imaging lens system 512. For the purposes of the dimensions, materials, and other characteristics cited in the description of this embodiment, imaging lens system 512 is preferably a commercially-available large-format film camera lens, manufactured by Hasselblad, and having a focal length of 80 mm and an f-number of f/2.8. However, different dimensions, materials, and characteristics may be used with a different imaging lens system. After passing through imaging lens system 512, the light next passes through corrective lens system 513. Optional corrective lens system 513 is identical in form and function to optional corrective lens system 313 in embodiment 300. Beamsplitting cube 514 is placed at the distal end of corrective lens system 513. Beamsplitting cube 514 and the other beamsplitting cubes of this embodiment are preferably similar in form and function to commercially-available broadband non-polarizing beamsplitting cubes, such as model number 10BC17MB.1 manufactured by the Newport Corporation, preferably measures 25.4 mm on each side, and preferably comprises an anti-reflective coating applied to both its front face 515 and its bottom face 529. Beamsplitting cube 514 preferably comprises interior partially-reflecting beamsplitter coating 516, which preferably is achieved using a standard hybrid metal-dielectric reflecting coating technology. The reflectivity of beamsplitter coating 516 is preferably 1.0%, and the transmittance of beamsplitter coating 516 is preferably 89.0%. It is typical for hybrid-metal-dielectric coatings to absorb about 10% of all incident radiation.

Beamsplitting cube 518 is preferably cemented as shown to the back face of beamsplitting cube 514, preferably measures 25.4 mm on each side, and preferably comprises an anti-reflective coating applied to both its back face 517 and its side face 534. Beamsplitting cube 518 preferably comprises interior partially-reflecting beamsplitter coating 521, which preferably has a reflectivity of 10.0% and a transmittance of 80.0%. Beamsplitting cube 524 is preferably cemented as shown to the top face of beamsplitting cube 514, preferably measures 25.4 mm on each side, and preferably comprises an anti-reflective coating applied to both its top face 523 and its side face 535. Beamsplitting cube 524 preferably comprises interior partially-reflecting beamsplitter coating 536, which preferably has a reflectivity of 1.0% and a transmittance of 89.0%. Prior to assembly and cementing of beamsplitting cubes 514, 518, and 524, beamsplitter coating 522 is preferably applied to the top face of beamsplitting cube 514 and/or to the bottom face of beamsplitting cube 524. Beamsplitter coating 522 preferably has a reflectivity of 10.0% and a transmittance of 80.0%.

Image-forming beam portion 519 exiting back face 517 of beamsplitting cube 518 forms an image on image sensor 520.

The center thickness between back face 517 and image sensor 520 is preferably 5.0 mm. Image-forming beam portion 527 exiting bottom face 529 of beamsplitting cube 514 forms an image on image sensor 528. The center thickness between bottom face 529 and image sensor 528 is preferably 5.0 mm. Image-forming beam portion 525 exiting top face 523 of beamsplitting cube 524 forms an image on image sensor 526. The center thickness between top face 523 and image sensor 526 is preferably 5.0 mm. Image-forming beam portion 531 exiting side face 534 of beamsplitting cube 518 forms an image on image sensor 532. The center thickness between side face 534 and image sensor 532 is preferably 5.0 mm. Image-forming beam portion 533 exiting side face 535 of beamsplitting cube 524 forms an image on image sensor 530. The center thickness between side face 535 and image sensor 530 is preferably 5.0 mm. Thus the four beamsplitting coatings 516, 521, 522, 536 of this embodiment are configured to simultaneously produce five separate images. However, the present invention may be extended (or reduced) to form practically any number of sub-images by simply adding or removing a certain number of beamsplitters.

In this embodiment the images formed on the five image sensors 520, 528, 526, 532, and 530 are substantially identical except for different light levels, owing to the fact that the light paths taken from the front face 515 of first beamsplitting cube 514 to each of the five image sensors all provide different levels of transmittance. More specifically, image-forming beam portion 519 that forms the image on image sensor 520 is transmitted through beamsplitter coatings 516 and 521, and therefore contains 71.200% of the radiant power at front face 515. Image-forming beam portion 527 that forms the image on image sensor 528 is reflected off coatings 516 and 522 and then transmitted through coating 516, and therefore contains 0.089% of the radiant power at front face 515. Image-forming beam portion 525 that forms the image on image sensor 526 is reflected off coating 516 and then transmitted through coatings 522 and 536, and therefore contains 0.712% of the radiant power at front face 515. Image-forming beam portion 531 that forms the image on image sensor 532 is transmitted through beamsplitter coating 516 and reflected off coating 521, and therefore contains 8.900% of the radiant power at front face 515. Image-forming beam portion 533 that forms the image on image sensor 530 is reflected off beamsplitter coating 516, transmitted through coating 522, and then reflected off coating 536, and therefore contains 0.008% of the radiant power at front face 515.

In other words, the image formed on image sensor 530 has $1/8900^{th}$ the light level of the image formed on image sensor 520. The image formed on image sensor 528 has $1/800^{th}$ the light level of the image formed image sensor 520. The image formed on image sensor 526 has $1/100^{th}$ the light level of the image formed on image sensor 520. And the image formed on image sensor 532 has $1/8^{th}$ the light level of the image formed on image sensor 520. Thus, the images formed on the various image sensors vary in light level by approximately 3 photographic stops from one image sensor to the next, for a total range in light exposure values of greater than 12 stops.

The values of reflectivity for beamsplitter coatings 516, 521, 536, and 522 may alternatively be altered to provide any variation of light levels for the images formed on the five image sensors 520, 528, 526, 532, and 530. For example, if the reflectance of coating 516 is 6.0% and the transmittance of coating 516 is 84.0%, the reflectance of coating 521 is 18.0% and the transmittance of coating 521 is 72.0%, the reflectance of coating 536 is 5.0% and the transmittance of coating 536 is 85.0%, and the reflectance of coating 522 is 20.0% and the transmittance of coating 522 is 70.0%, then the image formed on image sensor 530 will have $1/228^{th}$ the light level of the image formed on image sensor 520. The image formed on second image sensor 528 will have $1/60^{th}$ the light level of the image formed on image sensor 520. The image formed on image sensor 526 will have $1/17^{th}$ the light level of the image formed on image sensor 520. And the image formed on image sensor 532 will have $1/4^{th}$ the light level of the image formed on image sensor 520. Thus in this example the images formed on the various image sensors vary in light level by approximately 2 photographic stops from one image sensor to the next, for a total range in light exposure values of greater than 8 stops.

In another example, if the reflectance of coating 516 is 25.0% and the transmittance of coating 516 is 65.0%, the reflectance of coating 521 is 30.0% and the transmittance of coating 521 is 60.0%, the reflectance of coating 536 is 30.0% and the transmittance of coating 536 is 60.0%, and the reflectance of coating 522 is 57.0% and the transmittance of coating 522 is 33.0%, then the image formed on image sensor 530 will have $1/16^{th}$ the light level of the image formed on image sensor 520. The image formed on second image sensor 528 will have $1/4^{th}$ the light level of the image formed on image sensor 520. The image formed on image sensor 526 will have $1/8^{th}$ the light level of the image formed on image sensor 520. And the image formed on 532 will have $1/2$ the light level of the image formed on image sensor 520. Thus in this example the images formed on the various image sensors vary in light level by approximately 1 photographic stop from one image sensor to the next, for a total range in light exposure values of greater than 4 stops.

In general, the light level of image forming beam portion 519, which forms an image on image sensor 520, is equal to the radiant power at the front face 515 of beamsplitting cube 514 multiplied by the transmittance of coating 516, multiplied by the transmittance of coating 521. The light level of image forming beam portion 527, which forms an image on image sensor 528, is equal to the radiant power at front face 515 multiplied by the reflectance of coating 516, multiplied by the reflectance of coating 522, multiplied by the transmittance of coating 516. The light level of image forming beam portion 525, which forms an image on image sensor 526, is equal to the radiant power at front face 515 multiplied by the reflectance of coating 516, multiplied by the transmittance of coating 522, multiplied by the transmittance of coating 536. The light level of image forming beam portion 531, which forms an image on image sensor 532, is equal to the radiant power at front face 515 multiplied by the transmittance of coating 516, multiplied by the reflectance of coating 521. The light level of image forming beam portion 533, which forms an image on image sensor 530, is equal to the radiant power at front face 515 multiplied by the reflectance of coating 516, multiplied by the transmittance of coating 522, multiplied by the reflectance of coating 536.

Figure 13:
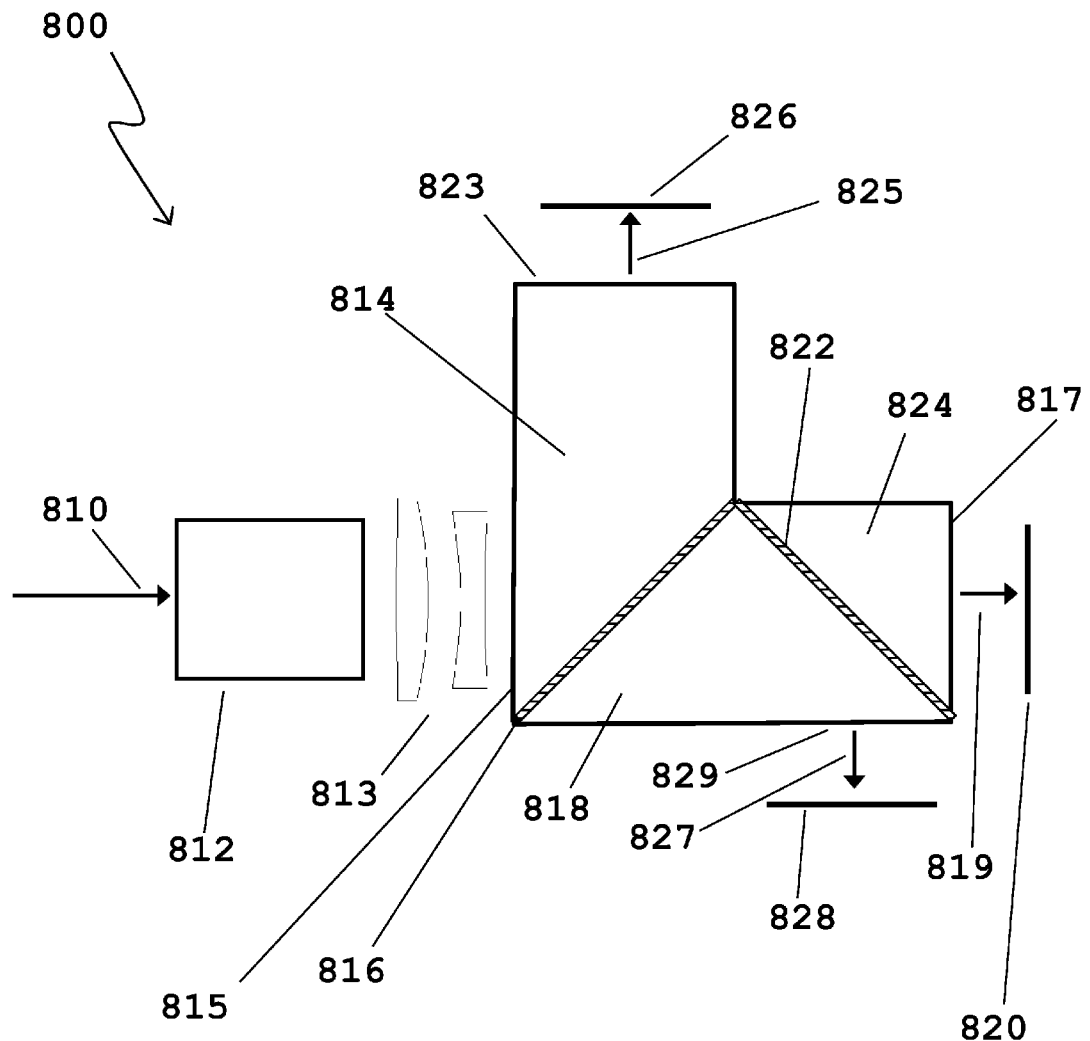
FIG. 13 is a schematic of another embodiment of the present invention comprising solid prisms and two beamsplitting elements.

FIG. 13 is a schematic diagram of embodiment 800 of the present invention. The basic geometry, function and layout of embodiment 800 is similar to embodiment 600; therefore, a detailed description of the light paths is not given again, and the reflectance equations of embodiment 600 may be applied to this embodiment 800 as well. Referring to FIG. 13, optical radiation 810 preferably from an object (not shown) is incident on an imaging lens system 812. For the purposes of the dimensions, materials, and other characteristics cited in the description of this embodiment, imaging lens system 812 is preferably a commercially-available large-format film camera lens, manufactured by Hasselblad, and having a focal length of 80 mm and an f-number of f/2.8. However, different dimensions, materials, and characteristics may be used with a different imaging lens system.

Figure 14:
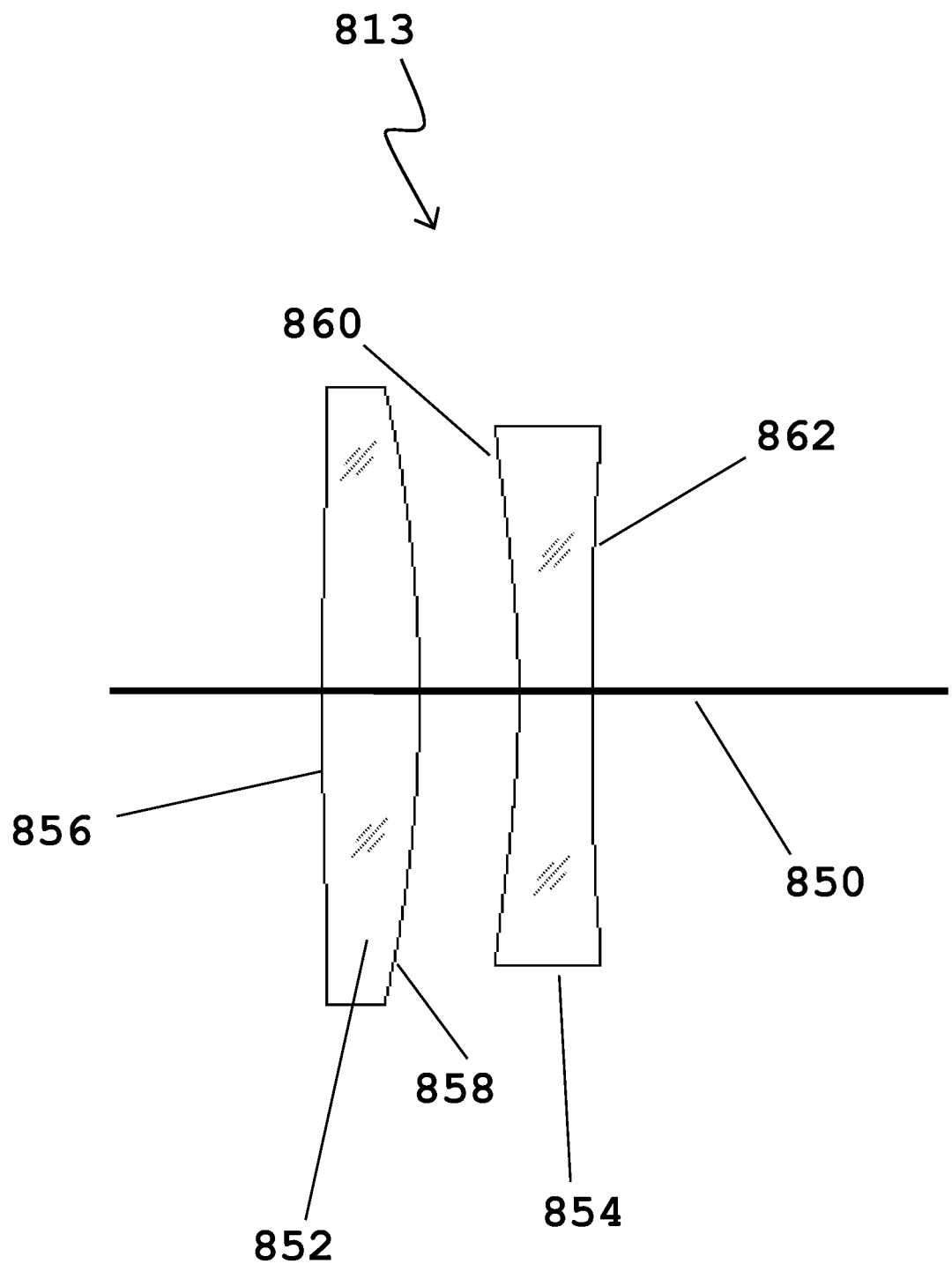
FIG. 14 is a detail of the corrective lens system utilized in the embodiment shown in FIG. 13.

After passing through imaging lens system 812, the light next passes through corrective lens system 813, which is preferably designed to adapt to the particularities of the imaging lens system 812 in order to properly pre-correct the light emerging from the imaging lens system so that it is best suited for traveling through prisms 814, 818, and 824, which preferably comprise thick glass. Specifically, because thick glass prisms will introduce chromatic and spherical aberration into the image forming beam portions 819, 825, and 827, the primary function of corrective lens system 813 is to add an equal and opposite amount of aberration, thereby ensuring that the image forming beam portions 819, 825, and 827 are all optically well-corrected and form high-resolution images. The design of the corrective lens system 813 is a straightforward matter for those skilled in the art of lens design and lens system adaptation. Corrective lens system 813 preferably comprises an air-spaced doublet, as shown in FIG. 14. The two individual corrective lens elements 852 and 854 which comprise corrective lens system 813 are preferably rotationally symmetric about their central optical axis 850. Lens elements 852, 854, their surfaces 856, 858, 860, 862, and the associated center thicknesses are identical to those in corrective lens system 313 described above.

Referring again to FIG. 13, prism 814 is located near the output end of imaging lens system 812 and corrective lens system 813 and preferably comprises an anti-reflective coating on its front face 815. Partially-reflecting beamsplitting coating 816 is applied to the angled back face prism 814. Coating 816 preferably reflects 81% of all light, irrespective of wavelength or polarization, and preferably transmits 9% of all light, irrespective of wavelength or polarization, and is preferably achieved using a standard hybrid metal-dielectric reflecting coating technology. Prism 818 is placed in contact with, and is preferably cemented to, coating 816, which is applied to the back of the first glass prism 814. Alternatively, coating 816 may instead or additionally be applied to the front face of prism 818. Prisms 814 and 818 are thus glued together or otherwise attached at beamsplitter coating 816. Similarly, partially-reflecting beamsplitter coating 822 is applied on one or both of the back face of prism 818 and the front face of prism 824. Coating 822 preferably reflects 81% of all light, irrespective of wavelength or polarization, and preferably transmits 9% of all light, irrespective of wavelength or polarization. Prisms 818 and 824 are preferably cemented, glued, or otherwise attached together so that coating 822 is located between them.

Image sensor 826 is located near the back face 823 of prism 814. Image-forming beam portion 825 forms an image on image sensor 826. An anti-reflective coating is preferably applied to the back face 823 of prism 814. Image sensor 820 is located near the output face 817 of prism 824. Image-forming beam portion 819 forms an image on image sensor 820. An anti-reflective coating is preferably applied to the output face 817 of prism 824. Image sensor 828 is located near the side face 829 of prism 818. Image-forming beam portion 827 forms an image on image sensor 828. An anti-reflective coating is preferably applied to the side face 829 of prism 818. Each image sensor preferably comprises a high-definition motion picture CMOS or CCD sensor, such as model SI-1920HD manufactured by Silicon Imaging.

Figure 15A:
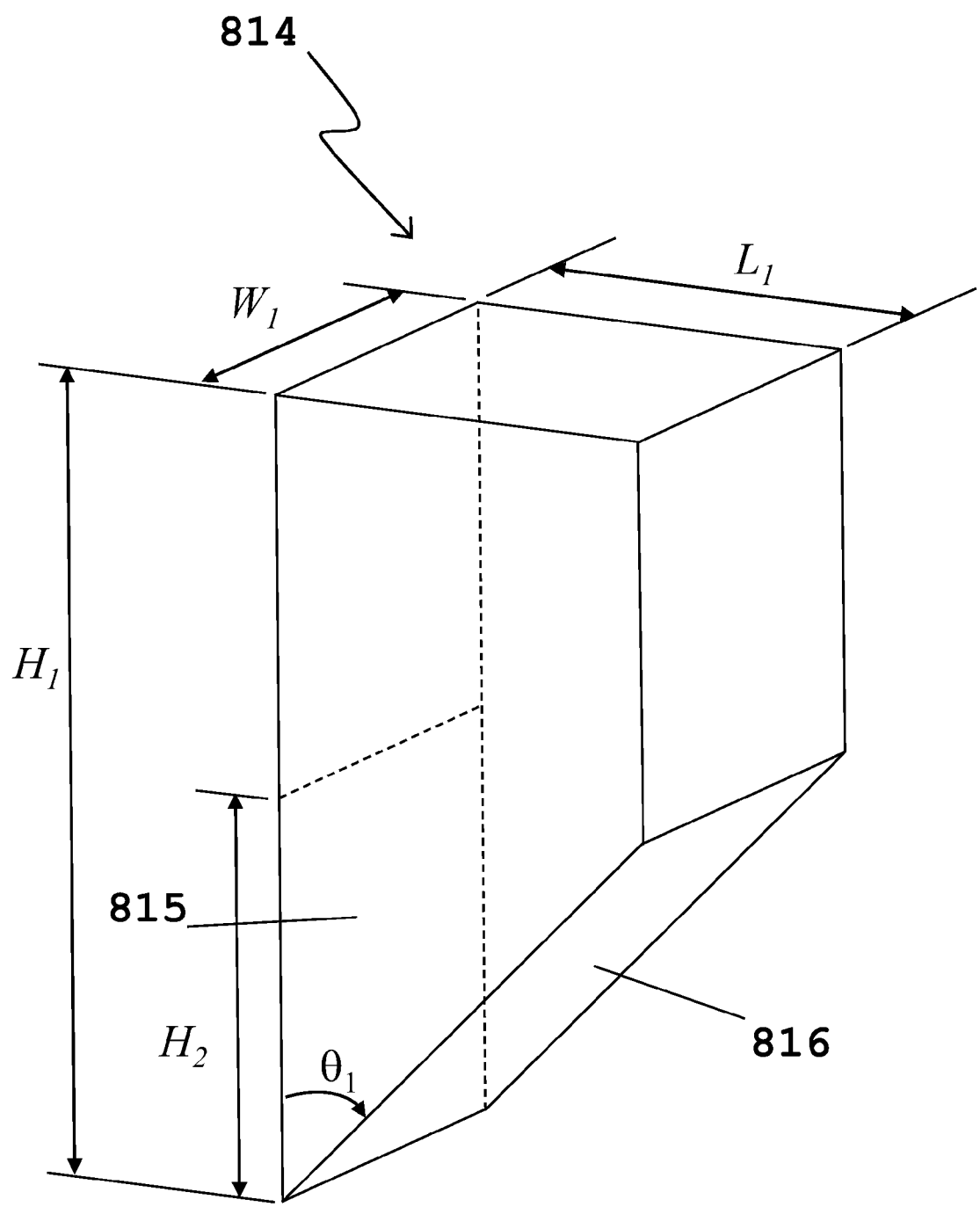
FIGS. 15A-C are details of the prisms utilized in the embodiment shown in FIG. 13.

FIG. 15A shows a tilted view of prism 814, which is preferably a rectangular volume, preferably comprises a low-dispersion glass such as N-FK51A manufactured by Schott Glass ($n_d$=1.4866, $V_d$=84.468), and preferably has a length (denoted by "$L_1$") that is equal to 25.4 mm, a width (denoted by "$W_1$") that is equal to 25.4 mm, a height (denoted by "$H_1$") that is equal to 50.8 mm, and a back-face angle (denoted by "$\theta_1$") that is equal to 45 degrees, although any angle in the range between 0 and 180 degrees may be used. The anti-reflection coating on the front face 815 of prism 814 preferably has a height (denoted by "$H_2$") of 25.4 mm.

Figure 15B:
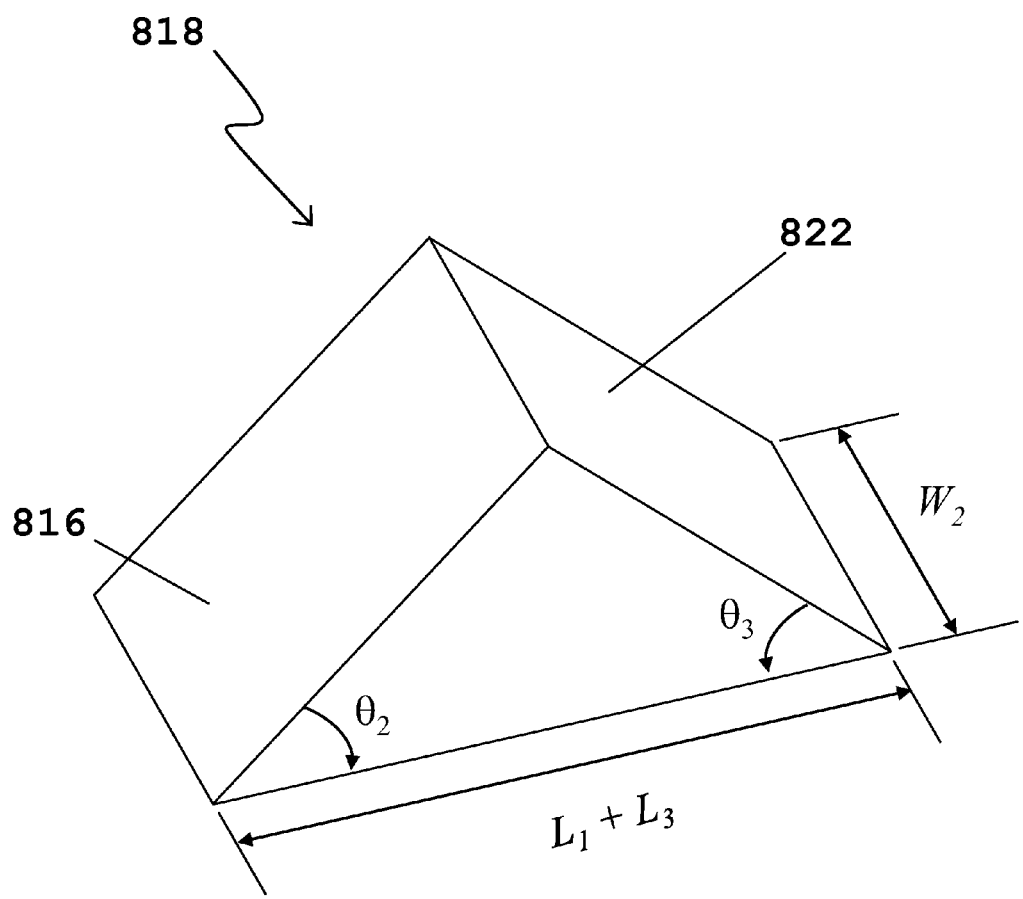

FIG. 15B shows a tilted view of prism 818, which is preferably a rectangular volume, preferably comprises a low-dispersion glass such as N-FK51A manufactured by Schott Glass ($n_d$=1.4866, $V_d$=84.468), and preferably has a length (denoted by "$L_1+L_3$") that is equal to 50.8 mm, a width (denoted by "$W_2$") that is equal to 25.4 mm, a front-face angle (denoted by "$\theta_2$") that is equal to 45 degrees, although any angle in the range between 0 and 180 degrees may be used, and a back-face angle (denoted by "$\theta_3$") that is equal to 45 degrees, although any angle in the range between 0 and 180 degrees may be used.

Figure 15C:
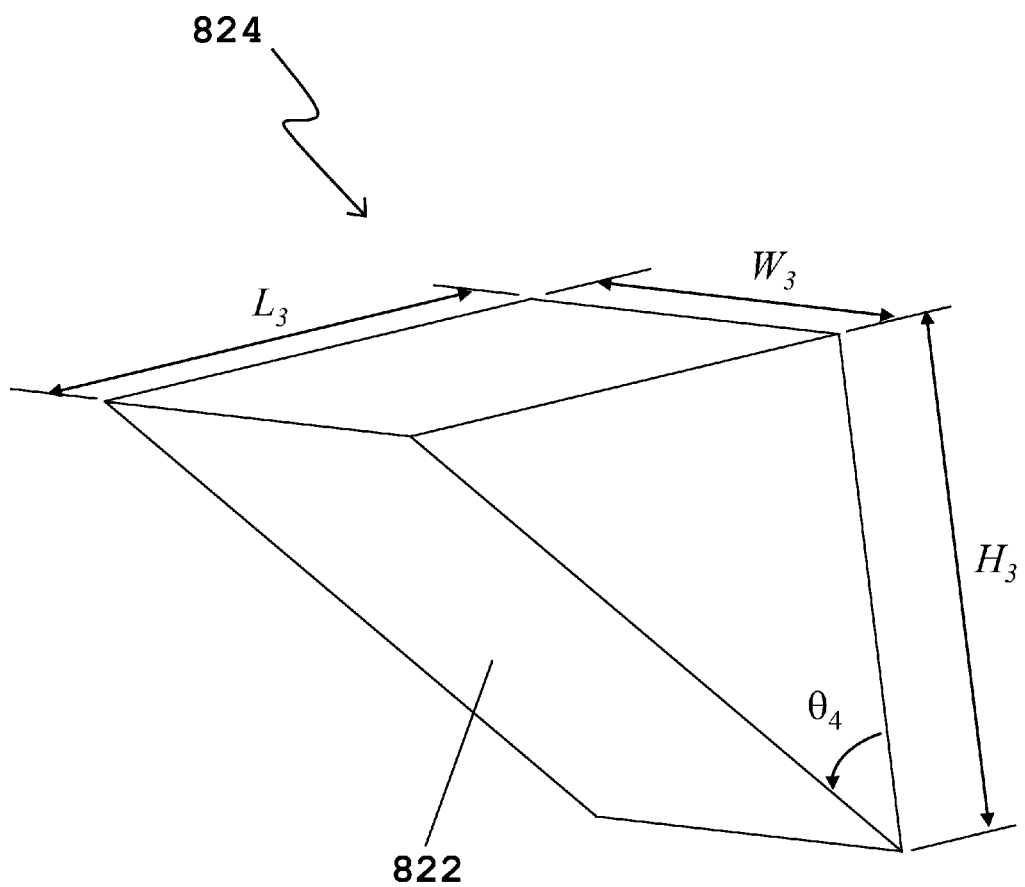

FIG. 15C shows a tilted view of prism 824, which is preferably a rectangular volume, preferably comprises a low-dispersion glass such as N-FK51A manufactured by Schott Glass ($n_d$=1.4866, $V_d$=84.468), and preferably has a length (denoted by "$L_3$") that is equal to 25.4 mm, a width (denoted by "$W_3$") that is equal to 25.4 mm, a height (denoted by "$H_3$") that is equal to 25.4 mm, and a front-face angle (denoted by "$\theta_4$") that is equal to 45 degrees, although any angle in the range between 0 and 180 degrees may be used.

Figure 16:
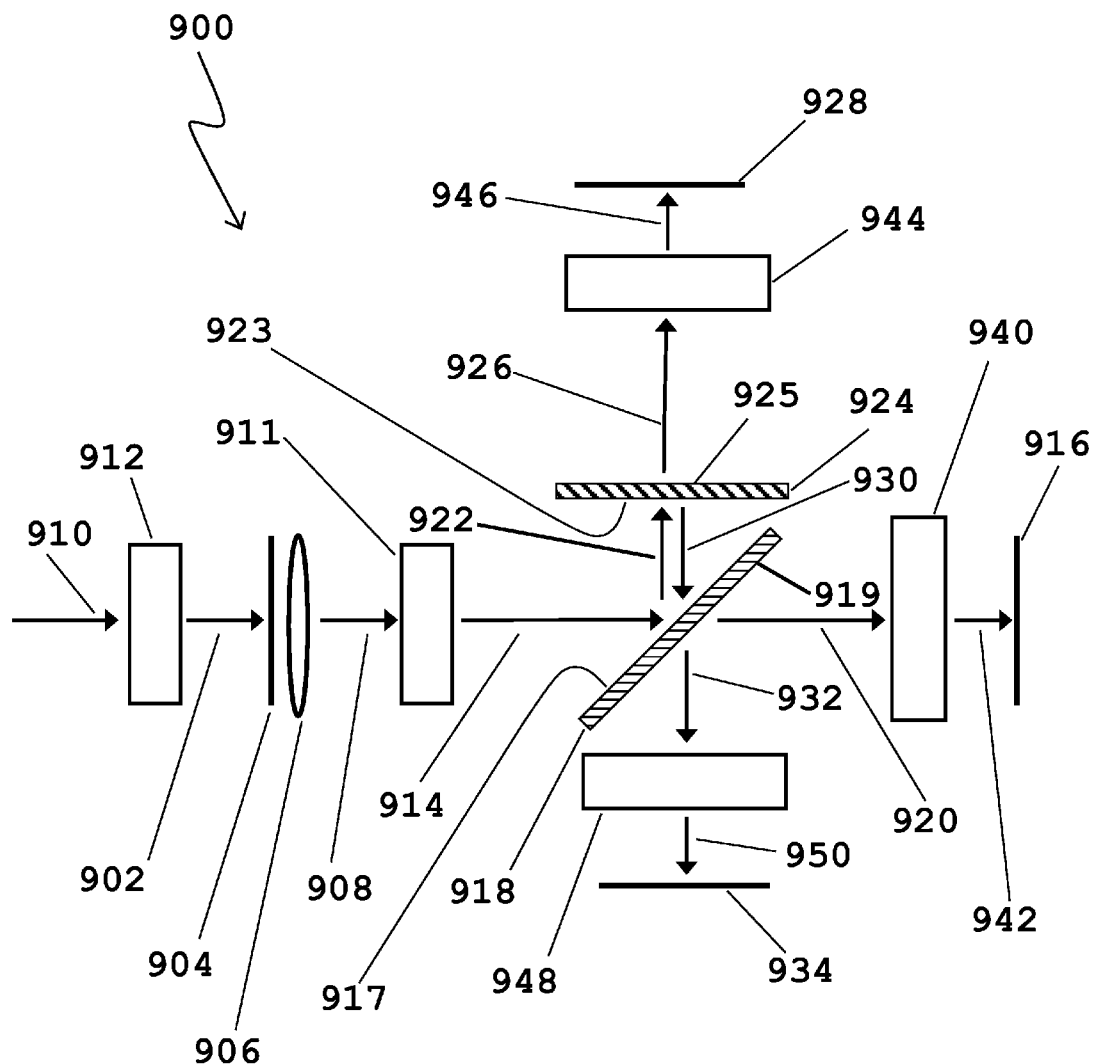
FIG. 16 is an embodiment of the present invention comprising a collimating lens.

The present invention may be applied to effectively collimated image beams in contrast to the converging image beams (i.e. image-forming beams) of the previous embodiments. FIG. 16 is a schematic diagram of embodiment 900 of the present invention. Referring to FIG. 16, optical radiation 910 preferably from an object (not shown) is incident on imaging lens system 912, which may comprise, for example, a camera lens. The design of imaging lens system 912 is a straightforward matter for those skilled in the art of lens design. Imaging lens system 912 is preferably coated on all transmissive optical surfaces with anti-reflective coatings. Image-forming light 902 exits imaging lens system 912 and forms an image at intermediate image plane 904. A field lens 906 may optionally be placed substantially coincident with intermediate image plane 904 in order to minimize 'vignetting', which can occur when imaging lens system 912 is non-telecentric. The decision about the necessity for, and the design of, field lens 906 are straightforward matters for those skilled in the art of lens design. Field lens 906 is preferably coated on all transmissive optical surfaces with anti-reflective coatings.

Diverging light 908 exits the intermediate image plane 904 (and optional field lens 906) and is next incident on collimating lens system 911, which is preferably designed, located and oriented in such a way as to effectively collimate image beam 914. Collimating lens system 911 limits the divergence of diverging light 908; otherwise the divergence might be so high that some of the light misses beamsplitter 918. This may occur, for example, if it is desired to set imaging lens system 912 to a lower f-number, such as an f-stop of one (f/1). The design of the collimating lens system 911, which may comprise a shaping optic, is a straightforward matter for those skilled in the art of lens design. The collimating lens system 911 is preferably coated on all transmissive optical surfaces with anti-reflective coatings. Effectively collimated image beam 914 is incident on beamsplitter 918, which is preferably oriented at a 45-degree angle to the path of the effectively collimated image beam 914, although any angle in the range between 0 and 180 degrees may be used. Beamsplitter 918 is preferably coated on its first surface 917 with a partially-reflecting broadband coating, and preferably coated on its second surface 919 with an anti-reflective coating. Alternatively, beamsplitter 918 may comprise a so-called "pellicle" beamsplitter, such as Part Number NT39-482 from Edmund Optics.

First transmitted beam portion 920 next passes through imaging lens system 940, which focuses first transmitted beam portion 920 into image-forming beam portion 942, which forms an image on image sensor 916. Imaging lens system 940 is preferably designed to adapt to the particularities of imaging lens system 912 in conjunction with optional field lens 906, collimating lens system 911, beamsplitter 918, and the particular distance traveled by the light beams 902, 908, 914, 920, and 942, in order to ensure that a good quality image is formed on the first image sensor 916. The exact design of imaging lens system 940 will depend upon the exact designs of imaging lens system 912, optional field lens 906, and collimating lens system 911, and on the material and thickness beamsplitter 918. Imaging lens system 940 is preferably coated on all transmissive optical surfaces with anti-reflective coatings. Imaging lens system 940 may optionally be designed to correct aberrations induced by the passage of the light beam through the tilted air/glass interfaces of beamsplitter 918 (which may comprise a tilted flat glass plate), although these aberrations are typically small because the image beam in that region has been effectively collimated by collimating lens 911 and optional field lens 906. The design of imaging lens system 940 is a straightforward matter for those skilled in the art of lens design.

First reflected beam portion 922 next is incident on beamsplitter 924, which is preferably oriented perpendicular to first reflected beam portion 922. Beamsplitter 924 is preferably coated on its first surface 923 with a partially-reflecting coating, and preferably coated on its second surface 925 with an anti-reflective coating. Alternatively, beamsplitter 924 may comprise a so-called "pellicle" beamsplitter, such as Part Number NT39-482 from Edmund Optics. Second transmitted beam portion 926 next passes through imaging lens system 944, which focuses image-forming beam portion 946 that exits the imaging lens system 944 and forms an image on image sensor 928. Imaging lens system 944 is preferably designed to adapt to the particularities of imaging lens system 912 in conjunction with the optional field lens 906, collimating lens system 911, beamsplitter 925, and the particular distance traveled by light beams 902, 908, 914, 922, 926, and 946, in order to ensure that a good quality image is formed on image sensor 928. The exact design of imaging lens system 944 will depend upon the exact designs of imaging lens system 912, optional field lens 906, and the collimating lens system 911, and on the material and thickness of beamsplitter 925. Imaging lens system 944 is preferably coated on all transmissive optical surfaces with anti-reflective coatings. The design of imaging lens system 944 is a straightforward matter for those skilled in the art of lens design.

Second reflected beam portion 930 is incident on beamsplitter 918. As a result, third transmitted beam portion 932 is created and passes through imaging lens system 948, which focuses it into image-forming beam portion 950, which forms an image on image sensor 934. Imaging lens system 948 is preferably designed to adapt to the particularities of imaging lens system 912 in conjunction with optional field lens 906, collimating lens system 911, beamsplitter 918, and the particular distance traveled by the light beams 902, 908, 914, 922, 930, 932, and 950, in order to ensure that a good quality image is formed on image sensor 934. The exact design of imaging lens system 948 will depend upon the exact designs of imaging lens system 912, optional field lens 906, and collimating lens system 911, and on the material and thickness of beamsplitter 918. Imaging lens system 948 is preferably coated on all transmissive optical surfaces with anti-reflective coatings. Imaging lens system 948 may optionally be designed to correct aberrations induced by the passage of the light beam through the tilted air/glass interfaces of beamsplitter 918 (which may comprise a tilted flat glass plate), although these aberrations are typically small because the image beam in that region has been effectively collimated by collimating lens 911 and optional field lens 906. The design of imaging lens system 948 is a straightforward matter for those skilled in the art of lens design.

For optimal performance, it is preferred that imaging lens systems 940, 944 and 948 are all different from one another in form and function, each being individually designed to correct the beam at its particular location, although this is not necessary for the invention's function and it is possible to have good function using imaging lens systems that are identical in form and/or function.

Imaging lens system 940 is preferably designed in such a way that it is complementary to imaging lens system 912 together with optional field lens 906, collimating lens system 911, and beamsplitter 918. In this way, imaging lens system 912, optional field lens 906, collimating lens system 911, beamsplitter 918, and imaging lens system 940 collectively form an imaging system that produces a good image on image sensor 916. Likewise, imaging lens system 912, optional field lens 906, collimating lens system 911, beamsplitter 925, and imaging lens system 944 collectively form an imaging system that produces a good image on image sensor 928. Similarly, imaging lens system 912, optional field lens 906, collimating lens system 911, beamsplitter 918, and imaging lens system 948 collectively form an imaging system that produces a good image on image sensor 934. The images formed on image sensors 916, 928, and 934 are preferably all substantially identical to one another, typically except for different light levels or focuses.

The use of an effectively collimated image beam has advantages (less aberrations, lower f-number imaging lens) described above. However, the use of an effectively collimated image beam makes it necessary to include imaging lenses 940, 944 and 948, and thus added complexity, to the system, compared to the case when the collimating lens 911 is not present. In this embodiment, after collimating lens 911 the image beam is effectively collimated until it reaches imaging lenses 944, 940, 948.

Although the images formed on image sensors 916, 928, 934 are preferably all substantially identical to one another in the present embodiment (optionally except for different light levels or focuses), imaging lens systems 940, 944, 948 may optionally have different magnifying powers, thus providing an overall imaging system that provides multiple different zoom levels and multiple different fields-of-view all through a single imaging lens system 912.

Because of similar geometries, the reflectance equations of embodiment 100 may be applied to this embodiment 900 as well.

Figure 17:
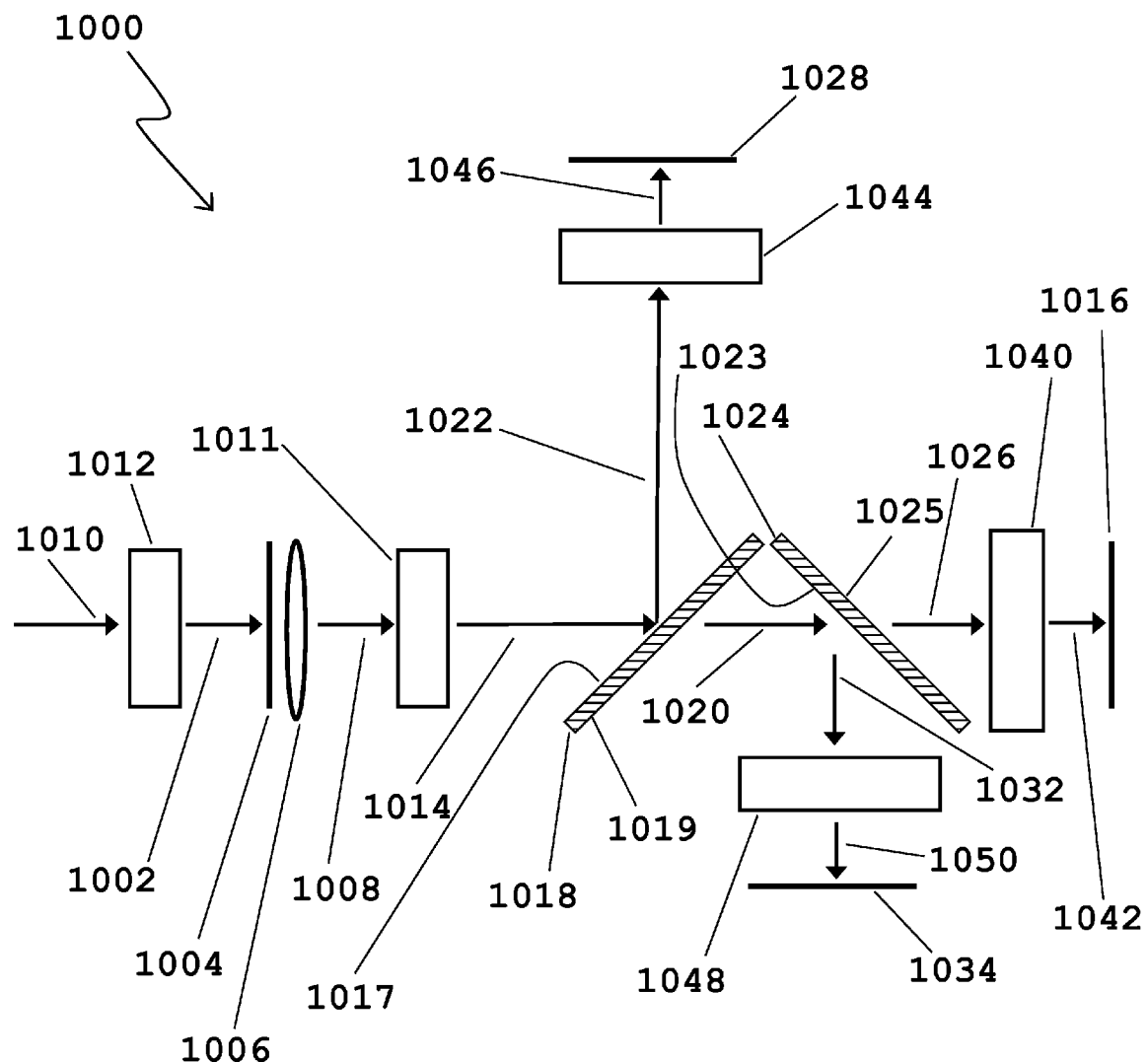
FIG. 17 is another embodiment of the present invention comprising a collimating lens.

FIG. 17 is a schematic diagram of embodiment 1000 of the present invention. Referring to FIG. 17, optical radiation 1010 preferably from an object (not shown) is incident on imaging lens system 1012, which is preferably coated on all transmissive optical surfaces with anti-reflective coatings. The design of imaging lens system 1012 is a straightforward matter for those skilled in the art of lens design. Image-forming light beam 1002 exits imaging lens system 1012 and forms an image at intermediate image plane 1004. Field lens 1006 may optionally be placed substantially coincident with intermediate image plane 1004. Field lens 1006 is not strictly necessary in all cases; however, a field lens is often used to help minimize 'vignetting'. Optional field lens 1006 is preferably coated on all transmissive optical surfaces with anti-reflective coatings. The decision about the necessity for, and the design of, field lens 1006 are straightforward matters for those skilled in the art of lens design.

Diverging light 1008 exits intermediate image plane 1004 (and optional field lens 1006) and is next incident on collimating lens system 1011, which is preferably located and oriented in such a way that the light beam 1014 exiting the collimating lens system 1011 is an effectively collimated image beam. Collimating lens system 1011 is preferably coated, on all transmissive optical surfaces, with anti-reflective coatings. The advantages and disadvantages of using a collimated light beam are described above in the previous embodiment. The design of collimating lens system 1011 is a straightforward matter for those skilled in the art of lens design.

Effectively collimated image beam 1014 is incident on beamsplitter 1018, which is preferably oriented at a 45-degree angle to the path of the light beam 1014, although any angle in the range between 0 and 180 degrees may be used. Beamsplitter 1018 is preferably coated on its first surface 1017 with a partially-reflecting broadband coating, and preferably coated on its second surface 1019 with an anti-reflective coating. Alternatively, beamsplitter 1018 may comprise a so-called "pellicle" beamsplitter, such as Part Number NT39-482 from Edmund Optics.

First reflected beam portion 1022 next passes through imaging lens system 1044, which is preferably designed to adapt to the particularities of imaging lens system 1012 in conjunction with optional field lens 1006, collimating lens system 1011, and the particular distance traveled by the light beams 1002, 1008, 1014, 1022, and 1046, in order to ensure that a good quality image is formed on image sensor 1028. The exact design of the imaging lens system 1044 will depend upon the exact designs of imaging lens system 1012, optional field lens 1006, and collimating lens system 1011. The imaging lens system 1044 is preferably coated on all transmissive optical surfaces with anti-reflective coatings. The design of the imaging lens system 1044 is a straightforward matter for those skilled in the art of lens design. After passing through and being focused by imaging lens system 1044, first image-forming beam portion 1046 forms an image on image sensor 1028.

First transmitted beam portion 1020 is incident on beamsplitter 1024, which is preferably oriented at a 45-degree angle to the path of first transmitted beam portion 1020, although any angle in the range between 0 and 180 degrees may be used, and oriented at a 90-degree angle to beamsplitter 1018, although any angle in the range between 0 and 180 degrees may be used. Beamsplitter 1024 is preferably coated on its first surface 1023 with a partially-reflecting coating, and preferably coated on its second surface 1025 with an anti-reflective coating. Alternatively, beamsplitter 1024 may comprise a so-called "pellicle" beamsplitter, such as Part Number NT39-482 from Edmund Optics.

Second transmitted beam portion 1026 next passes through imaging lens system 1040, which focuses the beam to form second image-forming beam portion 1042, which forms an image on image sensor 1016. Imaging lens system 1040 is preferably designed to adapt to the particularities of imaging lens system 1012 in conjunction with optional field lens 1006, collimating lens system 1011, beamsplitter 1018, beamsplitter 1024, and the particular distance traveled by the light beams 1002, 1008, 1014, 1020, 1026 and 1042, in order to ensure that a good quality image is formed on image sensor 1016. The exact design of imaging lens system 1040 will depend upon the exact designs of imaging lens system 1012, optional field lens 1006, and collimating lens system 1011, and will also depend upon the materials and thicknesses of beamsplitters 1018 and 1024. Imaging lens system 1040 is preferably coated on all transmissive optical surfaces with anti-reflective coatings. Imaging lens system 1040 may optionally be designed to correct aberrations induced by the passage of the light beam through the tilted air/glass interfaces of beamsplitters 1018 and 1024 (which each may comprise a tilted flat glass plate), although these aberrations are typically small because the image beam in that region has been effectively collimated by collimating lens 1011 and optional field lens 1006. The design of the imaging lens system 1040 is a straightforward matter for those skilled in the art of lens design.

Second reflected beam portion 1032 passes through and is focused by imaging lens system 1048, and third image-forming beam portion 1050 forms an image on image sensor 1034. Imaging lens system 1048 is preferably designed to adapt to the particularities of imaging lens system 1012 in conjunction with optional field lens 1006, collimating lens system 1011, beamsplitter 1018, and with the particular distance traveled by light beams 1002, 1008, 1014, 1020, 1032 and 1050, in order to ensure that a good quality image is formed on image sensor 1034. The exact design of imaging lens system 1048 will depend upon the exact designs of imaging lens system 1012, optional field lens 1006, and collimating lens system 1011, and will also depend upon the material and thickness of beamsplitter 1018. Imaging lens system 1048 is preferably coated on all optical surfaces with anti-reflective coatings. Imaging lens system 1048 may optionally be designed to correct aberrations induced by the passage of the light beam through the tilted air/glass interfaces of beamsplitters 1018 and 1024 (which each may comprise a tilted flat glass plate), although these aberrations are typically small because the image beam in that region has been effectively collimated by collimating lens 1011 and optional field lens 1006. The design of imaging lens system 1048 is a straightforward matter for those skilled in the art of lens design and imaging lens system correction.

For optimal performance, it is preferred that the imaging lens systems 1040, 1044 and 1048 are different from one another in form and function, each being individually designed to correct the beam at its particular location, although this is not necessary for the invention's function and it is possible to have good correction using imaging lens systems that are identical in form. Imaging lens system 1040 is preferably designed in such a way that it is complementary to imaging lens system 1012 together with optional field lens 1006, collimating lens system 1011, beamsplitter 1018, and beamsplitter 1024 (either or both of which may comprise a tilted flat glass plate). In this way, imaging lens system 1012, optional field lens 1006, collimating lens system 1011, beamsplitter 1018, beamsplitter 1024, and imaging lens system 1040 collectively form an imaging system that produces a good image on image sensor 1016. Likewise, imaging lens system 1012, optional field lens 1006, collimating lens system 1011, and imaging lens system 1044 collectively form an imaging system that produces a good image on image sensor 1028. Similarly, imaging lens system 1012, optional field lens 1006, collimating lens system 1011, beamsplitter 1018, and imaging lens system 1048 collectively form an imaging system that produces a good image on image sensor 1034. The images formed on image sensors 1028, 1016, and 1034 are preferably all substantially identical to one another, with the exception of different light levels or focuses, depending on the application.

Each of the imaging lens systems 1040, 1044, 1048 may optionally be designed to provide different magnification, thereby providing a "zoom" magnification effect when comparing images formed on each of the image sensors 1016, 1028, 1034.

Because of similar geometries, the reflectance equations of embodiment 600 may be applied to this embodiment 1000 as well.

Embodiments 900 and 1000 may alternatively utilize solid prisms, similar respectively to embodiments 300 and 800 described above.

Figure 18:
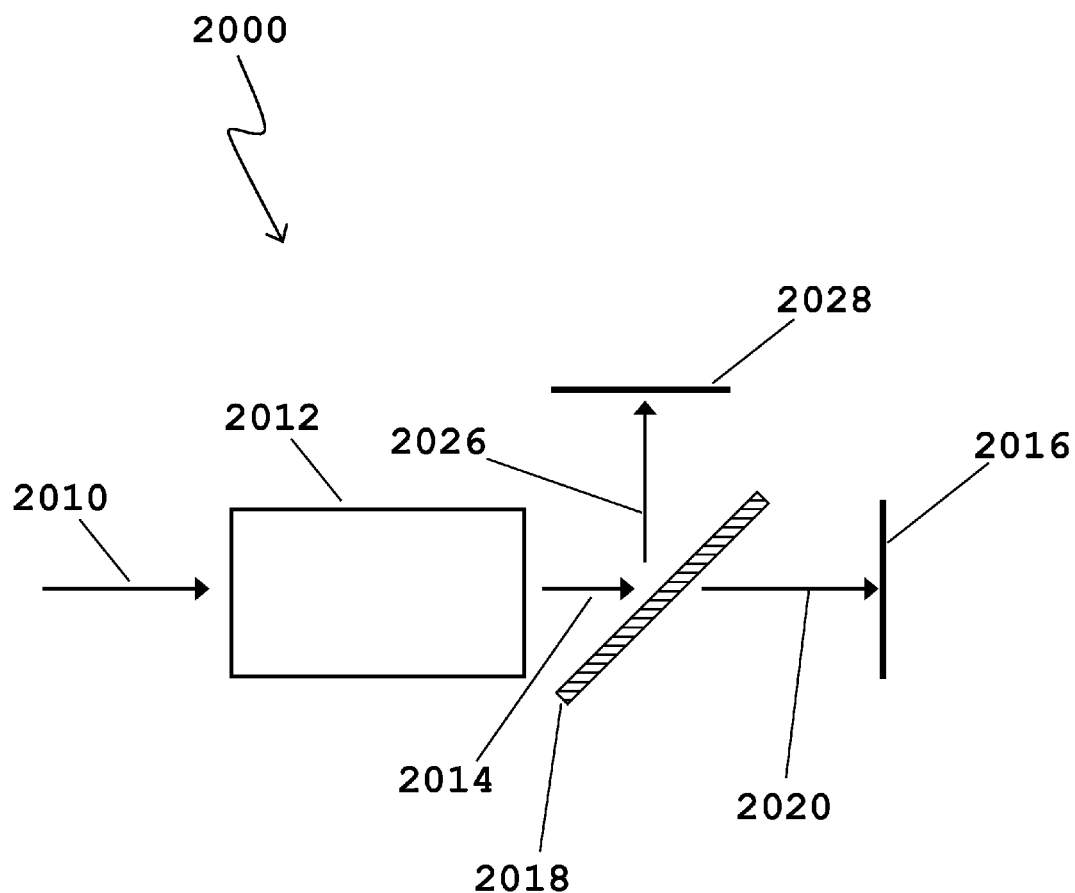
FIG. 18 is a schematic of an embodiment of the present invention comprising a single beamsplitter.

FIG. 18 is a schematic diagram of embodiment 2000 of the present invention which utilizes a single beamsplitter to split the light from a single imaging system so as to produce two spatially-identical images on two separate detector planes. Referring to FIG. 18, optical radiation 2010 preferably from an object (not shown) is incident on imaging lens system 2012. Any imaging or image forming lens system may be used in this embodiment of the invention. For example, any of the camera lenses manufactured by Nikon, Olympus, Panavision, or Thales Angenieux may be used as imaging lens system 2012. Image-forming beam 2014 exits the imaging lens system 2012 as a converging image beam and is incident on beamsplitter 2018, preferably oriented at a 45-degree angle to the path of image-forming beam 2014, although any angle in the range between 0 and 180 degrees may be used.

Beamsplitter 2018 is preferably thin; for example it may be 0.5 mm thick and comprise glass with flat and parallel front and back surfaces; or it may comprise a so-called "pellicle" beamsplitter, such as Part Number NT39-482 from Edmund Optics. In practice, it has been found that, in order to minimize aberrations sufficiently to form substantially identical images, beamsplitter 2018 should preferably be thin, since geometric aberrations caused by the tilted glass/air interfaces of beamsplitter 2018 increase in size as the thickness of beamsplitter 2018 increases. In some embodiments, as a general measure, the beamsplitter thickness is preferably less than approximately 100 times the greater of either of these two values: (a) the pixel width of an individual pixel in an image sensor; or (b) the diffraction spot size, or Airy disc diameter, of the imaging lens system or front lens of the system.

As a result of this beamsplitter arrangement, first transmitted beam portion 2020 continues toward image sensor 2016, where it forms an image, and reflected beam portion 2026 is reflected toward and forms an image on image sensor 2028. In this case, the images formed on image sensors 2016, 2028 are substantially identical, preferably except for different light levels, as described next.

The portion of the radiant power of the original image forming beam 2014 that is present in the image formed on image sensor 2016 is equal to (1-R1-A1), where R1 is the reflectance and A1 is the absorbance of beamsplitter 2018. The value of R1 may be chosen to be anything in the range between 0 and 1.0. The portion of the radiant power of the original image forming beam 2014 that is present in the image formed on image sensor 2028 is equal to R1 With these two equations, any set of light level ratios between the image sensor 2016, and image sensor 2028 may be achieved by selecting the proper value for R1.

For example, if it is desired to achieve a light level ratio between image sensor 2016 and image sensor 2028 of approximately 2:1, and the absorbance of the beamsplitter 2018 is zero, then the optimum reflectance value R1 equals 0.33. Alternatively, if it is desired to achieve a light level ratio between image sensor 2016 and image sensor 2028 of approximately 10:1, and the absorbance of the beamsplitter 2018 is zero, then the optimum reflectance value R1 equals 0.09. Or, if it is desired to achieve a light level ratio between image sensor 2016 and image sensor 2028 of 3:1, and the absorbance of the beamsplitter 2018 is zero, then the optimum reflectance value R1 equals 0.25.

In another example it is useful that the light levels of the images on each of the image sensors are equal. Thus if it is desired to achieve a light level ratio between image sensor 2016 and image sensor 2028 of 1:1, and the absorbance of the two beamsplitters is zero, then the optimum reflectance value R1 equals 0.50. In this case, each of the two image sensors 2016, and 2028 capture substantially identical images with substantially identical light levels.

When both image sensors 2016 and 2028 are caused to capture substantially identical images with substantially identical light levels, the moment of image capture for each of the two individual image sensors 2016, and 2028 may optionally be precisely staggered in such a way that the individual movie frames successively captured by each of the two image sensors may be interleaved, thereby providing a moving image film with double the framerate of any one image sensor. This high speed camera application is applicable to any of the embodiments of the present invention described herein.

Figure 19:
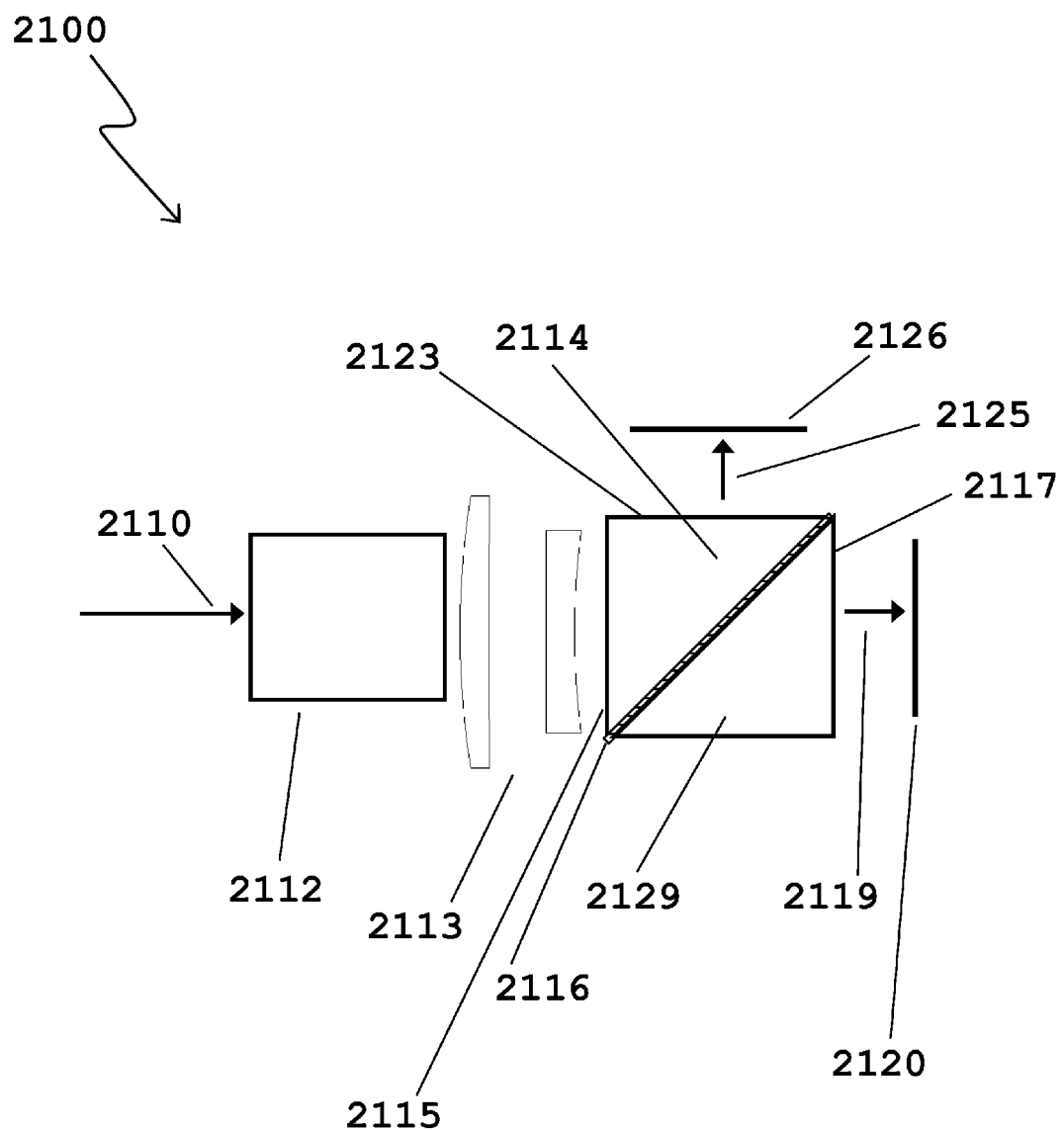
FIG. 19 is a schematic of an embodiment of the present invention comprising solid prisms and a single beamsplitting element.

FIG. 19 is a schematic diagram of an embodiment 2100 of the present invention. The basic function of this embodiment 2100 is identical to the basic function of embodiment 2000, so a detailed description of the light paths, and image-forming, image-capture, and image-combining methods is not given again. Referring to FIG. 19, optical radiation 2110 preferably from an object (not shown) is incident on imaging lens system 2112, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used.

After passing through imaging lens system 2112, the light next passes through optional corrective lens system 2113, which is preferably designed to adapt to the particularities of imaging lens system 2112 in order to properly pre-correct the light so that it is best suited for traveling through solid prisms 2114 and 2129. Specifically, because prisms 2114 and 2129, which preferably comprise thick glass, will introduce chromatic and spherical aberration into image forming beam portions 2119 and 2125, the primary function of optional corrective lens system 2113 is to add an equal and opposite amount of aberration, thereby ensuring that image forming beam portions 2119 and 2125 are both optically well-corrected and that they both form high-resolution images. Because the total optical path lengths for both beam portions are preferably identical, only one optional corrective lens system 2113 is required for both beam portions. The design of the corrective lens system 2113 is a straightforward matter for those skilled in the art of lens design and lens system adaptation. If imaging lens system 2112 is designed in conjunction with the presence of solid prisms 2114 and 2129, then there typically is no need to include optional corrective lens system 2113.

Figure 20:
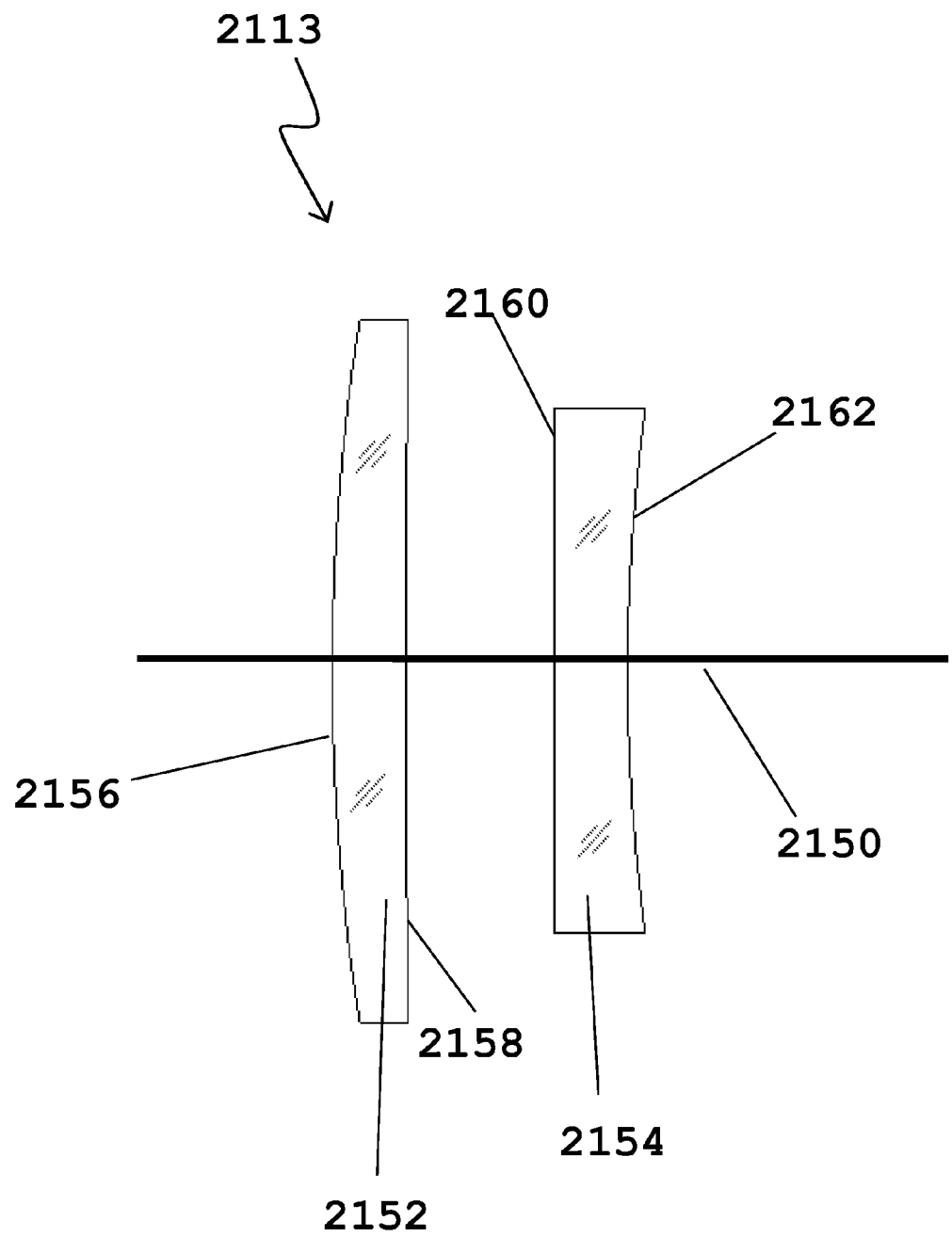
FIG. 20 is a detail of the corrective lens system utilized in the embodiment shown in FIG. 19.

Corrective lens system 2113 preferably comprises an air-spaced doublet, as shown in FIG. 20. Individual lens elements 2152 and 2154, which comprise corrective lens system 2113, are preferably rotationally symmetric about their central optical axis 2150. Lens element 2152 preferably comprises glass with a refractive index at the sodium d-line wavelength ($n_d$) equal to 1.7847 and Abbe dispersion value at the sodium d-line wavelength ($V_d$) equal to 25.680, such as N-SF11 manufactured by Schott Glass. Lens element 2152 preferably has an edge diameter of 32.0 mm and a center thickness (measured along the central optical axis of rotation 2150) of 3.50 mm. Lens element 2154 preferably comprises glass with a refractive index at the sodium d-line wavelength ($n_d$) equal to 1.8467 and Abbe dispersion value at the sodium d-line wavelength ($V_d$) equal to 23.780, such as N-SF57 manufactured by Schott Glass. Lens element 2154 preferably has an edge diameter of 28.0 mm and a center thickness (measured along the central optical axis of rotation 2150) of 3.50 mm.

The shapes of the optical surfaces of lens elements 2152 and 2154 are preferably spheres. The shape of first surface 2156 of lens element 2152 is preferably a convex sphere with a radius of curvature of 107.552 mm. The shape of second surface 2158 of lens element 2152 is preferably a concave sphere with a radius of curvature of −1321.559 mm. The shape of first surface 2160 of lens element 2154 is preferably a flat plane. The shape of second surface 2162 of lens element 2152 is preferably a concave sphere with a radius of curvature of 93.487 mm.

The center thickness (measured along the central optical axis of rotation 2150) between the back mounting plane of imaging lens system 2112 and lens element 2152 is preferably 10.5 mm. The center thickness (measured along the central optical axis of rotation 2150) between lens element 2152 and lens element 2154 is preferably 7.055 mm. The center thickness (measured along the central optical axis of rotation 2150) between lens element 2154 and the front face 2115 of glass prism 2114 is preferably 3.426 mm.

Referring again to FIG. 19, front face 2115 of prism 2114 preferably comprises an anti-reflective coating, and a partially-reflecting coating 2116 is preferably applied to the back face of prism 2114. Partially-reflecting coating 2116 preferably reflects approximately 13% of all light, irrespective of wavelength or polarization, and preferably transmits approximately 77% of all light, irrespective of wavelength or polarization. Such a partially-reflecting coating is preferably deposited using a hybrid metal-dielectric coating technology, for example Newport Corporation's catalog part number MB.1, which offers constant transmittance over all visible wavelengths and all polarization states.

Prism 2129 is preferably placed in contact with, and is preferably cemented to, partially-reflecting coating 2116 on the back face of prism 2114. Alternatively, partially-reflecting coating 2116 may be applied to the front surface of prism 2129, and then the coating and prism is cemented to the back face of prism 2114. An anti-reflective coating is preferably applied to back face 2117 of prism 2129. Image-forming beam portion 2119 is transmitted through prism 2114, partially-reflecting coating 2116, and prism 2129 and forms an image on image sensor 2120, which preferably comprises a high-definition motion picture CMOS or CCD sensor, such as model SI-1920HD manufactured by Silicon Imaging.

An anti-reflective coating is preferably applied to output face 2123 of glass prism 2124. Image-forming beam portion 2125 is transmitted through prism 2114, reflects off partially-reflecting coating 2116, and is transmitted again through prism 2114 and forms an image on image sensor 2126, which preferably comprises a high-definition motion picture CMOS or CCD sensor, such as model SI-1920HD manufactured by Silicon Imaging.

Because partially-reflecting coating 2116 preferably comprises a relatively thin beamsplitter, and prisms 2114 and 2129 are preferably cemented together (thus leaving no air gaps), no aberrations are introduced by tilted coating 2116.

Figure 21:
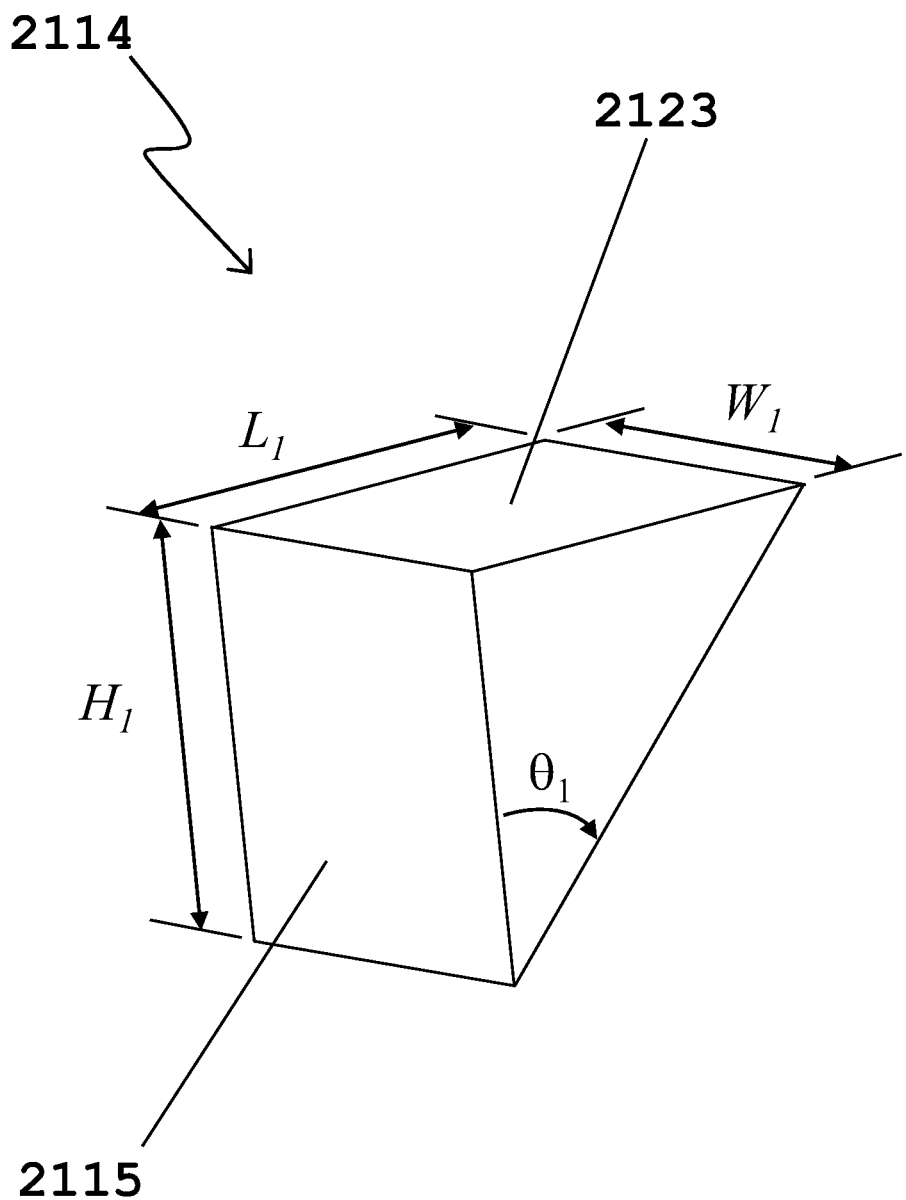
FIGS. 21 and 22 are details of the prisms utilized in the embodiment shown in FIG. 19.

FIG. 21 shows a tilted view of prism 2114, which is preferably a rectangular volume and is preferably made of a low-dispersion glass such as N-FK51A manufactured by Schott Glass ($n_d$=1.4866, $V_d$=84.468). Prism 2114 preferably has a length (denoted by "$L_1$") equal to 25.4 mm, a width (denoted by "$W_1$") equal to 25.4 mm, a height (denoted by "$H_1$") equal to 25.4 mm, and a back-face angle (denoted by "$\theta_1$") equal to 45 degrees, although any angle in the range between 0 and 180 degrees may be used.

Figure 22:
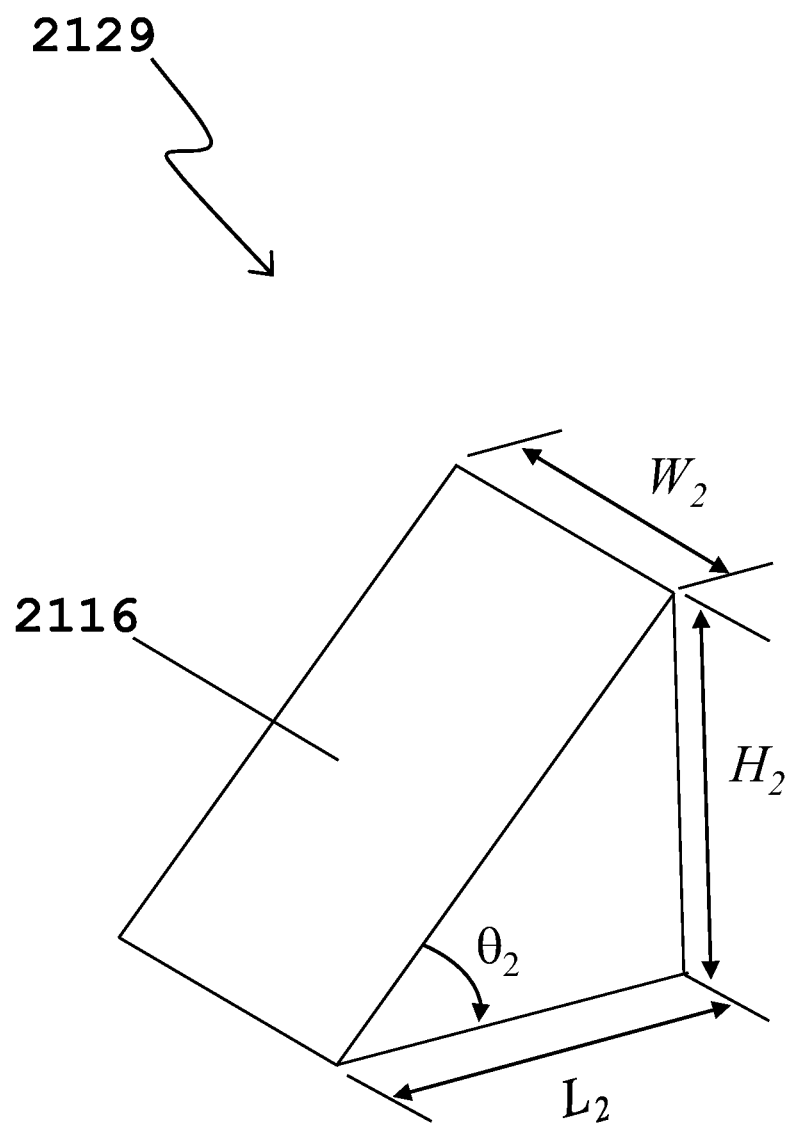

FIG. 22 shows a tilted view of prism 2129, which is preferably a rectangular volume and is preferably made of a low-dispersion glass such as N-FK51A manufactured by Schott Glass ($n_d$=1.4866, $V_d$=84.468). Prism 2129 preferably has a length (denoted by "$L_2$") equal to 25.4 mm, a width (denoted by "$W_2$") equal to 25.4 mm, a height (denoted by "$H_2$") equal to 25.4 mm, and a front-face angle (denoted by "$\theta_2$") equal to 45 degrees, although any angle in the range between 0 and 180 degrees may be used.

As mentioned above, the dimensions, materials, and other characteristics described in this embodiment are specific to a large-format film camera lens manufactured by Hasselblad having a focal length of 80 mm and an f-number of f/2.8. For other imaging lens systems, different dimensions, materials, and characteristics would be applicable. Because of similar geometries, the reflectance equations of embodiment 2000 may be applied to this embodiment 2100 as well.

Figure 23:
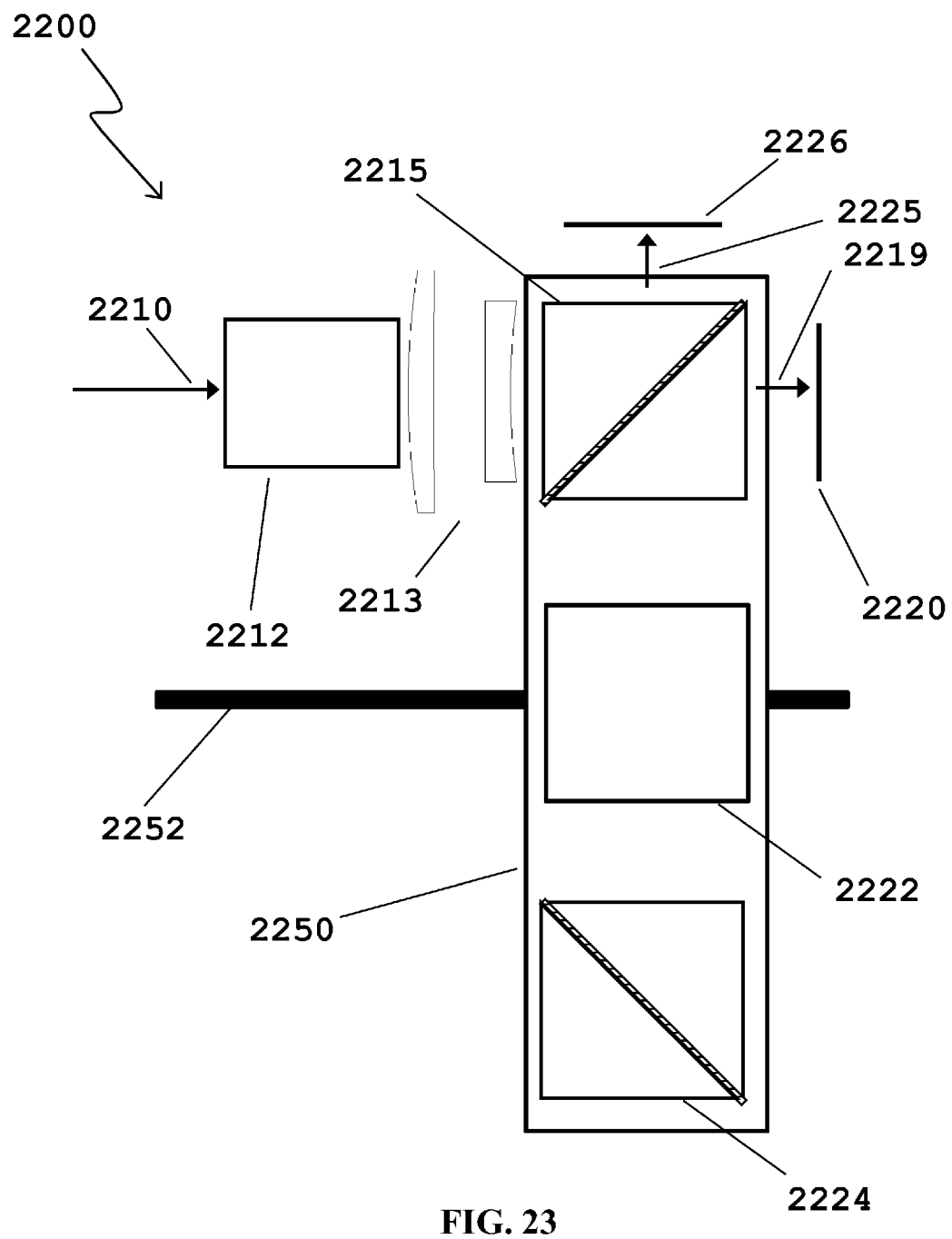
FIG. 23 is a schematic of an embodiment of the present invention comprising replaceable cube beamsplitters.

FIG. 23 is a schematic diagram of an embodiment 2200 of the present invention. The basic function of this embodiment 2200 is identical to the basic function of embodiment 2100, so a detailed description of the light paths, and image-forming, image-capture, and image-combining methods is not given again. Referring to FIG. 23, optical radiation 2210 preferably from an object (not shown) is incident on imaging lens system 2212, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. Imaging lens system 2212 in embodiment 2200 is identical to imaging lens system 2112, as described in embodiment 2100. After passing through imaging lens system 2212, the light next passes through optional corrective lens system 2213, which is preferably designed to adapt to the particularities of imaging lens system 2212 in order to properly pre-correct the light so that it is best suited for traveling through solid cemented cube beamsplitter 2215. Optional corrective lens system 2213 in embodiment 2200 is preferably identical to corrective lens system 2113 in embodiment 2100.

Figure 24:
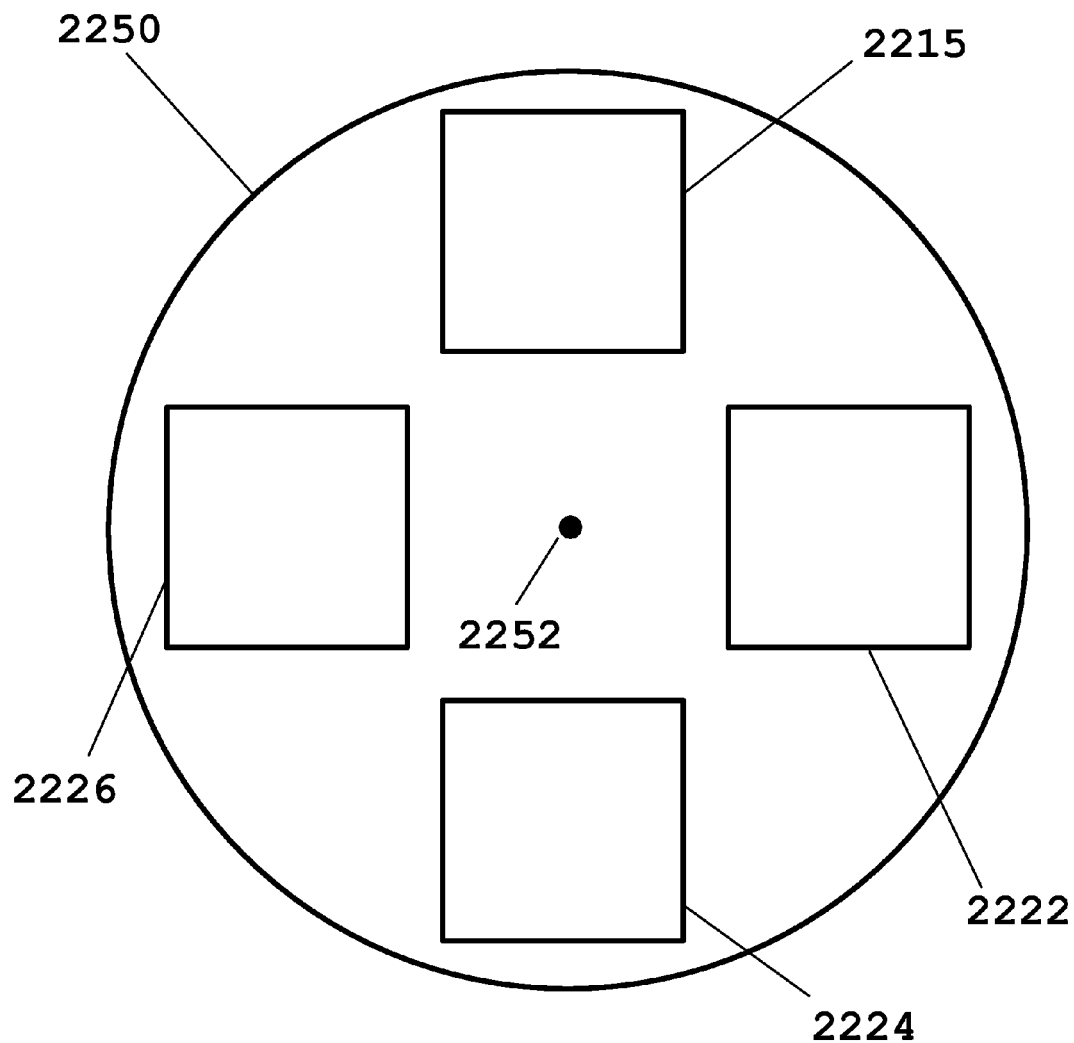
FIG. 24 is a detail of an embodiment of a circular stage used to change the cube beamsplitters in the embodiment of FIG. 23.

The optical function of embodiment 2200 is preferably identical to the optical function of embodiment 2100. Compared to embodiment 2100, embodiment 2200 further comprises the ability to quickly and accurately substitute one of any number of differently-coated solid cemented cube beamsplitters in place of solid cemented cube beamsplitter 2215. FIG. 24 shows a front view schematic of solid cemented cube beamsplitters 2215, 2222, 2224, and 2226, preferably equally spaced about, and preferably firmly affixed to, disc 2250, which is centered on a central axle 2252. Preferably utilizing methods that are well-known and widely used in the field of kinematic opto-mechanical alignment, disc 2250 is designed in such a way that rotation of the disc about its central axis 2252 results in a desired solid cemented cube beamsplitter replacing the previous solid cemented cube beamsplitter in precise placement and alignment. For example, a 90-degree counter-clockwise rotation of the disc 2250 will result in solid cemented cube beamsplitter 2222 exactly replacing solid cemented cube beamsplitter 2215 in the optical arrangement of embodiment 2200.

Solid cemented cube beamsplitter 2215 is preferably identical to cemented and coated prisms 2114 and 2129 in embodiment 2100, and preferably exhibits a reflectivity of 13% and a transmittance of 77%. Solid cemented cube beamsplitter 2222 preferably exhibits a reflectivity of 8% and a transmittance of 82%. Solid cemented cube beamsplitter 2224 preferably exhibits a reflectivity of 4% and a transmittance of 86%. Solid cemented cube beamsplitter 2226 preferably exhibits a reflectivity of 3% and a transmittance of 87%. However, any number of cube beamsplitters, and any transmittance and reflectance values therefor, may be used.

Figure 25:
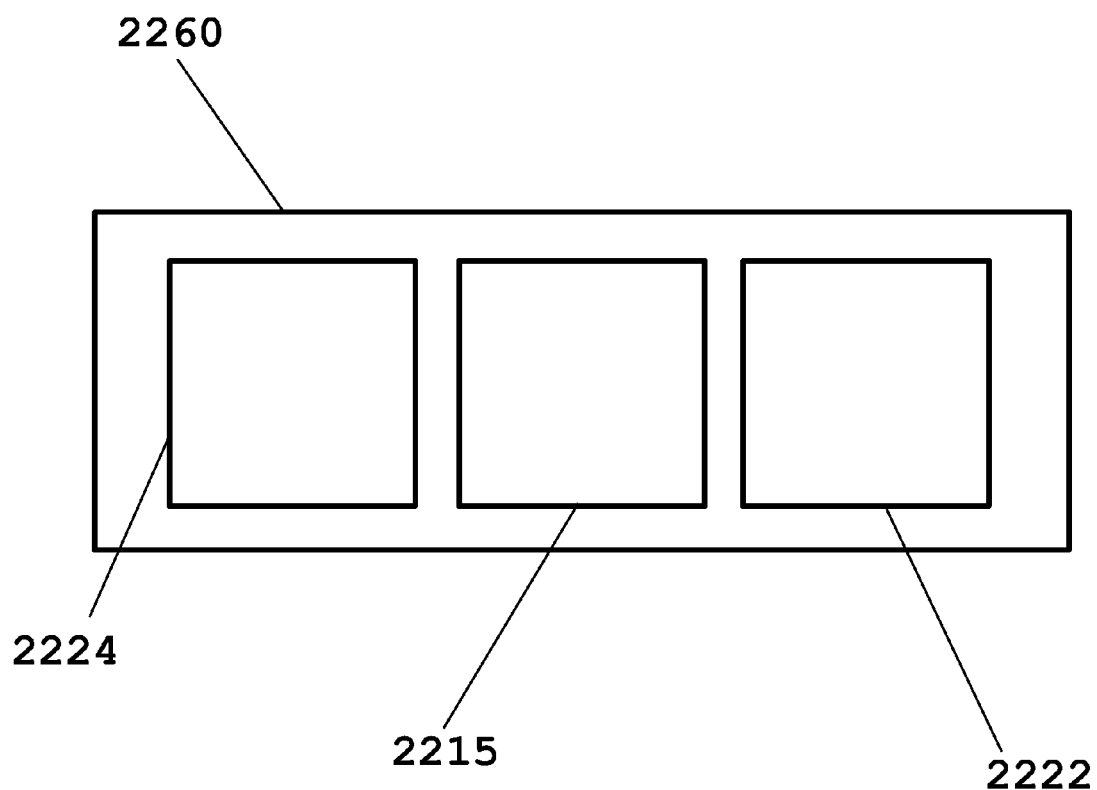
FIG. 25 shows an embodiment of a linear translation stage for substituting cube beamsplitters in accordance with the embodiment of FIG. 23.

FIG. 25 shows a front view schematic of three solid cemented cube beamsplitters 2215, 2222, and 2224, preferably equally spaced and firmly affixed to linear-translation stage 2260. Optionally, linear-translation stage 2260 may replace rotating disc 2250 of embodiment 2200, thus providing a similar method for quickly and accurately switching solid cemented cube beamsplitters in the optical arrangement of embodiment 2200. Utilizing methods that are well-known and widely used in the field of kinematic opto-mechanical alignment, linear translation stage 2260 is designed in such a way that linear translation of the stage results in a desired solid cemented cube beamsplitter replacing the previous solid cemented cube beamsplitter in precise placement. For example, a translation of stage 2260 will result in solid cemented cube beamsplitter 2222 exactly replacing solid cemented cube beamsplitter 2215 in the optical arrangement of embodiment 2200.

Figure 26:
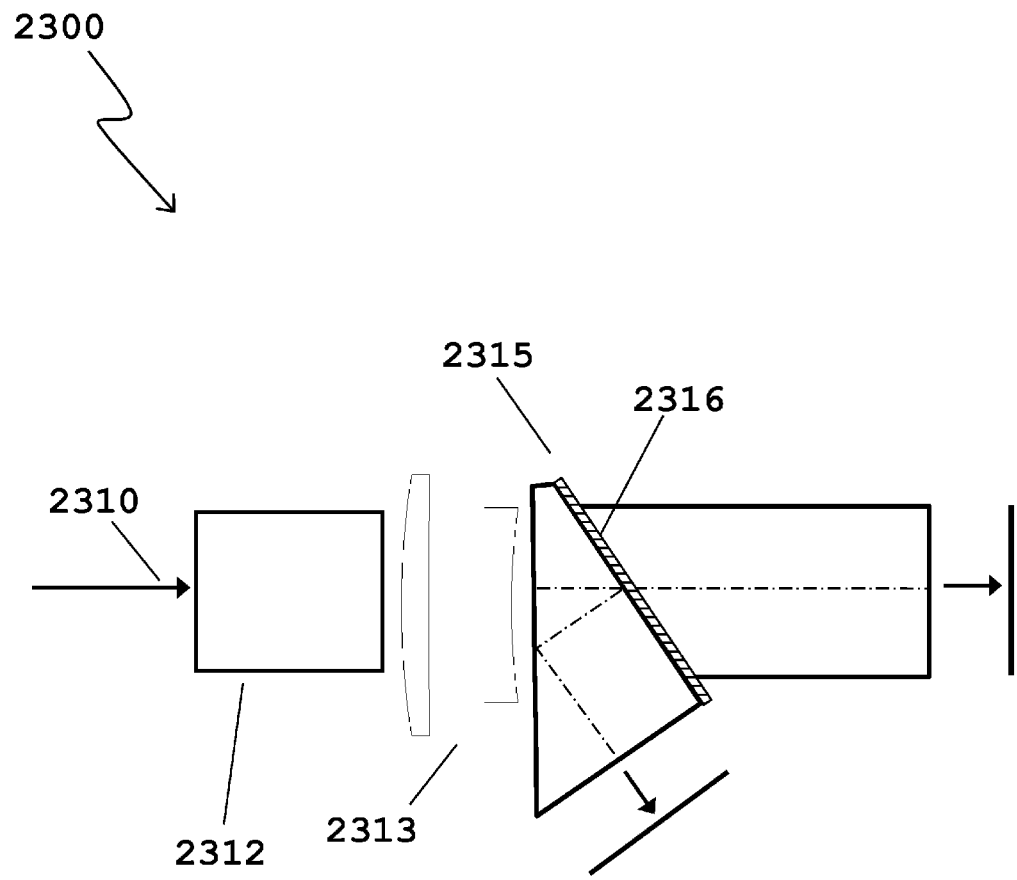
FIG. 26 is a schematic of an embodiment of the present invention comprising solid prisms and a single beamsplitting element, in which the reflected beam portion is further reflected.

FIG. 26 is a schematic diagram of an embodiment 2300 of the present invention. The basic optical function of this embodiment 2300 is similar to the basic function of embodiment 2100, so a detailed description of the light paths is not given again. Referring to FIG. 26, optical radiation 2310 preferably from an object (not shown) is incident on imaging lens system 2312, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. Imaging lens system 2312 in embodiment 2300 is preferably identical to imaging lens system 2112, as described in embodiment 2100. After passing through imaging lens system 2312, the light next passes through optional corrective lens system 2313, which is preferably designed to adapt to the particularities of imaging lens system 2312 in order to properly pre-correct the light so that it is best suited for traveling through solid cemented cube beamsplitter 2315. Optional corrective lens system 2313 in embodiment 2300 is preferably identical to corrective lens system 2113 in embodiment 2100.

Solid cemented cube beamsplitter 2315 in embodiment 2300 is preferably different in form but identical in function to cemented and coated prisms 2114 and 2129 in embodiment 2100. Specifically, partially reflective coating 2316 in embodiment 2300 is preferably identical to partially reflective coating 2116 in embodiment 2100. In embodiment 2300, the reflected beam portion is subsequently internally reflected from a prism face before it reaches the image sensor. It is important to note that the presence of alternate angles and extra reflections in solid cemented cube beamsplitter 2315 in embodiment 2300 does not substantially change its function from that of cemented and coated prisms 2114 and 2129 in embodiment 2100.

Figure 27:
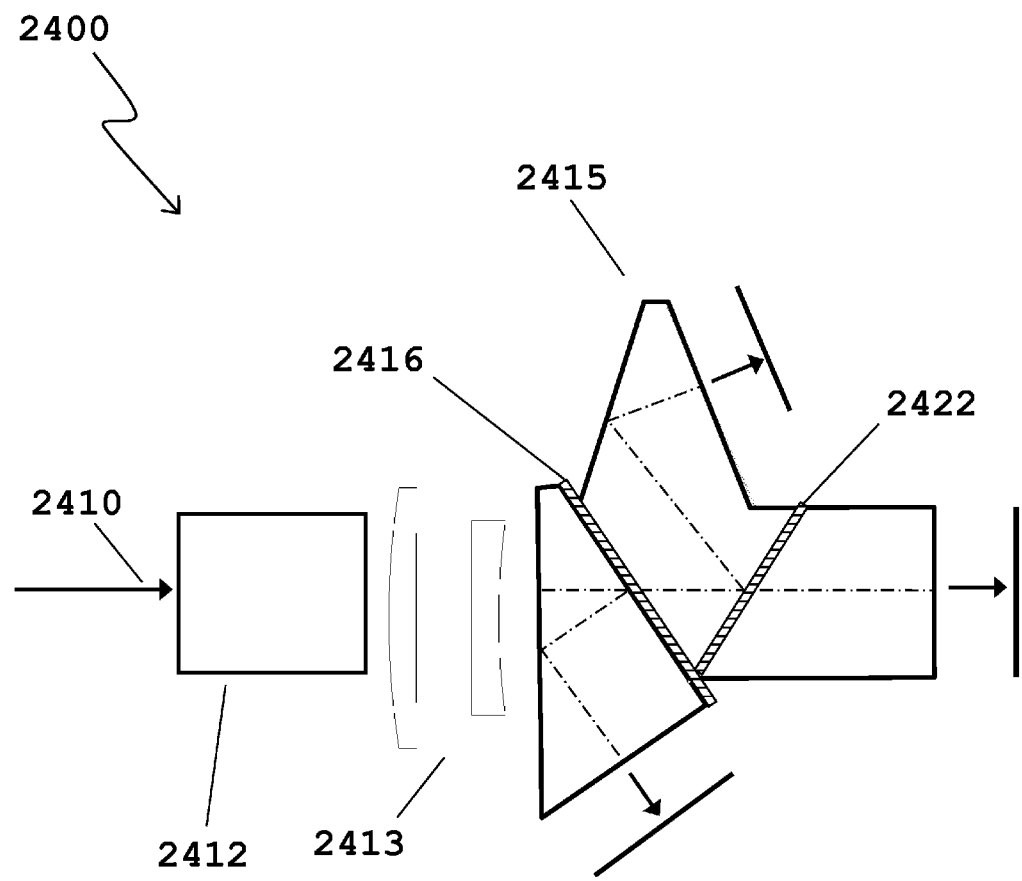
FIG. 27 is a schematic of an embodiment of the present invention comprising solid prisms and two beamsplitting elements in which the first and second reflected beam portions are further reflected.

FIG. 27 is a schematic diagram of an embodiment 2400 of the present invention. The basic optical function of this embodiment 2400 is preferably identical to the basic function of embodiment 800, so a detailed description of the light paths is not given again. Referring to FIG. 27, optical radiation 2410 preferably from an object (not shown) is incident on imaging lens system 2412, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. Imaging lens system 2412 in embodiment 2400 is identical to imaging lens system 812, as described in embodiment 800. After passing through imaging lens system 2412, the light next passes through optional corrective lens system 2413, which is preferably designed to adapt to the particularities of imaging lens system 2412 in order to properly pre-correct the light so that it is best suited for traveling through solid cemented cube beamsplitter 2415. Optional corrective lens system 2413 in embodiment 2400 is preferably identical to corrective lens system 813 in embodiment 800.

Solid cemented cube beamsplitter 2415 in embodiment 2400 is preferably different in form but identical in function to cemented and coated prisms 814 and 818 and 824 in embodiment 800. Specifically, partially reflective coating 2416 in embodiment 2400 is preferably identical to partially reflective coating 816 in embodiment 800 and partially reflective coating 2422 in embodiment 2400 is preferably identical to partially reflective coating 822 in embodiment 800. In embodiment 2400, the first and second reflected beam portions are each subsequently internally reflected from a prism face before they reach the image sensors. It is important to note that the presence of alternate angles and extra reflections in solid cemented cube beamsplitter 2415 in embodiment 2400 does not change its function from that of cemented and coated prisms 814 and 818 and 824 in embodiment 800.

Figure 28:
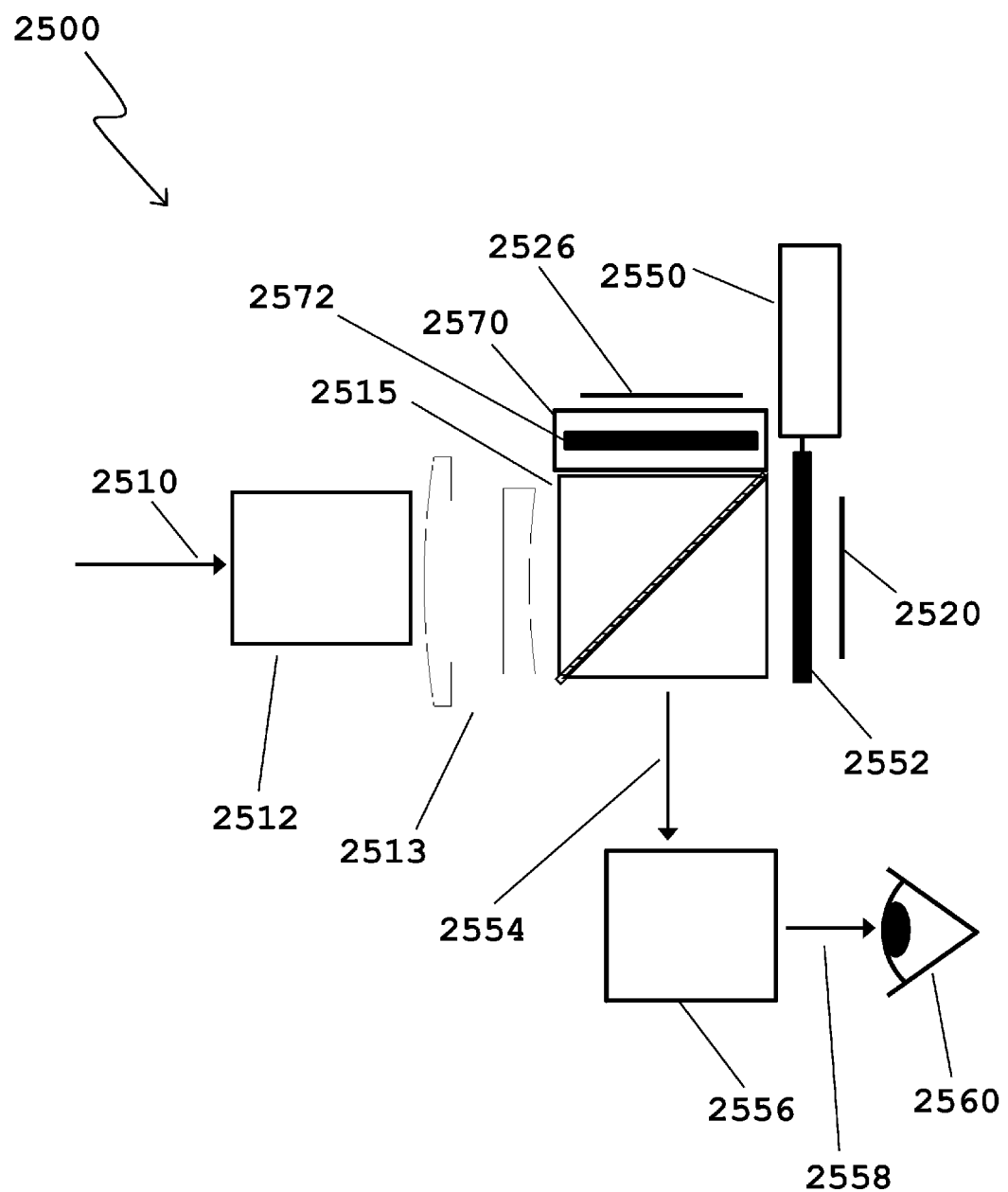
FIG. 28 is a schematic of an embodiment of the present invention comprising shutters and a viewfinder.

FIG. 28 is a schematic diagram of an embodiment 2500 of the present invention. The basic optical function of this embodiment 2500 is preferably identical to the basic function of embodiment 2100, so a detailed description of the light paths, and image-forming, image-capture, and image-combining methods is not given again. Referring to FIG. 28, optical radiation 2510 preferably from an object (not shown) is incident on imaging lens system 2512, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. Imaging lens system 2512 in embodiment 2500 is identical to imaging lens system 2112, as described in embodiment 2100. After passing through imaging lens system 2512, the light next passes through optional corrective lens system 2513, which is preferably designed to adapt to the particularities of imaging lens system 2512 in order to properly pre-correct the light so that it is best suited for traveling through solid cemented cube beamsplitter 2515. Optional corrective lens system 2513 in embodiment 2500 is preferably identical to corrective lens system 2113 in embodiment 2100.

Embodiment 2500 preferably comprises two optional shutter mechanism housings 2550 and 2570 and two optional shutter leaves 2552 and 2572 and optional viewfinder apparatus 2556. The purpose of optional shutter mechanism housings 2550 and 2570, shutter leaves 2552 and 2572, and optional viewfinder 2556 is to provide a function similar to the function of a flip mirror and viewfinder, which are typically found in Through-The-Lens (TTL) focusing systems or in Single Lens Reflex (SLR) camera systems. When image-forming light is focused onto, and being recorded and captured by, the two image sensors 2520 and 2526, shutter leaves 2552 and 2572 are preferably both retracted into their corresponding shutter housings 2550 and 2570, respectively. Each shutter housing 2550 and 2570 preferably comprises a motorized retracting/extending mechanism which is preferably capable of rapidly retracting or extending the shutter leaves 2552 and 2572. Note that both shutter mechanism housings are optionally identical in form and function, however shutter mechanism housing 2550 is oriented vertically and shutter mechanism housing 2570 is oriented horizontally (pointing into the page), as shown in FIG. 28. Note that the orientations of the shutter mechanism housings 2550 and 2570 are not critical; either may be oriented horizontally, vertically, or in/out of the page and still provide the same function.

When triggered by the user, both shutter mechanism housings 2550 and 2570 extend their shutter leaves 2552 and 2572, respectively. Either or both of the two shutter leaves 2552 and 2572 may comprise reflecting mirror surfaces. Additionally, either one (or optionally neither) of the two shutter leaves 2552 and 2572 may be painted black to absorb light. When the shutter mechanism housings 2550 and 2570 have extended their shutter leaves 2552 and 2572, respectively, light is prevented from reaching the image sensors, and instead the image forming light 2554 is redirected toward viewfinder apparatus 2556, which in turn presents TTL viewfinder image light 2558 to be viewed by a viewer's eye 2560.

The precise design, positioning, sizing, and specification of the mechanisms and surfaces comprising the two shutter mechanism housings 2550 and 2570 and the two shutter leaves 2552 and 2572 are typically straightforward matters for those skilled in the arts of shutter and mechanism design and mechanical engineering. The precise design, positioning, sizing, and specification of the image-righting prisms, lenses, mirrors, coatings and other items comprising viewfinder apparatus 2556 is typically a straightforward matter for those skilled in the arts of optical engineering and lens design.

Figure 29:
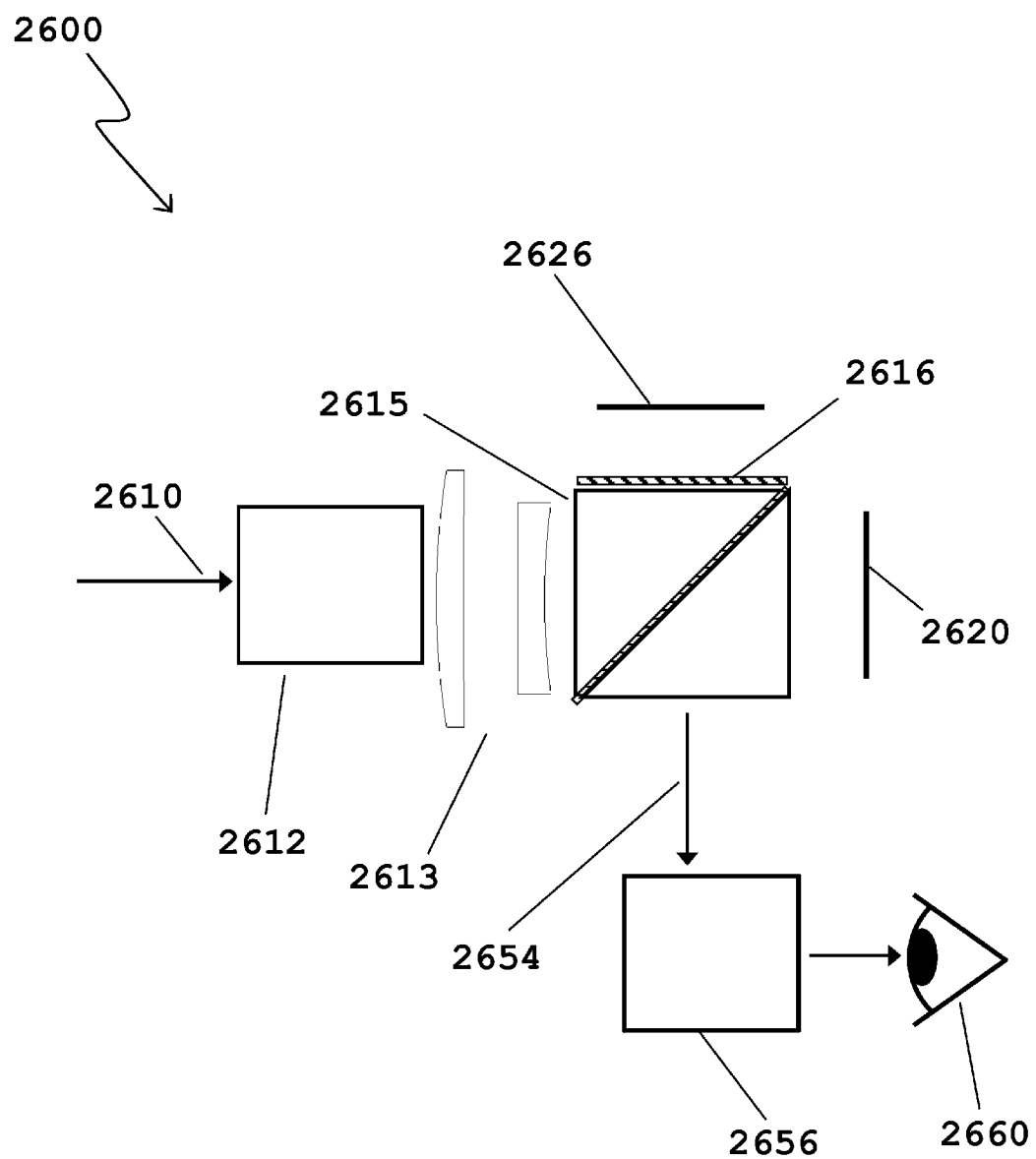
FIG. 29 is a schematic of an embodiment of the present invention comprising solid prisms with a partially reflective coating and a viewfinder.

FIG. 29 is a schematic diagram of an embodiment 2600 of the present invention. The basic optical function of this embodiment 2600 is preferably identical to the basic function of embodiment 2500, so a detailed description of the light paths, and image-forming, image-capture, and image-combining methods is not given again. Referring to FIG. 29, optical radiation 2610 preferably from an object (not shown) is incident on imaging lens system 2612, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. Imaging lens system 2612 in embodiment 2600 is identical to imaging lens system 2512, as described in embodiment 2500. After passing through imaging lens system 2612, the light next passes through optional corrective lens system 2613, which is preferably designed to adapt to the particularities of imaging lens system 2612 in order to properly pre-correct the light so that it is best suited for traveling through solid cemented cube beamsplitter 2615. Optional corrective lens system 2613 in embodiment 2600 is preferably identical to corrective lens system 2513 in embodiment 2500.

In contrast to embodiment 2500, instead of using moving shutter leaves to change the light path through the cube, a second coating 2616 has been applied to the top surface of the cube 2615. The coating 2616 partially reflects and partially transmits light. Thus, a small portion 2654 of the incoming light 2610 will be sent downward toward viewfinder 2656, which provides a clear image for viewing by a viewer 2660. The reflective and transmissive optical function of this cube 2615 is preferably identical to that of the solid glass prism shown in embodiment 300.

Figure 30:
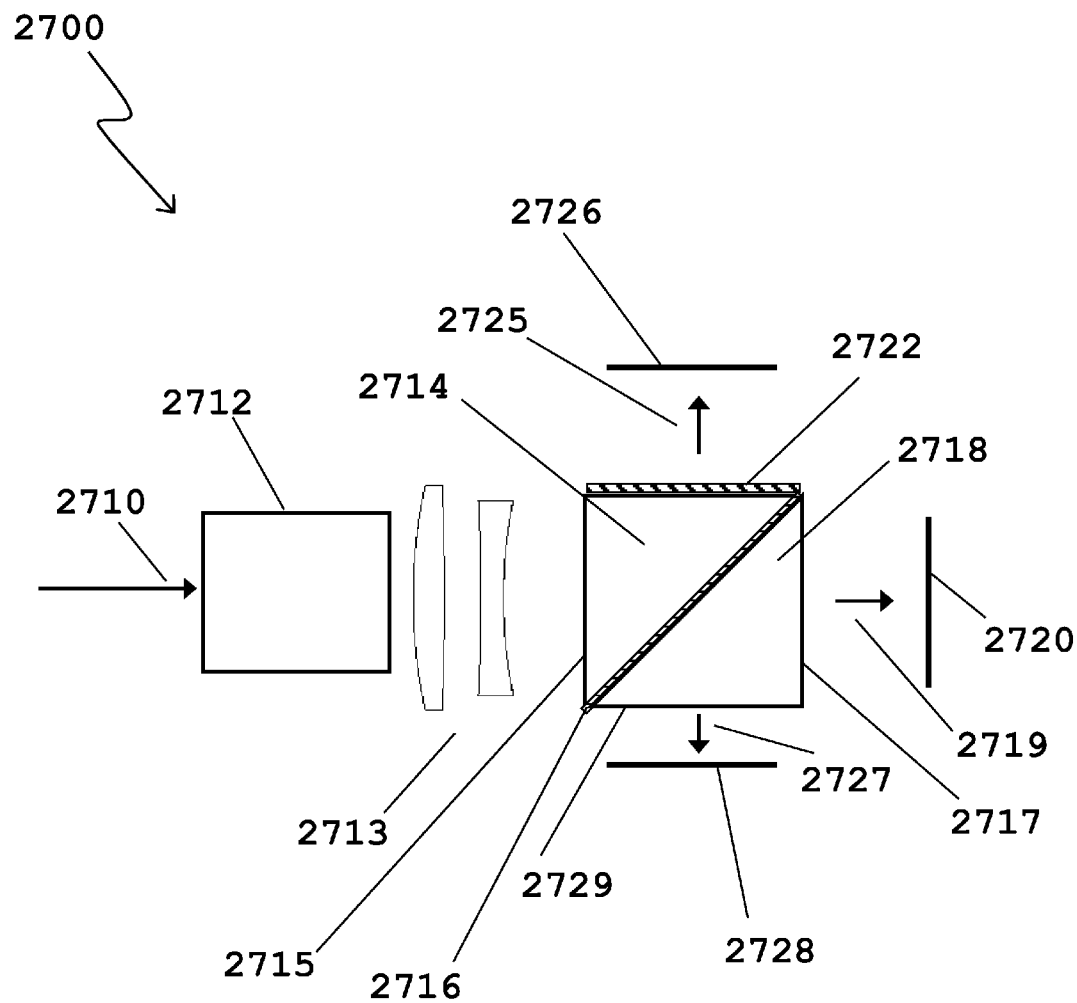
FIG. 30 is a schematic of an embodiment of the present invention comprising solid prisms and two beamsplitting elements.

FIG. 30 is a schematic diagram of an embodiment 2700 of the present invention. The basic optical function of this embodiment 2700 is preferably identical to the basic function of embodiment 300, so a detailed description of the light paths is not given again. Referring to FIG. 30, optical radiation 2710 preferably from an object (not shown) is incident on imaging lens system 2712, which, for the purposes of the dimensions and materials given herein for this embodiment, preferably comprises a commercially-available large-format film camera lens, such as one manufactured by Hasselblad having a focal length of 80 mm and an f-number of f/2.8, although any lens system may be used. After passing through imaging lens system 2712, the light next passes through optional corrective lens system 2713, which is preferably designed to adapt to the particularities of imaging lens system 2712 in order to properly pre-correct the light so that it is best suited for traveling through solid prisms 2714, and 2718. Specifically, because prisms 2714 and 2718, which preferably comprise thick glass, will introduce chromatic and spherical aberration into image forming beam portions 2719, 2725, and 2727, the primary function of optional corrective lens system 2713 is to add an equal and opposite amount of aberration, thereby ensuring that image forming beam portions 2719, 2725, and 2727 are all optically well-corrected and that they all form high-resolution images. The design of the corrective lens system 2713 is a straightforward matter for those skilled in the art of lens design and lens system adaptation. If imaging lens system 2712 is designed in conjunction with the presence of solid prisms 2714 and 2718, then there is typically no need to include optional corrective lens system 2713.

Figure 31:
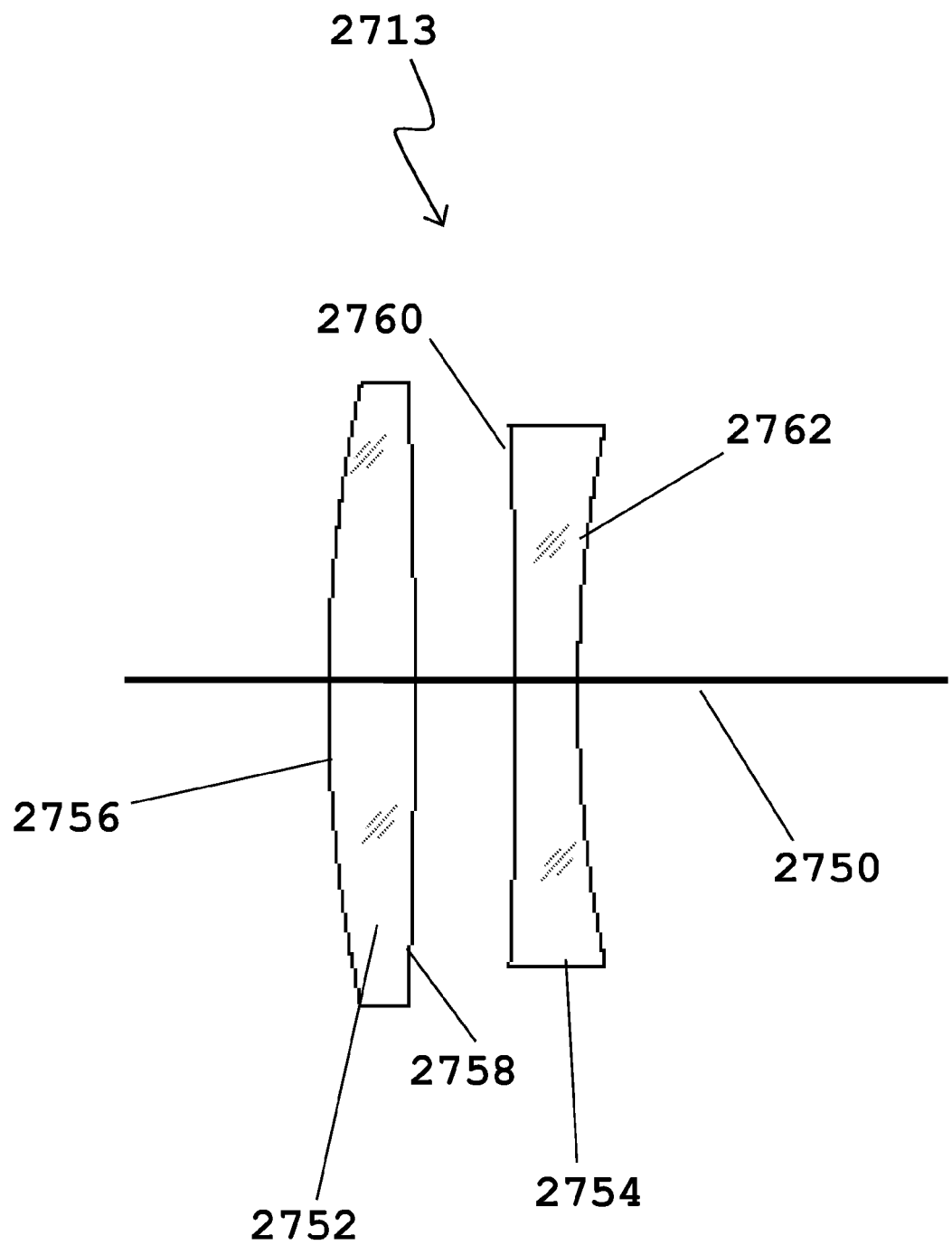
FIG. 31 is a detail of the corrective lens system utilized in the embodiment shown in FIG. 30.

Corrective lens system 2713 preferably comprises an air-spaced doublet, as shown in FIG. 31. Individual lens elements 2752 and 2754, which comprise corrective lens system 2713, are preferably rotationally symmetric about their central optical axis 2750. Lens element 2752 preferably comprises glass with a refractive index at the sodium d-line wavelength ($n_d$) equal to 1.6200 and Abbe dispersion value at the sodium d-line wavelength ($V_d$) equal to 36.367, such as F2 glass manufactured by Schott Glass. Lens element 2752 preferably has an edge diameter of 25.4 mm and a center thickness (measured along the central optical axis of rotation 2750) of 3.50 mm. Lens element 2754 preferably comprises glass with a refractive index at the sodium d-line wavelength ($n_d$) equal to 1.7495 and Abbe dispersion value at the sodium d-line wavelength ($V_d$) equal to 34.951, such as LAFN7 glass manufactured by Schott Glass. Lens element 2754 preferably has an edge diameter of 22.0 mm and a center thickness (measured along the central optical axis of rotation 2750) of 2.50 mm.

The shapes of the optical surfaces of lens elements 2752 and 2754 are preferably spherical. The first surface 2756 of lens element 2752 is preferably a convex sphere with a radius of curvature of 51.711 mm. The shape of second surface 2758 of lens element 2752 is preferably a convex sphere with a radius of curvature of −232.979 mm. The shape of first surface 2760 of lens element 2754 is preferably a concave sphere with a radius of curvature of −197.092 mm. The shape of second surface 2762 of lens element 2752 is preferably a concave sphere with a radius of curvature of 49.745 mm.

The center thickness (measured along the central optical axis of rotation 2750) between the back mounting plane of imaging lens system 2712 and lens element 2752 is preferably 32.142 mm. The center thickness (measured along the central optical axis of rotation 2750) between lens element 2752 and lens element 2754 is preferably 2.895 mm. The center thickness (measured along the central optical axis of rotation 2750) between lens element 2754 and the front face 2715 of glass prism 2714 is preferably 6.105 mm.

Referring again to FIG. 30, front face 2715 of prism 2714 preferably comprises an anti-reflective coating, and a partially-reflecting coating 2716 is preferably applied to the back face of prism 2714. Partially-reflecting coating 2716 preferably reflects 13% of all light, irrespective of wavelength or polarization, and preferably transmits 77% of all light, irrespective of wavelength or polarization. Such a partially-reflecting coating is preferably deposited using a hybrid metal-dielectric coating technology, for example Newport Corporation's catalog part number MB.1, which offers constant transmittance over all visible wavelengths and all polarization states.

Partially-reflecting coating 2722 is preferably applied on the side face of the prism 2714, Partially-reflecting coating 2722 preferably reflects 13% of all light, irrespective of wavelength or polarization, and preferably transmits 77% of all light, irrespective of wavelength or polarization. Such a partially-reflecting coating is preferably deposited using a hybrid metal-dielectric coating technology, for example Newport Corporation's catalog part number MB.1, which offers constant transmittance over all visible wavelengths and all polarization states. Alternatively, partially-reflecting coating 2722 may be omitted altogether, and the Fresnel reflection inherent in the glass-air boundary between prism 2714 and air may optionally provide the partially-reflecting function required by this embodiment.

Prism 2718 is preferably placed in contact with, and is preferably cemented to, partially-reflecting coating 2716 on the back face of prism 2714. Alternatively, partially-reflecting coating 2716 may be applied to the front surface of prism 2718, and then the coating and prism is cemented to the back face of prism 2714. An anti-reflective coating is preferably applied to back face 2717 of prism 2718. Image-forming beam portion 2719 is transmitted through prism 2714, partially-reflecting coating 2716, and prism 2718 and forms an image on image sensor 2720, which preferably comprises a high-definition motion picture CMOS or CCD sensor, such as model SI-1920HD manufactured by Silicon Imaging.

Image-forming beam portion 2725 is transmitted through prism 2714, reflects off partially-reflecting coating 2716, and is transmitted again through prism 2714, and transmitted through partially-reflecting coating 2722 and forms an image on image sensor 2726, which preferably comprises a high-definition motion picture CMOS or CCD sensor, such as model SI-1920HD manufactured by Silicon Imaging.

Image sensor 2728 is placed at side face 2729 of glass prism 2718. An anti-reflective coating is preferably applied to side face 2729. Image-forming beam portion 2727 forms an image on image sensor 2728, which preferably comprises a high-definition motion picture CMOS or CCD sensor, such as model SI-1920HD manufactured by Silicon Imaging.

Because partially-reflecting coating 2716 preferably comprises a relatively thin beamsplitter, and the prisms are preferably cemented together (thus leaving no air gaps), preferably no aberrations are introduced by tilted coating 2716.

Figure 32:
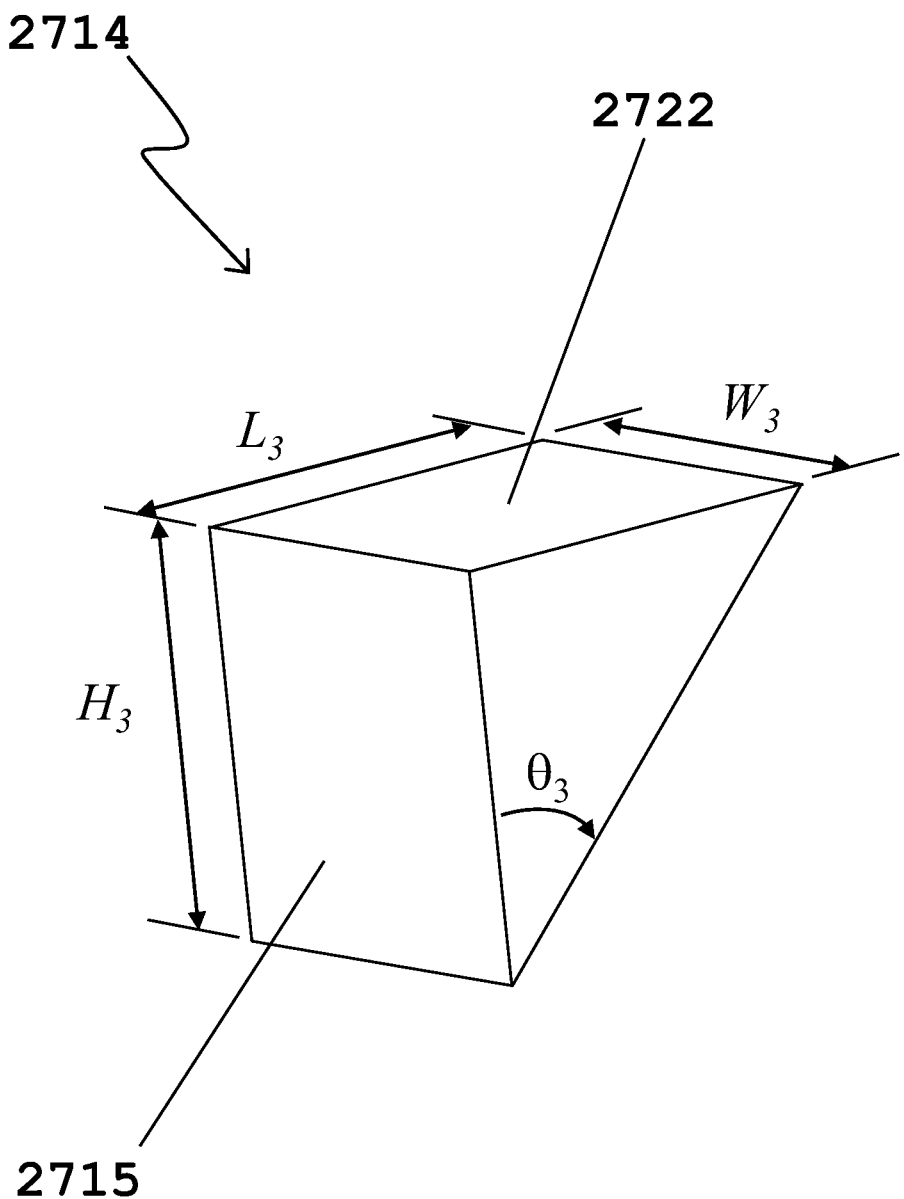
FIGS. 32 and 33 are details of the prisms utilized in the embodiment shown in FIG. 30.

FIG. 32 shows a tilted view of prism 2714, which is preferably a rectangular volume and is preferably made of a low-dispersion glass such as Lithotec Calcium Fluoride manufactured by Schott Glass ($n_d$=1.4338, $V_d$=95.233). Prism 2714 preferably has a length (denoted by "$L_3$") equal to 13.5 mm, a width (denoted by "$W_3$") equal to 16.5 mm, a height (denoted by "$H_3$") equal to 13.5 mm, and a back-face angle (denoted by "$\theta_3$") equal to 45 degrees, although any angle in the range between 0 and 180 degrees may be used.

Figure 33:
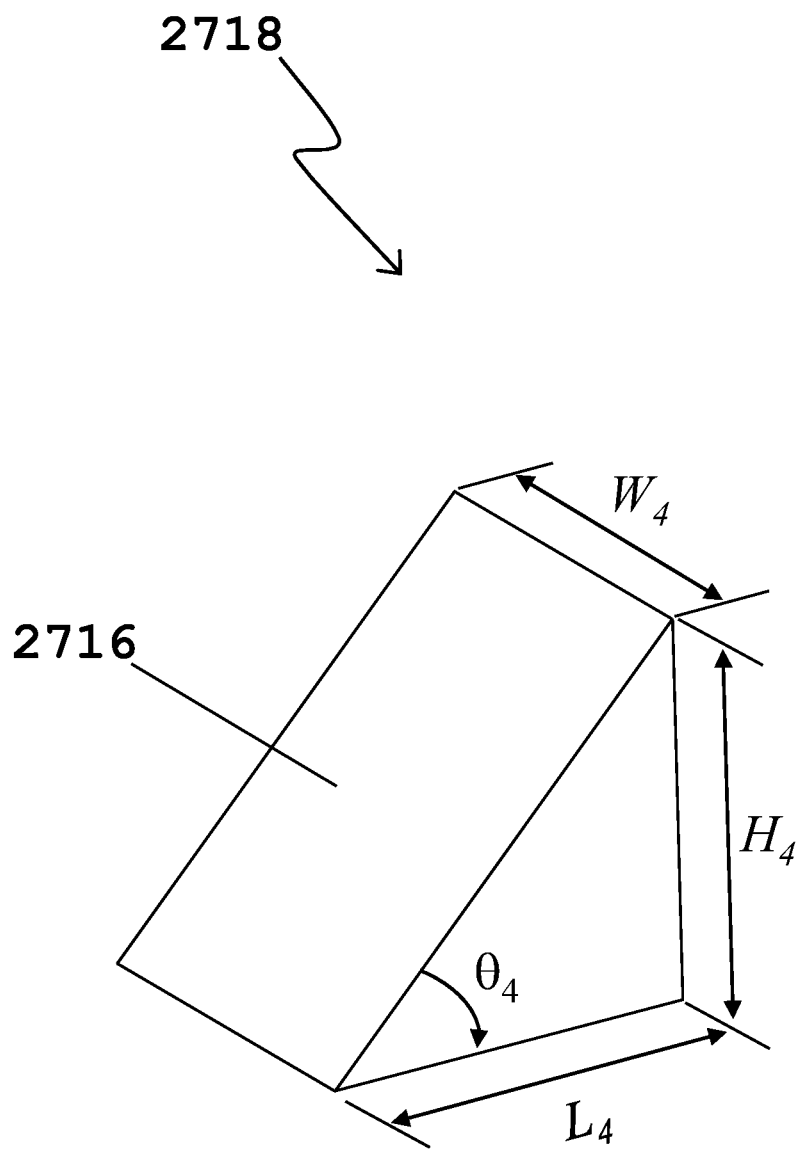

FIG. 33 shows a tilted view of prism 2718, which is preferably a rectangular volume and is preferably made of a low-dispersion glass such as Lithotec Calcium Fluoride manufactured by Schott Glass ($n_d$=1.4338, $V_d$=95.233). Prism 2718 preferably has a length (denoted by "$L_4$") equal to 13.5 mm, a width (denoted by "$W_4$") equal to 16.5 mm, a height (denoted by "$H_4$") equal to 13.5 mm, and a front-face angle (denoted by "$\theta_2$") equal to 45 degrees, although any angle in the range between 0 and 180 degrees may be used.

As mentioned above, the dimensions, materials, and other characteristics described in this embodiment are specific to a large-format film camera lens manufactured by Hasselblad having a focal length of 80 mm and an f-number of f/2.8. For other imaging lens systems, different dimensions, materials, and characteristics would be applicable. Because of similar geometries, the reflectance equations of embodiment 100 may be applied to this embodiment 2700 as well.

The beamsplitters and beam splitting elements described in the embodiments herein preferably comprise whole beam broad spectrum beamsplitters or whole beam broad spectrum HDRI beamsplitters, depending on the application. Thus, the present invention preferably exhibits no parallax error between the separate images. The present invention also preferably exhibits no measurable differences in wavelength composition between the separate images.

In any of the embodiments presented herein, although certain preferred beam splitter/prism angles and/or beam splitter orientations (relative to other beam splitters or to the image forming beam or beam portion path direction) are illustrated and are preferable, any angle and/or relative orientation of between 0 and 180 degrees inclusively may alternatively be used.

In any of the embodiments presented herein, although certain preferred values for reflectance or transmittance are illustrated and may be preferable, any value for reflectance or transmittance of between 0% and 100% inclusively may alternatively be used.

A whole beam HDRI beamsplitter used in embodiments of the present invention is typically designed so that its ratio of reflectance to transmittance is greater than a certain value X, or alternatively its ratio of transmittance to reflectance is greater than a certain value X. Another way of stating this ratio preference is that the ratio of reflectance to transmittance is either less than 1/X or greater than X, For reference, a value of X=2 corresponds to a light level difference between the reflected and transmitted beams of 1 full photographic stop; a value of X=4 corresponds to a light level difference between the reflected and transmitted beams of 2 full photographic stops; and a value of X=8 corresponds to a light level difference between the reflected and transmitted beams of 3 full photographic stops. That is, the number of full photographic stops between reflected and transmitted beam portions is equal to $\log_2 X$. These embodiments preferably produce captured images which differ from each other in exposure or light level. Alternatively, a difference in image light level or exposure may be due to the use of neutral density filters with respect to different beam portions and/or varying exposure times for different image sensors.

Most currently available commercial color camera products utilize CFA image sensors. A CFA image sensor is an image sensor with an array of differently-colored filters (typically red, green, and blue) arranged in front of the image sensor's pixels in a regular mosaic pattern. Images captured with a CFA image sensor must be processed to remove this color mosaic pattern from the image before the image may be suitably displayed to a viewer. This color interpolation or "de-mosaic" process is typically performed automatically in most currently available commercial color camera products. An image that has been de-mosaiced has lost some of its original information, such as which of the original red-filtered, green-filtered, and/or blue-filtered pixels was originally either saturated or under-exposed at the time the image was captured. This original color saturation or under-exposure information cannot be regained after the image captured by the CFA image sensor has been de-mosaiced. Thus some original information (specifically, which individual pixels were saturated and which pixels were under-exposed) in the image is lost after the de-mosaic process.

Because of this loss of information after the de-mosaic process, color images with large light level differences that have been de-mosaiced will exhibit vast differences in color when they are combined into an HDR image, making them unsuitable for combining into an HDR image. Thus, using current techniques, a de-mosaiced image combined with other de-mosaiced images to form an HDR image cannot be further apart than one photographic stop from the de-mosaiced image with the next closest light level in order to reliably and automatically create good-quality HDR images. Typically, if that value is greater than three photographic stops, the images cannot be combined into a useful HDR image at all.

It is thus preferable for color images with large differences in light level captured on one or more CFA image sensors to combine them to form an HDR image prior to the time when the captured images are color interpolated or de-mosaiced. There are many algorithms known in the art for combining the pre-de-mosaiced images into an HDR image. This process enables the production of excellent quality HDR images, especially for images that have been captured with greater than or equal to 1 photographic stop of light level difference, and even more especially for images that have been captured with 2 photographic stops of light level difference, between 2 photographic stops of light level difference and 3 photographic stops of light level difference, 3 photographic stops of light level difference, or an even higher amount of light level difference. In this way fewer images are required to be combined to capture a wide dynamic range HDR image, since their light levels can differ by a larger number of photographic stops. Alternatively, this process enables the formation of an HDR image having a much greater dynamic range if the same number of images is combined.

Using the present invention it is possible to simultaneously obtain multiple high-resolution images of a scene, which images may be combined to form a single HDR image. Images captured simultaneously by multiple image sensors are preferably captured during the same moment in time, using the same exposure time on each image sensor. It is therefore possible to obtain high-resolution HDR snapshots of moving subjects, as well as high-resolution HDR moving pictures (e.g. cinematographic films, movies, or other video) in which the subject and/or camera is moving.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for combining color images, the method comprising the steps of:
    splitting an image-forming beam into a reflected beam portion and a transmitted beam portion using a whole beam broad spectrum HDRI beamsplitter;
    forming a plurality of color images on one or more CFA image sensors, the images being substantially identical except for their light levels; and
    combining the images prior to any de-mosaicing of the images to form a high dynamic range color image.

2. The method of claim 1 wherein at least one of the images differs in light level by an amount greater than or equal to one photographic stop from an image having a next closest light level.

3. The method of claim 2 wherein at least one of the images differs in light level by an amount greater than or equal to two photographic stops from an image having a next closest light level.

4. The method of claim 3 wherein at least one of the images differs in light level by an amount greater than or equal to three photographic stops from an image having a next closest light level.

5. The method of claim 1 further comprising splitting the reflected beam portion and/or the transmitted beam portion using one or more additional whole beam broad spectrum HDRI beamsplitters.

6. The method of claim 1 wherein the whole beam broad spectrum HDRI beamsplitter is constructed by coating a surface of a first prism and/or a surface of a second prism with a partially-reflecting coating and bonding the first and second prisms together so the coating is disposed between the first prism and the second prism, the coating thereby forming the whole beam broad spectrum HDRI beamsplitter.

7. The method of claim 6 further comprising the step of pre-correcting aberrations induced in the beam portions by the prisms using a corrective lens system disposed prior to the whole beam broad spectrum HDRI beamsplitter.

8. The method of claim 1 wherein the forming step comprises simultaneously capturing the color images on a plurality of CFA image sensors.

9. The method of claim 1 further comprising the step of assembling the high dynamic range color image together with other high dynamic range color images to create a high dynamic range film or video.

10. The method of claim 1 further comprising the step of effectively collimating the image forming optical beam.

11. The method of claim 1 further comprising the step of correcting aberrations in the beam portions which have been transmitted through the whole beam broad spectrum HDRI beamsplitter.

12. The method of claim 1 further comprising the step of replacing the whole beam broad spectrum HDRI beamsplitter with a different beamsplitter.

13. The method of claim 1 further comprising the step of directing a beam portion to a viewfinder.

14. The method of claim 13 wherein the directing step comprises reflecting the beam portion from one or more shutters or partially reflecting optical elements.

15. The method of claim 1 wherein the whole beam broad spectrum HDRI beamsplitter comprises a partially reflecting beamsplitter coating disposed in the interior of a prism or beamsplitting cube.

16. An apparatus for combining color images, the apparatus comprising:
    a whole beam broad spectrum HDRI beamsplitter for splitting an image-forming beam into a reflected beam portion and a transmitted beam portion;

one or more CFA image sensors for capturing a plurality of color images, said images being substantially identical except for their light levels; and a processor for combining said plurality of color images prior to any de-mosaicing of said images to form a high dynamic range color image.

17. The apparatus of claim 16 wherein at least one of said images differs in light level by an amount greater than or equal to one photographic stop from an image having a next closest light level.

18. The apparatus of claim 17 wherein at least one of said images differs in light level by an amount greater than or equal to two photographic stops from an image having a next closest light level.

19. The apparatus of claim 18 wherein at least one of said images differs in light level by an amount greater than or equal to three photographic stops from an image having a next closest light level.

20. The apparatus of claim 16 further comprising one or more additional whole beam broad spectrum HDRI beamsplitters for splitting said reflected beam portion and/or said transmitted beam portion.

21. The apparatus of claim 16 wherein said whole beam broad spectrum HDRI beamsplitter is selected from the group consisting of a thin beamsplitter, a glass plate, a pellicle, a doublet lens, an achromatic cemented doublet, and a partially reflecting beamsplitter coating disposed in the interior of a prism or beamsplitting cube.

22. The apparatus of claim 16 wherein said whole beam broad spectrum HDRI beamsplitter comprises a deposited partially-reflective layer disposed between two prisms.

23. The apparatus of claim 22 wherein said prisms are bonded together.

24. The apparatus of claim 16 further comprising a corrective lens system disposed prior to said whole beam broad spectrum HDRI beamsplitter.

25. The apparatus of claim 16 comprising a plurality of CFA image sensors configured to capture said plurality of color images simultaneously.

26. The apparatus of claim 16 further comprising a processor for assembling said high dynamic range color image together with other high dynamic range color images to create a high dynamic range film or video.

27. The apparatus of claim 16 further comprising a collimating lens system for effectively collimating the image forming optical beam.

28. The apparatus of claim 16 further comprising a corrective lens system.

29. The apparatus of claim 16 further comprising a stage comprising one or more replacement beamsplitters.

30. The apparatus of claim 29 wherein said stage is circular or linear.

31. The apparatus of claim 16 further comprising a viewfinder.

32. The apparatus of claim 31 further comprising one or more shutters or partially reflecting optical elements for directing a beam portion to said viewfinder.

* * * * *